United States Patent
Yoneda et al.

[19]

[11] Patent Number: 6,123,323
[45] Date of Patent: Sep. 26, 2000

[54] GAS-LIQUID DISPERSION DEVICES PROVIDED WITH PARTITIONING MEMBERS, GAS-LIQUID CONTACT APPARATUS, AND WASTEWATER TREATMENT SYSTEMS PROVIDED WITH THE SAME

[75] Inventors: Yukihiro Yoneda; Shigeharu Yoneshima; Mikihiko Kanda; Yusuke Shiota, all of Himeji, Japan

[73] Assignee: Nippon Shokubai Co., Ltd., Osaka, Japan

[21] Appl. No.: 08/917,729

[22] Filed: Aug. 27, 1997

[30] Foreign Application Priority Data

| Aug. 26, 1996 | [JP] | Japan | 8-225660 |
| Sep. 20, 1996 | [JP] | Japan | 8-250639 |
| Aug. 7, 1997 | [JP] | Japan | 9-213632 |
| Aug. 7, 1997 | [JP] | Japan | 9-213633 |

[51] Int. Cl.$^7$ .................................................. B01F 3/04
[52] U.S. Cl. ............................. 261/96; 261/97; 261/113; 261/114.1; 422/220
[58] Field of Search ................... 261/114.1, 113, 261/114.5, 108, 122.1, 96, 97; 422/220

[56] References Cited

U.S. PATENT DOCUMENTS

| 3,155,472 | 11/1964 | Huppke | 261/113 |
| 3,195,987 | 7/1965 | Hardison | 261/113 |
| 3,197,286 | 7/1965 | Farkas et al. | 261/114.1 |
| 3,489,506 | 1/1970 | Galstaun et al. | 261/113 |
| 4,126,540 | 11/1978 | Grosboll et al. | 261/113 |
| 4,233,269 | 11/1980 | Kaye et al. | 422/220 |
| 4,427,605 | 1/1984 | Meier et al. | 261/113 |
| 4,639,354 | 1/1987 | Bischoff et al. | 422/140 |

FOREIGN PATENT DOCUMENTS

| 879375 | 2/1943 | France | 261/114.1 |
| 2019333 | 11/1971 | Germany | 261/113 |

OTHER PUBLICATIONS

Kenji Hashimoto, Industry Reactor Device, pp. 270–271; 278–283; 286–287, "Selection–Design–Examples", May 9, 1984 (with English translation).

Kozoh Koide, Technology of Bubble–Liquid Dispersion, vol. 48, pp. 29–33, "Adaption to a Gas–Liquid–Solid Three Phase Reactor", 1984 (with English translation).

*Primary Examiner*—David A. Simmons
*Assistant Examiner*—Robert A. Hopkins
*Attorney, Agent, or Firm*—Oblon, Spivak, McClelland, Maier & Neustadt, P.C.

[57] ABSTRACT

A gas-liquid dispersion device to be installed in a system in which a liquid flows forming a continuous phase and a gas flows upward includes a perforated plate which is so mounted as to interrupt a gas-liquid passage, in which a mixed phase of the gas and liquid is produced. A separated liquid-conducting channel extending from the perforated plate toward its gas inflow opening side is formed in such a way that a gas-liquid passage is divided into a liquid-conducting portion and a gas-dispersing portion. When the mixed phase of the gas and liquid is supplied to the gas-liquid dispersion device, a gas phase accumulates on the gas inflow opening side of the gas-liquid dispersion device and creates a gas pocket, whereby pulsation of gas and liquid flows can be prevented. As a result, the gas passes upward through individual through holes (excluding the liquid-conducting channel) made in the perforated plate while the liquid passes through the liquid-conducting channel in a stable manner.

17 Claims, 32 Drawing Sheets

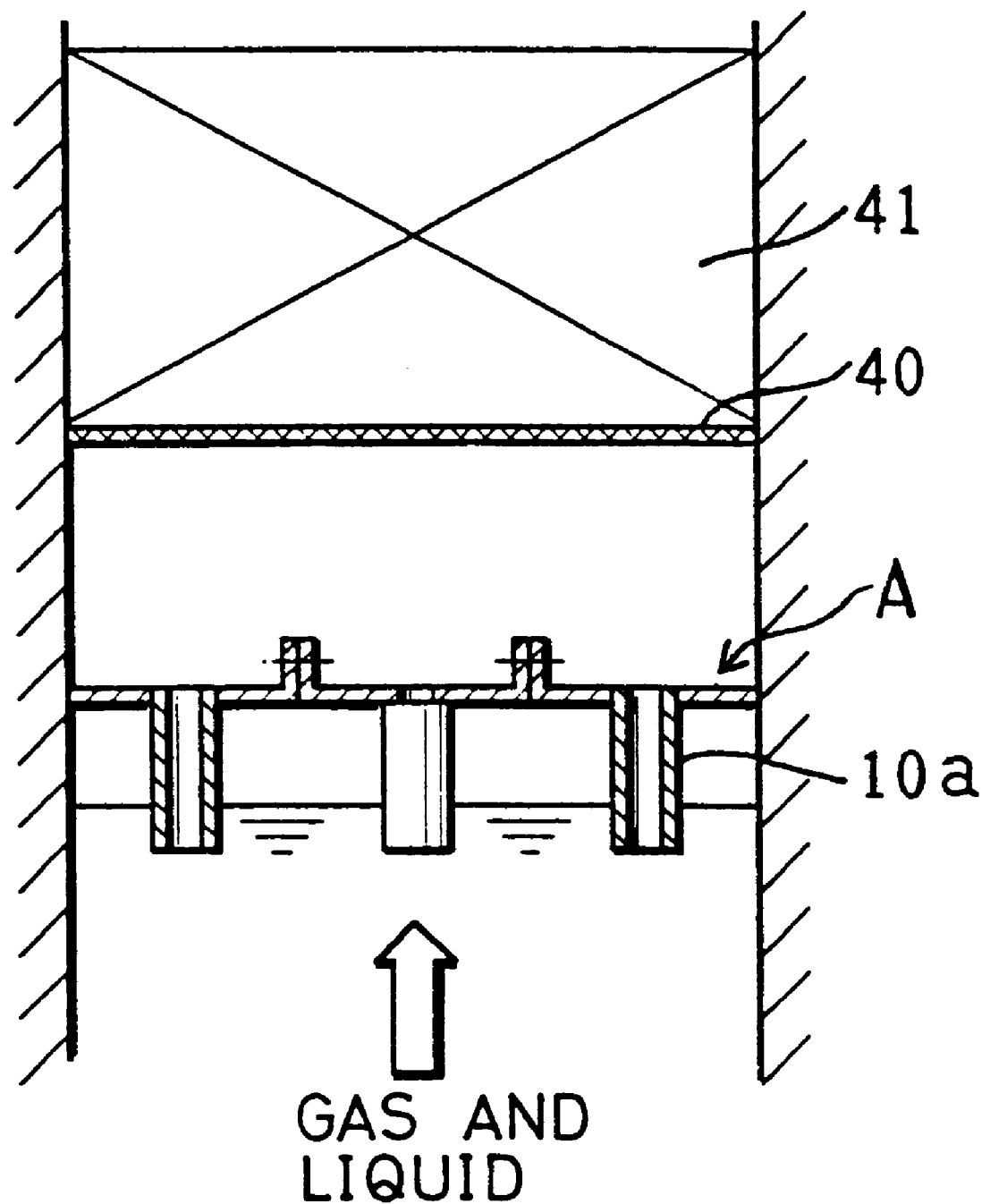

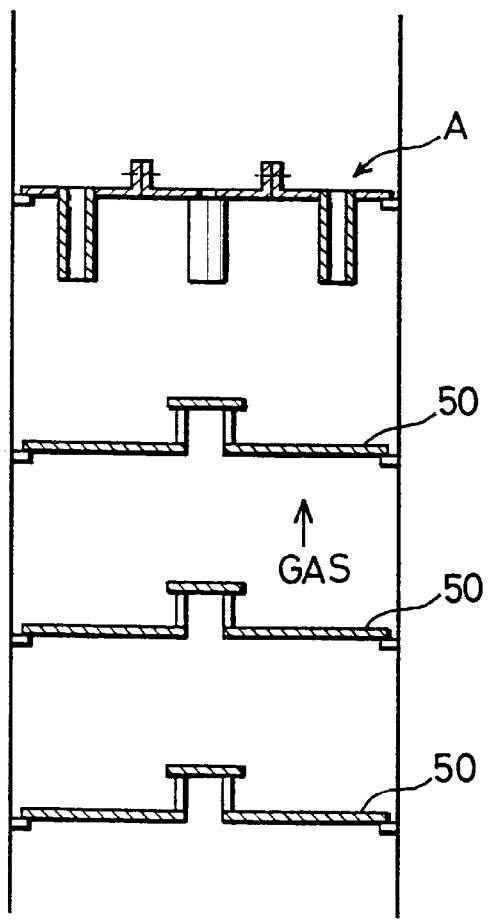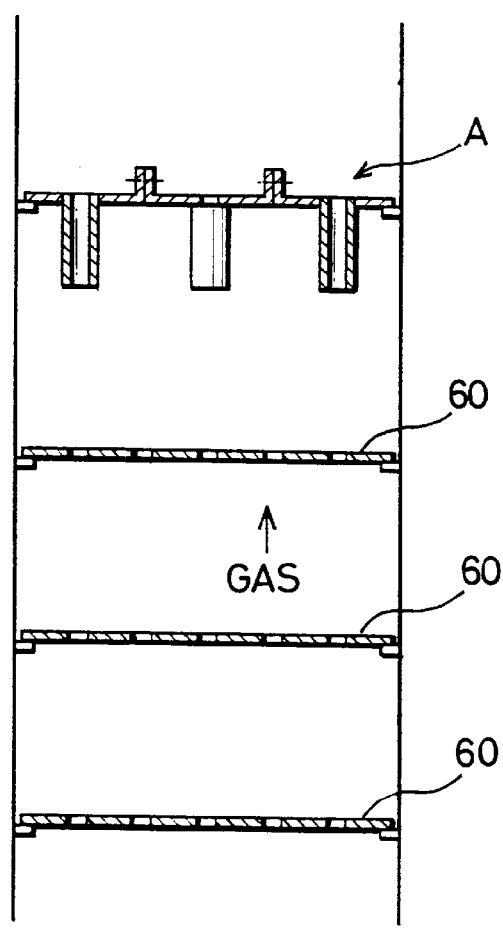

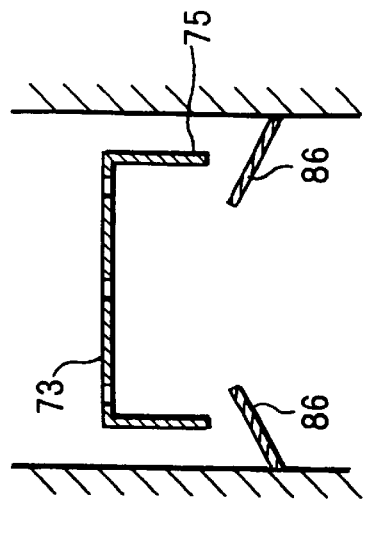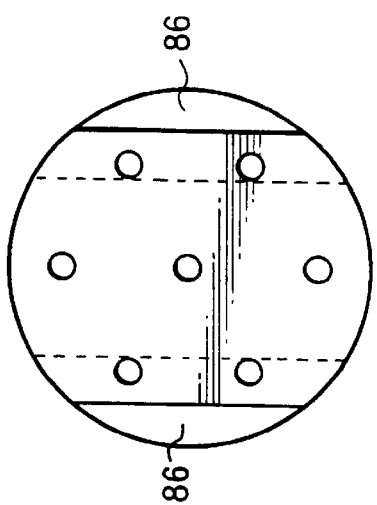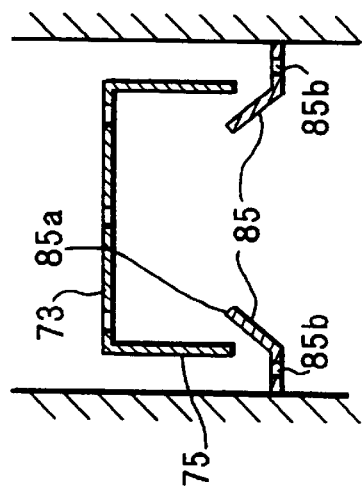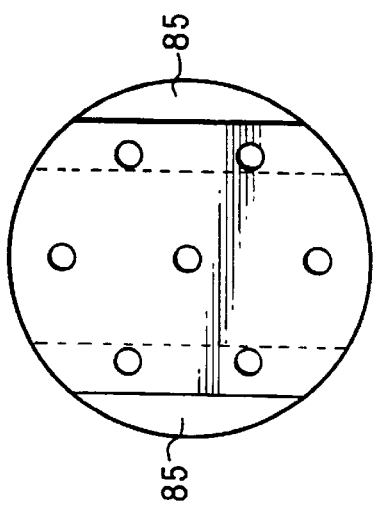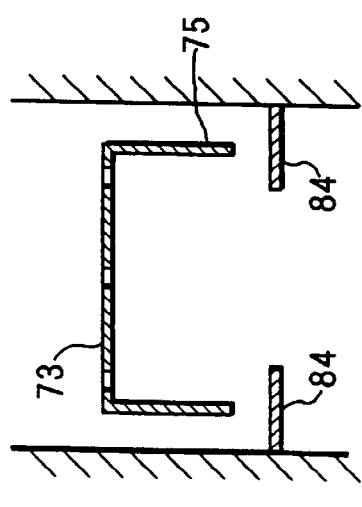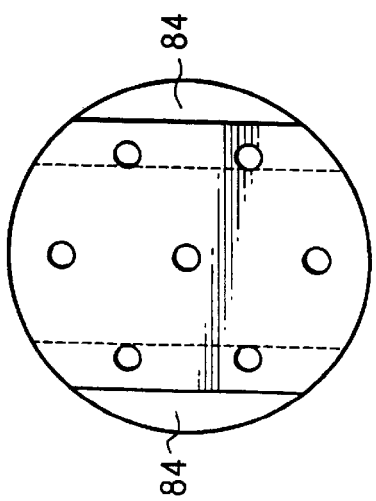

FIG. 28A
SINGLE-HOLE PLATE
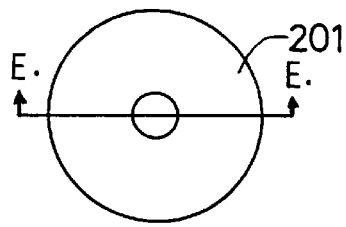
FIG. 28B
PERFORATED PLATE
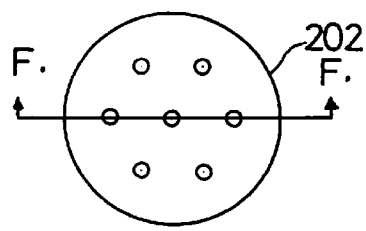
FIG. 28E
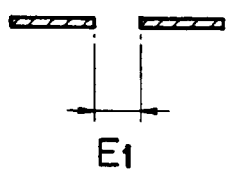
FIG. 28F
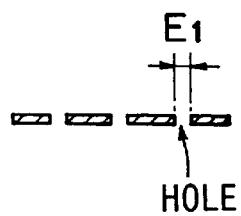
FIG. 28C
SINGLE-HOLE PLATE PROVIDED WICH COLLISION PLATE
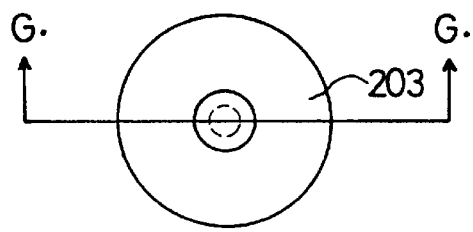
FIG. 28D
PERFORATED PLATE PROVIDED WICH COLLISION PLATE
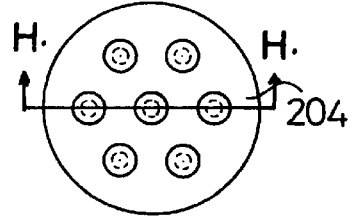
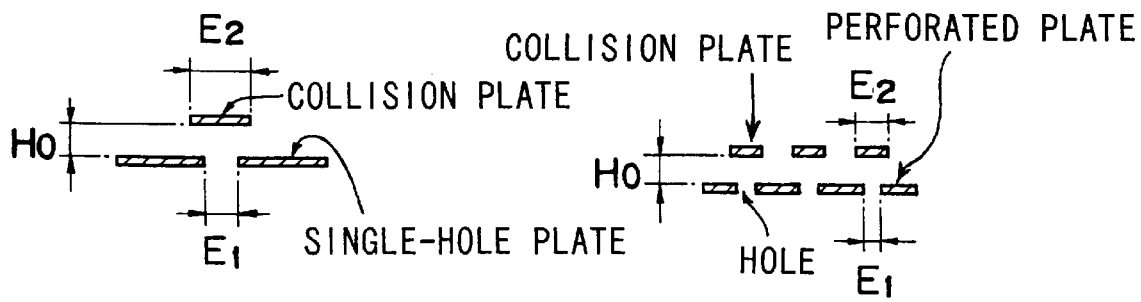
FIG. 28G
FIG. 28H

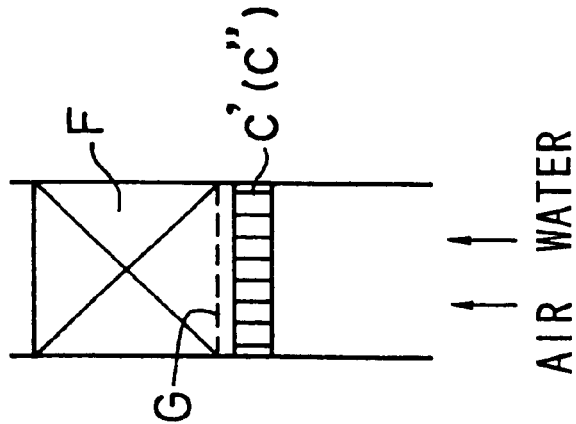
FIG. 34
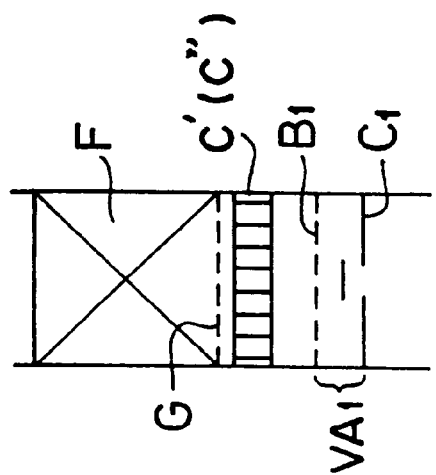
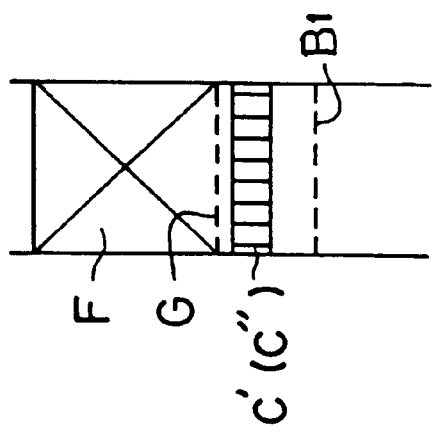

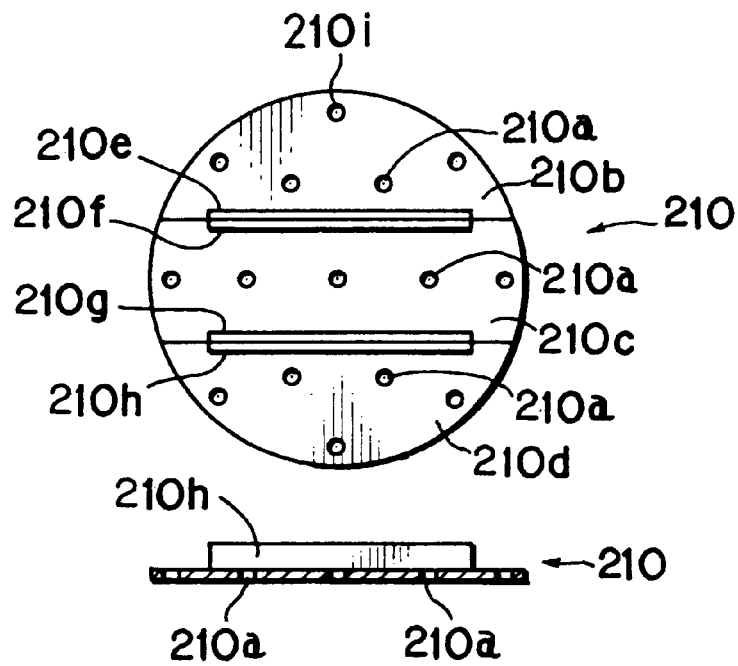
FIG. 36A
FIG. 36B
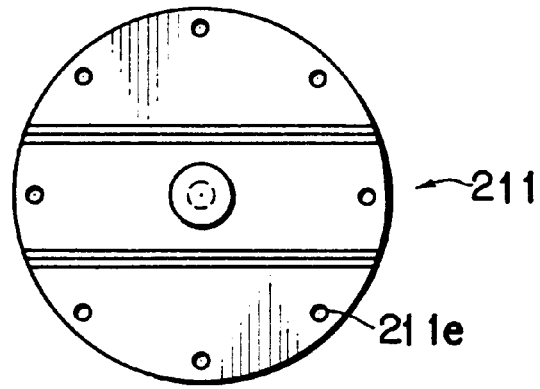
FIG. 37A
FIG. 37B

GAS-LIQUID DISPERSION DEVICES PROVIDED WITH PARTITIONING MEMBERS, GAS-LIQUID CONTACT APPARATUS, AND WASTEWATER TREATMENT SYSTEMS PROVIDED WITH THE SAME

BACKGROUND OF THE INVENTION

This invention relates to gas-liquid dispersion devices for increasing gas-liquid dispersion efficiency in gas-liquid contact between a gas and a liquid, or between a gas and a slurry, as well as to gas-liquid contact apparatus and wastewater treatment systems employing the gas-liquid dispersion devices.

Conventionally, gas-liquid contact apparatus are used in various industrial sectors and applications including chemical plants, plating facilities, food production facilities, pharmaceutical manufacturing facilities, pulp and paper manufacturing facilities, dyeing operation and dye manufacturing facilities, glass manufacturing facilities, power generating facilities, and photographic processing facilities. A gas-liquid contact apparatus of this kind is constructed such that a gas and a liquid are brought into mutual contact in a system, in which the liquid forms a continuous phase, to perform a chemical reaction, a heat exchange operation, dissipation, an absorption operation, and so on.

At an intake portion of the aforementioned gas-liquid contact apparatus, there is provided a gas-liquid dispersion device (also known as a distributor) which can sufficiently disperse the gas and liquid for improving gas-liquid contact efficiency. More particularly, the gas-liquid dispersion device is a device for dispersing the gas and/or liquid (or causing them to contact with each other in certain cases) at an intake portion of such containers as a reaction vessel, a bubble tower, a multitubular heat exchanger, and a packed tower.

Known examples of the aforementioned gas-liquid dispersion device used when a gas forms a continuous phase include a spray nozzle, a notch trough type device, and perforated plates with or without weirs, in which a liquid is dispersed downward. On the other hand, examples used when a liquid forms a continuous phase include a sparger ring mounted at a lower part of a reaction vessel, a sintering pipe, and a multi-hole orifice plate (or single-hole orifice plate) used as a perforated plate (or single-hole plate) which is mounted at a lower part of a bubble tower.

Also known in the prior art is a perforated plate (or single-hole plate) provided with a collision plate which is mounted immediately on the outflow opening side of gas passages formed in the perforated plate (or single-hole plate).

The aforementioned gas-liquid dispersion device and gas-liquid contact apparatus are also used in wastewater treatment systems for the treatment of water discharged from various facilities. In this kind of application, wastewater is purified by passing it through a wet oxidization process in the presence of molecular oxygen, ozone, or other oxygen source, in which organic substances and inorganic salt components contained in the wastewater are decomposed with or without the aid of a catalyst and converted into harmless substances such as carbon dioxide, water, or nitrogen. What is important in this application is how to uniformly disperse oxygen within a mass of wastewater.

As described above, a multi-hole orifice plate (hereinafter referred to simply as a perforated plate) or a single-hole orifice plate (hereinafter referred to simply as a single-hole plate) having a simple structure is generally used in such a system as a reaction tower in which a liquid or a slurry forms a continuous phase and a gas flows upward as a dispersion device for improving the state of gas-liquid dispersion or gas-liquid contact. The perforated plate issued singly in the reaction tower in certain applications, while a plurality of perforated plates are arranged in equally spaced multiple stages in other applications. In the latter case, the perforated plates would divide the internal space of the reaction tower into a plurality of reaction chambers of the same capacity to allow for a continuous, multi-stage reaction sequence, for instance.

The conventional dispersion device having the simple structure as described above, especially the perforated plate provided at an intake portion, occasionally produces a serious pulsating gas flow, and this may cause such a phenomenon that a fluid passing through the perforated plate does not contain any gas. Another problem which can arise in the conventional dispersion device is that a sufficiently good gas-liquid dispersion state is not accomplished because an even flow of the fluid and gas around the circumference of the perforated plate is not obtained. These problems of prior art technology used to result in a reduction in the efficiency of reaction in chemical reactors, a reduction in the efficiency of absorption in absorption facilities, and a reduction in the efficiency of heat transfer in heat exchangers.

Varying constructions are conventionally known for the gas-liquid contact apparatus and chemical reactors incorporating such a substance as a catalyst. Examples of these constructions are: (i) a first construction in which an empty column is formed beneath a grid for retaining a packed material without filling any substance therein; and (ii) a second construction in which a gas is injected from a gas dispersion device provided at a bottom part of a chemical reactor without injecting the gas and liquid in the form of a mixed-phase flow.

In the first construction mentioned above, the gas and liquid are introduced as a mixed-phase flow from a lower or side portion of a reactor. This construction has a high probability of producing an uneven flow. This is because after the introduction of the gas and liquid into a reactor tower, only the gas may flow in an easy-to-flow direction due to its buoyancy. Such an uneven flow causes an irregular gas-liquid distribution beneath the grid for retaining the packed material. Although the packed material located downstream of gas passages more or less exerts a gas-liquid dispersing effect by itself, it is not sufficient and, therefore, processing performance of the reactor would decline due to deterioration in the state of gas-liquid dispersion and/or gas-liquid contact within the packed material.

If the gas-liquid distribution is irregular immediately beneath the grid for retaining the packed material, it becomes impossible to cause the gas to uniformly act on the packed material. This is because an uneven or pulsating gas flow will be directly supplied to the packed material when the pressure loss caused by the packed material is small, regardless of whether the packed material itself has a certain degree of dispersing effect. If the packed material produces a large pressure loss, it is expected that the dispersion of the gas on the underside of the packed material would be improved to a certain extent. It is however still impossible to produce a really uniform gas flow because there exists unevenness in the density of the packed material itself and its high-porosity portions would produce uneven gas flows.

As is understood from the foregoing, the first construction does not produce sufficient gas dispersion or liquid dispersion, and this may cause unexpected adverse effects, such as deterioration in reaction process performance and side reaction. The impact of the aforementioned problems of this construction would become more apparent if it is taken into account that the reactor of this kind is continuously operated for an extended period of time in most cases and the packed material has its performance limitations. In this construction, uneven gas flows may occur between the perforated plate and the grid for retaining the packed material because of the relatively long distance between them, adversely affecting the performance of the packed material.

If the existence of the gas affects corrosion behavior of the tower, which will occur when oxygen is required for the formation of a passive film on the surface of stainless steel, for instance, the uneven gas flow which prevents normal dispersion of oxygen (or air) will cause a delay in the formation of passive films required for protecting the inner surface of the tower and surfaces of other built-in components. This can eventually destroy existing passive films and accelerate corrosion.

In the gas-liquid contact apparatus according to the second construction mentioned above, the gas dispersion device makes it possible to uniformly introduce a gas into a packed material. However, the gas dispersion device has a complicated structure, and good gas-liquid dispersion is occasionally not obtained directly beneath a grid for retaining the packed material the relatively long distance between the gas dispersion device and grid. Furthermore, since the gas does not exist on the underside of the gas dispersion device or inside a liquid-carrying piping connected to a reactor tower, corrosion within the apparatus may be accelerated. In addition, solid residues tend to deposit at the bottom of the tower. Although this construction is effective when the gas and liquid are separately supplied and only the gas is fed through the gas dispersion device, it is difficult to simultaneously supply the gas and liquid to the gas dispersion device in the form of a mixed-phase flow.

In a multitubular gas-liquid contact reaction apparatus in which heat is exchanged between the inside and outside of pipes, the gas and liquid are usually brought into contact inside the individual pipes. In this apparatus, gas blowoff holes of a gas dispersion device are located just below the individual pipes to uniformly disperse the gas into all the pipes in a manner similar to the second construction described earlier. This arrangement is also associated with a problem that corrosion is likely to occur and solid residues tend to deposit at the bottom in a similar way to what has been described above. Furthermore, since the gas and liquid are separately supplied in the second construction, it is difficult to supply them to the gas-liquid contact apparatus as a mixed-phase flow and obtain uniform dispersion free from the flow pulsation problem.

The gas-liquid contact apparatus is also employed in a wastewater treatment system which is designed to perform wet oxidization wastewater treatment, in which wastewater undergoes an oxidization process in a liquid phase without being condensed in the presence of molecular oxygen, ozone, or other oxygen source. In this case, the temperature of the wastewater is increased (typically 150° C. to 320° C.), the pressure of the wastewater is increased as much as necessary to maintain its liquid phase (typically about 5 to 210 times greater than atmospheric pressure), and then organic substances contained in the wastewater are oxidized. In this application, a sufficiently good dispersion state and treatment efficiency can not be achieved even when a plurality of perforated plates are arranged in a multi-stage structure within an empty-column-type reaction tower. Even when a perforated plate is mounted at the bottom of a catalyst bed in catalytic and wet oxidization wastewater treatment, a high treatment efficiency can not be expected.

SUMMARY OF THE INVENTION

It is an object of the present invention to provide a gas-liquid dispersion device, gas-liquid contact apparatus, and wastewater treatment system which have overcome the problems residing in the prior art.

The present invention is directed to a gas-liquid dispersion device for installation in a system in which a liquid flows forming a continuous phase and a gas flows upward comprises a perforated plate which is so mounted as to interrupt a gas-liquid passage, in which a mixed phase of the gas and liquid is produced, and to form a separated liquid-conducting channel extending from the perforated plate toward its gas inflow opening side, whereby the gas is dispersed as it is passed through the perforated plate and the liquid is guided to and passed through the liquid-conducting channel.

Also, the present invention is directed to a gas-liquid dispersion device for installation in a system in which a liquid flows forming a continuous phase and a gas flows upward comprises at least two partitioning members which are arranged with a specific distance therebetween so as to interrupt a gas-liquid passage, in which a mixed phase of the gas and liquid is produced, each of the partitioning members being formed of (a) a single-hole plate having a single through hole, (b) a perforated plate having a plurality of through holes, (c) a single-hole plate having a single through hole provided with a collision plate fitted close to an outflow opening of the through hole, or (d) a perforated plate having a plurality of through holes provided with a collision plate fitted close to outflow openings of the through holes.

The inventive gas-liquid dispersion device has a simple structure, and can produce a good gas-liquid dispersion state at an intake of an empty column and at an intake of a catalyst or other packed materials by eliminating pulsating and uneven flows of a gas not only when supplying it alone but also when supplying a mixture of gas and liquid in the form of a mixed-phase flow.

Further, a gas-liquid contact apparatus can be provided which produces a good gas-liquid distribution and contact state within an empty column and a packed bed.

Moreover, a wastewater treatment system can be provided which treats wastewater with high efficiency when a gas containing oxygen is supplied.

These and other objects, features and advantages of the invention will become more apparent upon reading the following detailed description in conjunction with the accompanying drawings.

BRIEF DESCRIPTION OF THE DRAWINGS

FIG. 6 is a sectional view illustrating a combination of a gas-liquid dispersion device and a packed material;

FIGS. 12A and 12B are fragmentary sectional views of a sixth gas-liquid contact apparatus and its variation according to the first aspect of the invention;

FIGS. 20A to 20C are diagrams illustrating constructions in which baffles are mounted beneath the liquid-conducting channels of the gas-liquid dispersion device shown in FIGS. 17A and 17B;

FIGS. 20D to 20F illustrate in top plan view the baffles of FIGS. 20A–20C, respectively;

FIGS. 28A to 28D are diagrams illustrating partitioning members according the second aspect of the invention;

FIG. 28E is a cross-sectional view taken along line E—E in FIG. 28A;

FIG. 28F is a cross-sectional view taken along line F—F in FIG. 28B;

FIG. 28G is a cross-sectional view taken along line G—G in FIG. 28C;

FIG. 28H is a cross-sectional view taken along line H—H in FIG. 28D;

FIG. 34 shows schematic diagrams representing two different types of grids and alternative arrangements of gas-liquid dispersion devices according to the second aspect of the invention;

FIGS. 36A and 36B are diagrams illustrating the construction of a perforated plate according to the second aspect of the invention;

FIGS. 37A and 37B are diagrams illustrating the construction of a single-hole plate fitted with a collision plate according to the second aspect of the invention;

DESCRIPTION OF THE PREFERRED EMBODIMENTS OF THE INVENTION

Figure 1A:
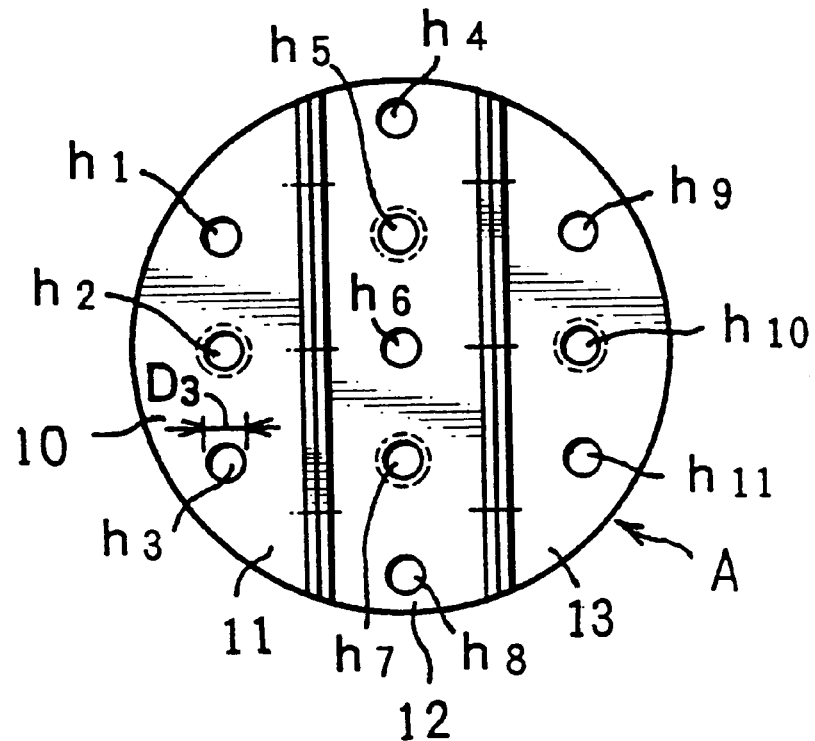
FIGS. 1A and 1B are diagrams illustrating a basic construction of a gas-liquid dispersion device according to a first aspect of the invention.

Before describing specific embodiments of the present invention, some basic concepts and a general outline of the invention are explained.

According to a first aspect of the present invention, a gas-liquid dispersion device for installation in a system in which a liquid flows forming a continuous phase and a gas flows upward comprises a perforated plate which is so mounted as to interrupt a gas-liquid passage, in which a mixed phase of the gas and liquid is produced, and to form a separated liquid-conducting channel extending from the perforated plate toward its gas inflow opening side, whereby the gas is dispersed as it is passed through the perforated plate and the liquid is guided to and passed through the liquid-conducting channel.

It is preferable that the length of the liquid-conducting channel of the aforementioned gas-liquid dispersion device is at least 10 mm but not more than three times the diameter of the perforated plate.

It is also preferable that the cross-sectional area of the liquid-conducting channel of the aforementioned gas-liquid dispersion device is such that the liquid flows at a velocity of 0.02 to 10 meters per second through the liquid-conducting channel.

In one form of the invention, the liquid-conducting channel is formed of a liquid-conducting tube projecting directly from around a through hole made in the perforated plate. In another form of the invention, the liquid-conducting channel is formed between a partitioning plate which extends from a peripheral portion of the perforated plate and an inside surface of the gas-liquid passage.

According to the first aspect of the invention, the gas-liquid dispersion device may further comprise upstream in its gas flow at least one single-hole plate provided with a collision plate fitted close to an outflow opening in the single-hole plate or perforated plate provided with a collision plate fitted close to outflow openings in the perforated plate, or secondary single-hole plate or perforated plate.

A bubble-tower-type gas-liquid contact apparatus according to the first aspect of the invention incorporates in its bubble tower the aforementioned gas-liquid dispersion device, and a packed material may be mounted on the gas outflow opening side of the gas-liquid dispersion device inside the bubble tower.

Another gas-liquid contact apparatus according to the first aspect of the invention comprises a vertical multitubular heat exchanger, in which a liquid flows forming a continuous phase and a gas flows upward, and the aforementioned gas-liquid dispersion device installed in a tube side intake portion (intake channel).

According to the first aspect of the invention, a wastewater treatment system for treating wastewater with the aid of an oxygen-containing gas source is provided with the aforementioned gas-liquid dispersion device or gas-liquid contact apparatus.

According to a second aspect of the invention, a gas-liquid dispersion device for installation in a system in which a liquid flows forming a continuous phase and a gas flows upward comprises at least two partitioning members which are arranged with a specific distance therebetween so as to interrupt a gas-liquid passage, in which a mixed phase of the gas and liquid is produced, each of the partitioning members being formed of (a) a single-hole plate having a single through hole, (b) a perforated plate having a plurality of through holes, (c) a single-hole plate having a single through hole provided with a collision plate fitted close to an outflow opening of the through hole, or (d) a perforated plate having a plurality of through holes provided with a collision plate fitted close to outflow openings of the through holes.

It is preferable that the distance between the individual partitioning members of the above gas-liquid dispersion device is at least one half of the diameter of each through hole made in the partitioning members but not more than one-and-a-half times the inside diameter or the horizontal length of one side of an inside wall of the gas-liquid passage.

In the case of the partitioning member being a single-hole plate having a single through hole provided with a collision plate fitted or a perforated plate having a plurality of through holes provided with a collision plate, they are arranged within the specific distance. Specifically, the distance between the collision plate and the single-hole plate or perforated plate in the upstream of the gas flow is lower than the specific distance.

It is also preferable that the partitioning member located upstream in the gas flow within the gas-liquid dispersion device is formed of a single-hole plate having a single through hole provided with a collision plate fitted close to an outflow opening of the through hole or a perforated plate having a plurality of through holes provided with a collision plate fitted close to outflow openings of the through holes, while the partitioning member located downstream in the gas flow is formed of another perforated plate. The gas-liquid dispersion device may further comprise a supporting frame for supporting a packed material, the supporting frame being provided integrally with or separately from a downstream surface of the partitioning member located downstream in the gas flow within the device. The packed material may be loaded on top of the supporting frame.

A gas-liquid contact apparatus according to the second aspect of the invention incorporates in its vessel more than one gas-liquid dispersion device having the above-described construction to form a multi-stage configuration.

Another gas-liquid contact apparatus according to the second aspect of the invention comprises a vertical multitubular heat exchanger, in which a liquid flows forming a continuous phase and a gas flows upward, and the aforementioned gas-liquid dispersion device installed in a tube side intake channel or a reaction vessel.

According to the second aspect of the invention, a wastewater treatment system for treating wastewater with the aid of an oxygen-containing gas source is provided with the aforementioned gas-liquid dispersion device or gas-liquid contact apparatus.

In either of the first and second aspects of the invention, the gas-liquid passage formed within the vessel (tower) is not limited in its cross-sectional shape. It is however preferable that the gas-liquid passage has a circular, elliptical, or polygonal cross section.

In the above-described gas-liquid dispersion device provided with a liquid-conducting channel according to the first aspect of the invention, a liquid-conducting portion and a gas-dispersing portion are formed on a perforated plate, the liquid-conducting portion being formed of one or more partitioning plates or usually a plurality of liquid-conducting tubes. The liquid-conducting portion allows a liquid to pass through while through holes in the gas-dispersing portion allow a gas to pass through. The perforated plate thus constructed produces an agitating effect on the gas outflow opening side of the through holes, thereby preventing uneven gas and liquid flows in which most of the gas flows in an easy-to-flow direction. This makes it possible to supply a mixed-phase flow containing uniformly distributed masses of gas and liquid. Furthermore, it is possible to furnish uniformly dispersed gas bubbles to the upper side of the perforated plate in a stable manner without causing pulsating flows. This is because a gas pocket is formed immediately beneath the perforated plate.

According to the first aspect of the invention, the gas-liquid dispersion device provided with the liquid-conducting channel may further comprise on its gas inflow side a single-hole plate or perforated plate fitted with a collision plate. In the gas-liquid dispersion device thus constructed, a mixed-phase flow of gas and liquid collides with the collision plate and is dispersed uniformly in all radial directions. This makes it possible to further even out the distribution of gas and liquid and prevent uneven flows and pulsating flows. When oxygen is required for preventing corrosion of stainless steel used in inside walls of a gas-liquid contact apparatus, for instance, oxygen can be supplied in a stable manner producing an increased anti corrosion effect, because uneven flows can be effectively prevented.

According to the second aspect of the invention, a perforated plate or a single-hole plate fitted with a collision plate produces an agitating effect on the gas outflow opening side, thereby preventing uneven gas and liquid flows in which most of the gas flows in an easy-to-flow direction. This makes it possible to supply a mixed-phase flow containing uniformly distributed masses of gas and liquid. Furthermore, it is possible to furnish uniformly dispersed gas bubbles to the upper side of the perforated plate in a stable manner without causing pulsating flows.

A gas-liquid contact apparatus according to the second aspect of the invention can even out the distribution of gas and liquid and prevent uneven flows. When oxygen is required for preventing corrosion of stainless steel used in inside walls of the gas-liquid contact apparatus, for instance, oxygen can be supplied in a stable manner producing an increased anti corrosion effect, because uneven flows can be effectively prevented.

A configuration incorporating a gas-liquid dispersion device or gas-liquid contact apparatus according to the first or second aspect of the invention in a tube side intake channel of a vertical multitubular heat exchanger can provide an enhanced heat exchange efficiency.

A wastewater treatment system incorporating a gas-liquid dispersion device or gas-liquid contact apparatus constructed according to the first or second aspect of the invention can provide an improved state of gas-liquid dispersion and contact between wastewater and an oxygen-containing gas, resulting in an improvement in treatment performance.

Liquids handled by gas-liquid dispersion devices, gas-liquid contact apparatus and wastewater treatment systems of the invention are not limited to specific types but may be any substances which exhibit liquid-phase characteristics. Such substances include simple liquids, suspensions containing water or oil as a suspending medium, suspensions containing a macromolecular solid, fine particles or colloid particles, as well as slurries. More particularly, these substances include water, organic solvents, water solution of an organic or inorganic material, various types of wastewater, suspensions or slurries containing an organic solvent, organic solution or a mixture of water and oil as a suspending medium. Types of slurries are not specifically limited but encompass any mixtures of a liquid and a finely divided solid which constitutes a dispersed phase.

Gases used in the invention are not limited to specific substances but may be an oxygen-containing gas, hydrogen, water vapor, organic vapor or carbon dioxide, or a mixture thereof.

Generally speaking, a liquid forming a continuous phase flows upward within a tower. The invention is not limited to such configurations, through. The liquid may flow from the top to the bottom of the tower or in any directions as long as it flows forming a continuous phase. It is however preferable in this invention that the liquid flows upward through the tower. This is because an upward liquid flow produces lower pressure losses compared to a downward liquid flow. In a case where the liquid flows downward, a dispersion plate according to the invention can be used as long as the flow rates of the gas and liquid fall within ranges which do not cause liquid flooding at the dispersion plate. When the liquid flows downward, the gas and liquid flow in opposite directions. Such countercurrent contact operation can occasionally be advantageous in chemical reaction, absorption operation and other treatment efficiencies, compared to co-current contact operation in which both the gas and liquid flow upward. Liquid-conducting tubes of the gas-liquid dispersion devices and gas-liquid contact apparatus of the invention are suited to countercurrent applications since they provide separate liquid-conducting channels which are less likely to cause liquid flooding and provide a wide operating range.

Although the equivalent diameter of a gas-liquid passage in which a gas-liquid dispersion device of the invention is installed is not specifically limited, it should preferably be 5 mm or over. More preferably, it should be 10 mm or over, and most preferably, 50 mm or over. An equivalent diameter of the gas-liquid passage of less than 5 mm is not desirable because the diameter of a hole in a single-hole plate becomes too small and difficult to machine. An equivalent diameter of the gas-liquid passage of less than 10 mm is not really desirable because the diameter of each hole in a perforated plate becomes too small from the viewpoint of dispersion effects and difficult to machine. There is not a specific upper limit for the equivalent diameter of the gas-liquid passage as long as it is physically possible to produce.

The gas-liquid contact apparatus of the invention are not limited to specific types as long as they have such a configuration that a liquid flows forming a continuous phase and a gas flows upward. Specific examples of such gas-liquid contact apparatus are chemical plants, plating facilities, food production facilities, pharmaceutical manufacturing facilities, pulp and paper manufacturing facilities, dyeing operation and dye manufacturing facilities, glass manufacturing facilities, photographic processing facilities, and power generating facilities in which a gas and a liquid are brought into mutual contact to perform chemical reaction, dissipation, absorption operation, and so on. More specifically, the gas-liquid contact apparatus include a bubble tower, a packed tower, a multitubular heat exchanger, and a multitubular reactor. In the bubble tower, operations such as chemical reaction, absorption operation and dissipation are executed. In the packed tower, operations such as chemical reaction, absorption operation and dissipation are performed with a solid material packed in the tower according to the invention. In the multitubular heat exchanger, heat exchange operation, accompanied by some chemical reaction in certain cases, is carried out. In the multitubular reactor, chemical reaction and heat exchange operation are performed simultaneously.

The aforementioned chemical reaction is not limited to specific operations. Typical examples are oxidization of an organic substance, oxidization of an inorganic substance, oxidization of a mixture of organic and inorganic substances, reduction and hydrogenation. The invention is also applicable to such operations as catalytic reaction, reactions without using a catalyst, and reactions using an enzyme, fungi or other microorganisms. The invention provides useful means especially when an improvement in gas-liquid contact behavior, or in contact operation between a solid such as a catalyst or fungi in a fixed bed and a gas-liquid mixture, is effective for improving the rate of reaction.

Materials to be packed in the tower are not limited to specific substances. Typical examples are solid catalysts, adsorbents, dispersing materials and filling materials, from which a suitable packed material is selected depending on specific applications. In wet oxidization operations, for instance, the packed material can be selected from various kinds of substances, which may be a solid catalyst including at least one of such metallic elements as titanium, iron, aluminum, silicon, zirconium, activated carbon, manganese, cobalt, nickel, tungsten, copper, cerium, silver, platinum, palladium, rhodium, gold, iridium and ruthenium, or a metallic compound of any of these metallic elements. Preferably, the solid catalyst contains titanium, iron, aluminum, silicon, zirconium and/or activated carbon as a principal element. It may further contain manganese, cobalt, nickel, tungsten, copper, cerium, silver, platinum, palladium, rhodium, gold, iridium and/or ruthenium as a secondary element. Adsorbents usable as a packed material include activated carbon, various resin materials such as iron exchange resins, and ceramics such as titania and zirconia. Such adsorbents may be shaped into a pellet like form, spherical form, granular form, ring like form, or honeycomb structure, for example.

Dispersing materials and filling materials to be used as a packed material include metals, resins and ceramics. These materials may be shaped into a pellet like form, spherical form, granular form, ring like form, honeycomb structure, mesh structure, or woven strip or mesh structure, for example.

Preferably, the packed material is held by a supporting framework although the supporting framework is not limited to a specific a specific structure. The supporting framework should however be able to securely retain on it the solid catalyst or other type of packed material and allow both the gas and liquid to pass through. Provided that the supporting framework has a sufficient strength to support the packed material, it is preferable that the supporting framework has as large an aperture ratio as possible so that the gas and liquid are fed into the packed material with minimal resistance. The supporting framework may be constructed of a grid having a latticelike structure, a flat perforated plate, or a corrugated perforated plate, for example. In one preferred arrangement, a latticelike grid having a sufficient strength to support the packed material is fixed to a support ring provided inside the tower and a wire-mesh screen or a perforated plate for preventing the packed material from falling down is placed on top of the grid although the actual arrangement may vary in specific details depending on the weight and shape of the packed material. More preferably, the grid is formed into a crisscrossed structure. This is because the grid having a crisscrossed structure can prevent sideway drifting of air bubbles which would occasionally occur when a wire-mesh screen is used. The crisscrossed grid can prevent such sideway drifting of air bubbles and uniformly supply the gas and liquid to the packed material retained on the supporting framework. It is preferable to construct the supporting framework and perforated plate in a one-piece unit since a simple construction can be achieved by doing so.

Each packed material may be loaded on the aforementioned supporting framework in any desired manner. It may be loaded directly on the supporting framework. The packed material other than a catalyst may be placed on the gas inflow side, and the catalyst on the gas outflow side. It is preferable to mount a heavier packed material or a wire-mesh screen on the gas outflow side of the catalyst to prevent scattering of the catalyst.

The wastewater treatment systems of the invention can be used in various water treatment applications where wastewater is treated with the aid of an oxygen-containing gas and, more particularly, in such applications where the wastewater is treated by using a wet oxidization process or an ozone-assisted oxidization process, for example.

The expression oxygen-containing gas as used in this invention refers to a gas containing molecular oxygen or ozone. When using a gas such as oxygen or ozone, it may be diluted by adding an inert gas. It is also possible to use an oxygen-enriched gas as well as other oxygen-containing exhaust gases discharged from other manufacturing plants. It is however most preferable to use atmospheric air because it is most abundant and least expensive.

Types of wastewater which can be treated by the wastewater treatment systems of the invention are not specifically limited. It may be industrial wastewater discharged from chemical plants, food processing facilities, metal processing facilities, metal plating facilities, pharmaceutical manufacturing facilities, pulp and paper manufacturing facilities, dyeing operation and dye manufacturing facilities, glass manufacturing facilities, power generating facilities, printing workshops, photographic processing facilities, and other industrial facilities, or household sewage or urine-containing effluent, for example.

One of the most effective applications of the gas-liquid dispersion device and gas-liquid contact apparatus of the invention is treatment of wastewater. They are quite suited to wastewater treatment by the use of the wet oxidization process, ozone-assisted oxidization process or an adsorbent. The wet oxidization process may employ a solid catalyst and/or an adsorbent. It may also use a homogeneous catalyst, or may not use any catalyst at all. Similarly, the ozone-assisted oxidization process employ a solid catalyst and/or an adsorbent. It may also use a homogeneous catalyst, or may not use any catalyst at all.

Among the aforementioned examples of wastewater treatment, the most effective applications are wastewater treatment by the wet oxidization process and wastewater treatment by the ozone-assisted oxidization process. Since these treatments utilize an oxygen-containing gas to oxidize, or decompose, harmful substances contained in wastewater, processing performance can be increased if improved states of gas-liquid dispersion and gas-liquid contact are attained in a mixture of the wastewater and oxygen-containing gas. It is particularly important to improve the states of gas-liquid dispersion and gas-liquid contact in a solid catalyst bed or an adsorbent bed when the wet oxidization process or ozone-assisted oxidization process is carried out by using a solid catalyst or an adsorbent. Since the wet oxidization process employing the solid catalyst or adsorbent is performed under high temperature and pressurized conditions, it is preferable to use the gas-liquid dispersion device and gas-liquid contact apparatus of the invention.

The wet oxidization process is a method of purifying wastewater by increasing its temperature to 140° C. to 370° C. and introducing an oxygen-containing gas into the wastewater under such a pressure that is high enough to keep the wastewater in a liquid phase. The maximum temperature to be maintained within a reaction tower in this method of wastewater treatment is at least 140° C. but not more than 370° C. It becomes impossible to maintain the liquid phase of the wastewater at 370° C. and over. On the contrary, if the temperature drops to less than 140° C., a significant reduction in treatment efficiency results and it becomes almost impossible to treat the wastewater. Preferably, the maximum temperature within the reaction tower is at least 160° C. but not more than 300° C. Temperatures of 300° C. and over require a considerably high pressure for keeping the wastewater in its liquid phase, and this results in an increase in not only equipment costs but also running costs. Treatment efficiency and wastewater purification power are usually low at temperatures below 160° C. In wastewater treatment techniques according to the invention, an operating pressure to be used in performing the wet oxidization process is determined depending on the treatment temperature. A general rule to be followed when determining the operating pressure is the pressure must be high enough to maintain the wastewater in its liquid phase.

The invention provides two basic constructions of gas-liquid dispersion devices. A gas-liquid dispersion device according to a first aspect of the invention is essentially a perforated plate which forms by itself a liquid-conducting channel. A gas-liquid dispersion device according to a second aspect of the invention comprises at least two partitioning members arranged with a specific distance therebetween, each partitioning member being formed of a single-hole plate, a perforated plate, a single-hole plate fitted with a collision plate or a perforated plate fitted with a collision plate.

A. FIRST ASPECT OF THE INVENTION

The basic construction of the gas-liquid dispersion device according to the first aspect of the invention is now described with reference to its individual components which include (A-1) liquid-conducting channels, (A-2) a perforated plate, (A-3) a single-hole plate or perforated plate fitted with a collision plate, and (A-4) a secondary single-hole plate or perforated plate.

A-1. Liquid-Conducting Channels

A-1-1. First Form of Liquid-Conducting Channels

In a first form of the invention, liquid-conducting channels are formed of liquid-conducting tubes, which may have a circular, elliptical, or polygonal cross section, for instance. Each liquid-conducting tube may be straight, having a fixed inside diameter or fixed sectional dimensions all along its length, or enlarged or reduced downstream in its inside diameter or sectional dimensions. Although it is desirable to produce the liquid-conducting tubes by using round tubes from the viewpoint of ease of manufacture, they may be produced by machining a flat sheet or corrugated sheet.

The liquid-conducting tubes thus constructed are located apart from any inside wall of a reaction vessel (tower) in which a gas-liquid passage is formed, and connected to the individual through holes made in a perforated plate. With this construction, a mixed-phase flow is divided into liquid and gas, which are guided to a liquid-conducting portion (liquid-conducting tubes) and a gas-dispersing portion (area of the perforated plate excluding the liquid-conducting tubes), respectively. A gas phase is formed in the gas-dispersing portion created underneath the perforated plate and the gas is dispersed into the liquid by way of the individual through holes in the perforated plate.

Although it is possible to connect the liquid-conducting tubes to some of the through holes which are originally intended for use as gas-dispersing through holes, it is desirable to make dedicated through holes for connecting the liquid-conducting tubes to ensure good dispersing effects. Furthermore, it is desirable that these liquid-conducting through holes have a larger aperture ratio than the gas-dispersing through holes. This is because such an arrangement makes it possible to reduce the area of the liquid-conducting portion within the whole area of the perforated plate, leaving a larger area for the gas-dispersing portion.

When the gas blows off from the through holes in the perforated plate, a pressure loss occurs in the gas-dispersing portion which excludes the liquid-conducting portion. As a result, a certain amount of gas corresponding to a water-gage measurement equivalent to this pressure loss is retained beneath the perforated plate, forming a gas pocket. The length of each liquid-conducting tube must therefore be made equal to or larger than the water-gage equivalent of the pressure loss to ensure good gas dispersing operation. Although there is not any specific limitations to the length of the liquid-conducting tubes from technical point of view, an excessive length would result in an increase in equipment costs and require a complicated arrangement for reinforcing the liquid-conducting tubes. Another problem is that a certain amount of liquid which is located above the lower ends of the liquid-conducting tubes will be held up beneath the perforated plate. On the contrary, if the liquid-conducting tubes are too short, the boundary surface between the gas and liquid within the gas-dispersing portion will be located below the lower ends of the liquid-conducting tubes, allowing the gas to enter the liquid-conducting tubes. Accordingly, the length of the liquid-conducting tubes must be set within a specified range.

It is preferable that the length of each liquid-conducting tube is at least 10 mm but not more than three times the diameter of the perforated plate. More preferably, it is at least 20 mm but not more than the diameter of the perforated plate, and most preferably, at least 30 mm but not more than one half of the diameter of the perforated plate.

The earlier-mentioned equivalent diameter refers to a numerical value obtained by dividing the sum of the lengths of all sides of a cross-sectional shape by 4. For example, the equivalent diameter of a square whose one side is 1000 mm long is 1000×4/4=1000 mm. Unless otherwise stated, the expressions diameter and inside diameter hereinafter used in this Specification include the equivalent diameter.

Now, a relationship between the equivalent diameter of each liquid-conducting tube and the number of liquid-conducting tubes is described. Too high a linear velocity of the liquid is likely to cause the gas to enter and pass through the liquid-conducting tubes, resulting in an increase in the pressure loss. On the contrary, if the linear velocity of the liquid is too low, the liquid-conducting tubes must occupy a larger area of the whole cross section of the gas-liquid passage, resulting in a reduction in gas dispersing effects. The equivalent diameter of each liquid-conducting tube and the number of liquid-conducting tubes are determined based on such consideration. More specifically, they are determined so that the linear velocity of the liquid falls within a range of 0.02 to 10 meters per second. More preferably, the linear velocity is 0.05 to 5 meters per second, and most preferably, 0.1 to 2 meters per second.

There should be provided at least one liquid-conducting tube per perforated plate at a maximum density of 200 liquid-conducting tubes per square meter. Preferably, the equivalent diameter of each liquid-conducting tube should be equal to or greater than the diameter of each through hole in the perforated plate but not more than 0.6 times the inside diameter or equivalent diameter of the reaction vessel. More preferably, the equivalent diameter of each liquid-conducting tube should be equal to or greater than three times the diameter or equivalent diameter of each through hole in the perforated plate but not more than 0.3 times the inside diameter or equivalent diameter of the reaction vessel. It desirable to bend the inflow end portion of each liquid-conducting tube into an elbow-shaped or L-shaped form or attach an umbrella-shaped cover to the inflow end of each liquid-conducting tube to prevent a bypass flow of gas.

A-1-2. Second Form of Liquid-Conducting Channels

In a second form of the invention, each liquid-conducting channel is formed between a partitioning plate and an inside surface of the reaction vessel.

A partitioning plate is attached to a peripheral portion of a perforated plate and extends toward the gas inflow side, forming a liquid-conducting channel between the perforated plate itself and the inside surface of the reaction vessel. If the reaction vessel has a circular cross section and the partitioning plate has a flat, platelike form, the liquid-conducting channel will have an arc-shaped cross section. If the partitioning plate is a hollow, cylindrical structure and is mounted concentrically in relation to the reaction vessel, an annular liquid-conducting channel is formed between the partitioning plate and the inside surface of the reaction vessel. The partitioning plate may extend parallel to the inside surface of the reaction vessel, broaden upward or narrow upward, forming a fan-like cross section. Although it is preferable to produce the partitioning plate by using a flat sheet from the viewpoint of ease of manufacture, an already press-formed curved plate or corrugated plate may used as an alternative.

Although it is possible to connect the liquid-conducting channel to a through hole which is originally intended for use as a gas-dispersing through hole, it is desirable to make a dedicated opening for connecting the liquid-conducting channel to ensure good dispersing effects. Furthermore, it is desirable that the opening conducting the liquid a larger aperture ratio than the gas-dispersing through holes in the perforated plate. This is because such an arrangement makes it possible to reduce the area of a liquid-conducting portion within the whole area of the perforated plate, leaving a larger area for a gas-dispersing portion. While the equivalent diameter of each liquid-conducting channel and the number of liquid-conducting channels are determined in a manner similar to the aforementioned liquid-conducting tubes, it is essential that there is provided at least one liquid-conducting channel.

When the gas blows off from individual through holes in the perforated plate, a pressure loss occurs in the gas-dispersing portion which excludes the liquid-conducting portion, in a similar way to what has already been described with reference to the liquid-conducting tubes. As a result, a certain amount of gas corresponding to a water-gage measurement equivalent to this pressure loss is retained beneath the perforated plate, forming a gas pocket. The length of each partitioning plate must therefore be made equal to or larger than the water-gage equivalent of the pressure loss to ensure good gas dispersing operation. Although there is not any specific limitations to the length of each partitioning plate from technical point of view, an excessive length would result in an increase in equipment costs and require a complicated arrangement for reinforcing each partitioning plate. Another problem is that a certain amount of liquid which is located above the lower edge of each partitioning plate will be held up beneath the perforated plate. On the contrary, if each partitioning plate is too short, a boundary surface between the gas and liquid within the gas-dispersing portion will be located below the lower edge of each partitioning plate, allowing the gas to enter the liquid-conducting channel. Accordingly, the length of each partitioning plate must be set within a specified range.

As described with reference to the liquid-conducting tubes, it is preferable that the length of each partitioning plate is at least 10 mm but not more than three times the diameter of the perforated plate.

It is preferable to mount a baffle immediately beneath each partitioning plate. Since the gas and liquid exist in a mixed phase beneath the liquid-conducting portion, the gas occasionally enters and passes through the liquid-conducting channel. This phenomenon may adversely affect gas-liquid contact operation depending on system status and the severity of the phenomenon. Such a problem can be avoided by installing a gas-interrupting baffle in the vicinity of the inflow opening of the liquid-conducting channel. Preferably, the baffle has such a shape that is suitable for covering the inflow opening of the liquid-conducting channel. More particularly, the baffle may be a flat plate or a curved plate, for example.

If the clearance between the inflow opening of the liquid-conducting channel and the baffle is 2 mm or less, equipment assembling and installation work would become difficult. Furthermore, a reduction in the cross-sectional area of a liquid passage between the inflow opening of the liquid-conducting channel and the baffle would result in an increase in linear velocity of the liquid, consequently causing an increase in pressure loss. This arrangement is undesirable since a gas pocket created at the gas-dispersing portion will loose its height, resulting in a reduction in dispersion efficiency. Moreover, such an arrangement is likely to cause clogging. It is also undesirable that the aforementioned clearance exceeds three times the equivalent diameter of the liquid-conducting channel because a stream of gas which has bounced back from the liquid-conducting channel after colliding with the baffle may be directed again toward the liquid-conducting channel. Accordingly, the clearance between the inflow opening of the liquid-conducting channel and the baffle should be at least 2 mm but not more than three times the equivalent diameter of the liquid-conducting channel. More preferably, it should at least be 5 mm but not more than one-and-a-half times the equivalent diameter of the liquid-conducting channel, and most preferably, at least 8 mm but not more than the equivalent diameter of the liquid-conducting channel.

A-2. Perforated Plate

The optimum aperture ratio of a perforated plate varies depending on the flow rate of gas, and the dispersion efficiency increases with an increase in the linear velocity of the gas passing through the perforated plate. As the linear velocity of the gas decreases, a gas pocket created beneath the perforated plate decreases, producing an uneven gas flow through the perforated plate. When the linear velocity of the gas further decreases, the gas pocket beneath the perforated plate will eventually disappear, producing an intensified uneven gas flow through the perforated plate. If the linear velocity of the gas becomes too high, the boundary surface between the gas and liquid beneath the perforated plate will become lower than the lower end of the liquid-conducting channel. This causes such a problem that some part of the gas ascends through the liquid-conducting channel.

The aperture ratio of the perforated plate must therefore be set so that a water-gage measurement equivalent to a pressure loss which occurs when the gas passes through the holes in the perforated plate becomes larger than the length of its liquid-conducting portion and the gas pocket created beneath the perforated plate has an appropriate height.

The linear velocity of the gas at the perforated plate should preferably be set within a range of 0.5 to 150 meters per second. More preferably, the linear velocity of the gas should be 1 to 100 meters per second, and most preferably, 2 to 60 meters per second. A preferable range of the aperture ratio of the perforated plate compared to the inside cross-sectional area of the reaction vessel is 0.005% to 30%. More preferably, the aperture ratio should be 0.05% to 10%, and most preferably, 0.1% to 3% although the optimum aperture ratio may deviate from these ranges depending on the liquid flow rate, gas flow rate, temperature, pressure and other factors in specific applications.

Although the dispersion efficiency increases with a reduction in the diameter of individual through holes in the perforated plate, a smaller diameter is more likely to cause clogging especially when a slurry is involved. In addition, precision machining of the through holes becomes difficult if the diameter is made so small. Taking into account the foregoing, the diameter of each through hole in the perforated plate should preferably be at least 0.1 mm but not more than one-fourth of the diameter (or equivalent diameter) of the perforated plate. More preferably, the diameter of each through hole should be at least 1 mm but not more than one-tenth of the diameter (or equivalent diameter) of the perforated plate, and most preferably, at least 3 mm but not more than ½0th of the diameter (or equivalent diameter) of the perforated plate. Although it is preferable that the perforated plate has as large a number of through holes as possible, the actual number of through holes is usually determined based on a relationship between the aperture ratio and hole diameter. Each through hole to be formed in the perforated plate is not limited to a specific structure in this invention. It is however preferable that each through hole is formed into a cylindrical or truncated cone structure from the viewpoint of machinability. It is generally preferable that the individual through holes have the same diameter. Basically the same dispersing effect is obtained, however, even when the through holes are formed into different diameters.

In the following discussion, a gas-liquid dispersion device consisting essentially of a perforated plate having a liquid-conducting portion and a gas-dispersing portion are formed is referred to as the gas-liquid dispersion device provided with a liquid-conducting channel. The expression "gas-liquid dispersion device" is used as a generic term encompassing the aforementioned gas-liquid dispersion device provided with the liquid-conducting channel, and a later-described gas-liquid dispersion device provided with not only a liquid-conducting channel but also a single-hole plate or perforated plate fitted with a collision plate, or a secondary single-hole plate or perforated plate.

A-3. Single-Hole Plate and Perforated Plate Fitted with a Collision Plate

If the collision plate is too small in diameter, rising masses of gas will not collide with the collision plate, and ascend without being dispersed in its radial directions. If its diameter is too large, the gas will not be dispersed properly toward a central portion of a gas-liquid contact apparatus. Accordingly, it is preferable that the ratio of the diameter (or equivalent diameter) $D_2$ of the collision plate to the diameter (or equivalent diameter) $D_1$ of a through hole falls within a range of 0.5 to 10.0. More preferably, the ratio $D_2/D_1$ should be 1.0 to 5.0, and most preferably, 1.5 to 3.0.

If the distance $H_0$ from the single-hole plate or perforated plate to the collision plate is too large, rising masses of gas will ascend without colliding with the collision plate. If the distance $H_0$ is too small, an excessive pressure loss will occur and the gas will not be dispersed properly toward the central portion of the gas-liquid contact apparatus. Accordingly, it is preferable that the distance $H_0$ between the single-hole plate or perforated plate and the collision plate is 0.05 to 5.0 times the diameter (or equivalent diameter) $D_1$ of the through hole. More preferably, the ratio $H_0/D_1$ should be 0.1 to 3.0, and most preferably, 0.2 to 1.0. When $H_0/D_1=$ 0.25, the area of the curved side surface of an imaginary cylinder having the same diameter as the through hole becomes equal to the cross-sectional area of the through hole. This may be used as a design reference.

Either the single-hole plate or perforated plate fitted with a collision plate must have a larger aperture area than the perforated plate having the liquid-conducting channel since both the gas and liquid pass through the former. The distance from the lower end of the liquid-conducting channel to the single-hole plate or perforated plate fitted with the collision plate should preferably be at least one half of the diameter of each hole in the perforated plate but not more than one-and-a-half times the inside diameter of the apparatus. More preferably, the distance should be equal to or larger than the diameter of each hole in the perforated plate but not more than the inside diameter of the apparatus. Most preferably, the distance should be at least twice as large as the diameter of each hole in the relevant perforated plate but not more than one half of the inside diameter of the apparatus. It is to be noted that the liquid-conducting channel will produce vibrations and the boundary surface between the gas and liquid will become unstable when the aforementioned distance becomes less than one half of the diameter of each hole in the perforated plate. If the aforementioned distance exceeds the inside diameter of the apparatus, there will be created a special zone in which gas dispersing operation is unstable above the single-hole plate or perforated plate fitted with the collision plate. This will cause an internal oxide layer to peel off in wet oxidization, subsequently causing corrosion of internal metallic parts. Moreover, the state of gas-liquid dispersion accomplished will not be good enough and the internal space of the apparatus can not be fully used.

A-4. Secondary Single-Hole Plate and Perforated Plate

A secondary single-hole plate and a secondary perforated plate have basically the same construction as the above-described perforated plate, except that they are not provided with any dedicated liquid-conducting channels.

In the above-described gas-liquid dispersion device provided with the liquid-conducting channel according to the first aspect of the invention, a gas pocket holding a vapor phase is formed on the gas inflow opening side of the device when the gas and liquid are supplied into a system in which the liquid flows forming a continuous phase and the gas flows upward. The gas pocket acts as a buffer which serves to prevent pulsation of gas and liquid flows. The liquid passes through the liquid-conducting channel of the device while the gas passes through the individual through holes (excluding the liquid-conducting channel) in the perforated plate. This produces an agitating effect on the outflow opening side of the through holes so that the gas is uniformly dispersed within the liquid.

According to the first aspect of the invention, the gas-liquid dispersion device provided with not only the liquid-conducting channel but also the single-hole plate or perforated plate fitted with the collision plate provides enhanced gas-liquid dispersing effect and pulsating flow suppression capabilities. This configuration is more preferable than a configuration including a secondary perforated plate mounted below the gas-liquid dispersion device provided with the liquid-conducting channel because a more stable gas flow is obtained. Either the single-hole plate or perforated plate fitted with the collision plate has the ability to disperse the gas rising through each hole in radial directions. Therefore, a stable vapor phase is obtained on the gas inflow opening side of another gas-liquid dispersion device provided with a liquid-conducting channel mounted above the single-hole plate or perforated plate fitted with the collision plate.

According to the first aspect of the invention, a bubble-tower-type gas-liquid contact apparatus incorporating in its tower one or more gas-liquid dispersion devices of the aforementioned construction provides a uniform and stable state of gas-liquid dispersion without producing pulsating flows. Furthermore, the liquid does not flow in a direction opposite to its normal flow direction through the gas-liquid dispersion device provided with the liquid-conducting channel so that the liquid flows in only one direction in a stable manner. It is therefore possible to accomplish a successful gas-liquid contact operation. If a plurality of gas-liquid dispersion devices are incorporated in a tower, it is possible to perform gas-liquid contact operation using a continuous, multi-stage configuration.

In a configuration incorporating a packed material in a tower according to the first aspect of the invention, it is possible to achieve an improved state of gas-liquid dispersion within the packed material. If the packed material is a catalyst, it is possible to achieve an improved state of gas-liquid-solid contact and uniform reaction throughout a catalyst bed. This results in an increase in the amount of catalyst which is actually brought into effective contact with the gas and liquid and an improvement in the rate of reaction.

In a vertical multitubular heat exchanger provided with the gas-liquid dispersion device according to the first aspect of the invention, a gas is uniformly dispersed into a number of tubes. The gas and liquid are brought into uniform contact with each other within the tubes, resulting in an increase in heat exchange efficiency. Since the gas is uniformly distributed to the individual tubes, it is possible to prevent excessive or insufficient gas supplies to certain tubes. This serves to further prevent overheating of certain tubes, reduction in heat exchange efficiency and other operational problems caused by corrosion due to excessive density, deposition, adhesion of dirt or clogging of the tubes. In a system in which a mixture of air and water solution of salt is heated, for example, an excessive supply of air accelerates evaporation of water, resulting in excessive condensation of the solution. As this is likely to cause deposition, adhesion of dirt and clogging of the tubes, the gas-liquid dispersion device of the invention is useful in this kind of application.

According to the first aspect of the invention, a gas-liquid contact apparatus like a multitubular heat exchanger type reactor which incorporates a gas-liquid dispersion device having a liquid-conducting channel provides an increased heat exchange efficiency and a wider range of controllable reaction temperatures. This is because the gas is uniformly dispersed within a number of tubes. Furthermore, pulsation of gas and liquid flows is suppressed and the gas and liquid are uniformly dispersed, resulting in an increase in effective reaction zone (volume), an improvement in the state of gas-liquid contact, and an eventual increase in reaction efficiency.

A wastewater treatment system incorporating any of the gas-liquid dispersion devices according to the first aspect of the invention can treat wastewater at a high efficiency because an oxygen-containing gas is uniformly supplied to organic and inorganic salt components contained in the wastewater.

B. SECOND ASPECT OF THE INVENTION

The basic construction of the gas-liquid dispersion device according to the second aspect of the invention is now described with reference to first and second examples, in which the gas-liquid dispersion device is installed in empty and packed towers, respectively.

Figure 22:
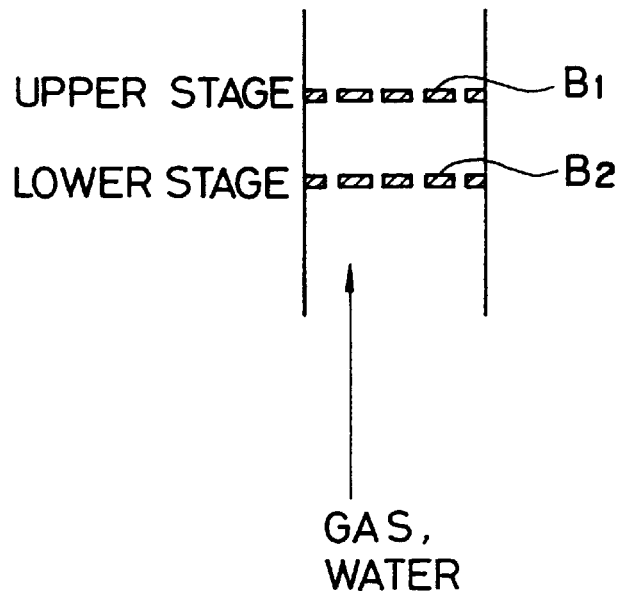
FIG. 22 is a schematic diagram illustrating an empty-tower-type configuration in which co-current operation is performed according to a second aspect of the invention.
Figure 23:
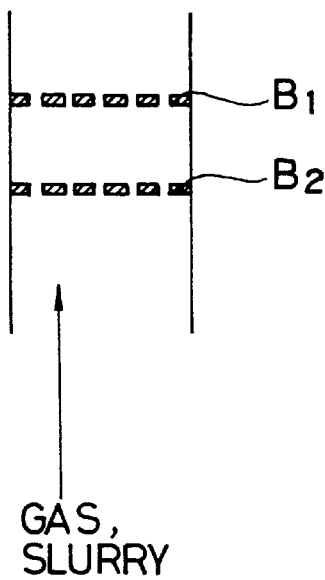
FIG. 23 is a schematic diagram illustrating another empty-tower-type configuration in which co-current operation is performed according to the second aspect of the invention.
Figure 24:
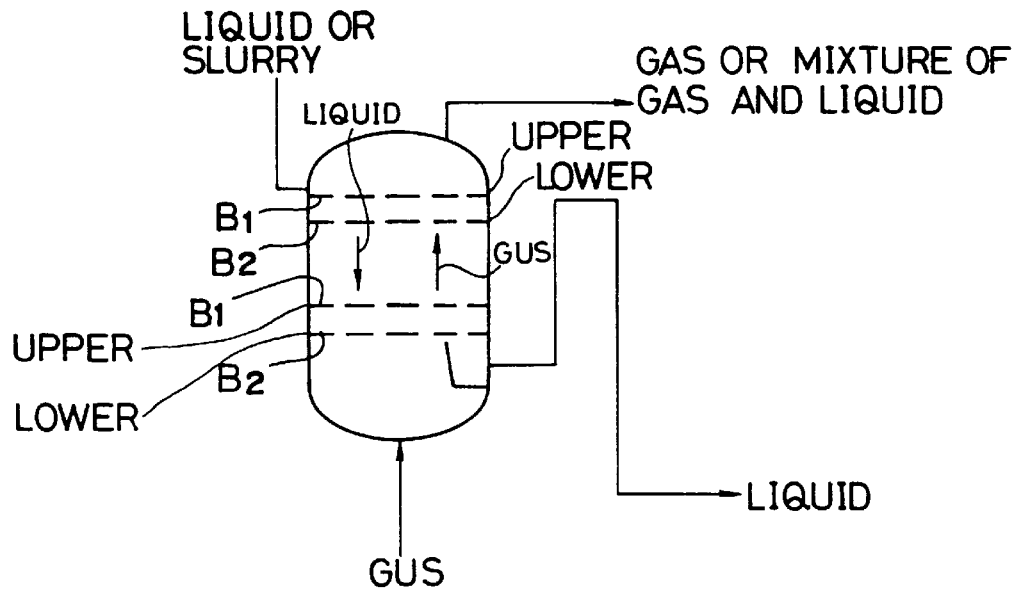
FIG. 24 is a schematic diagram illustrating an empty-tower-type configuration in which countercurrent operation is performed according to the second aspect of the invention.
Figure 25:
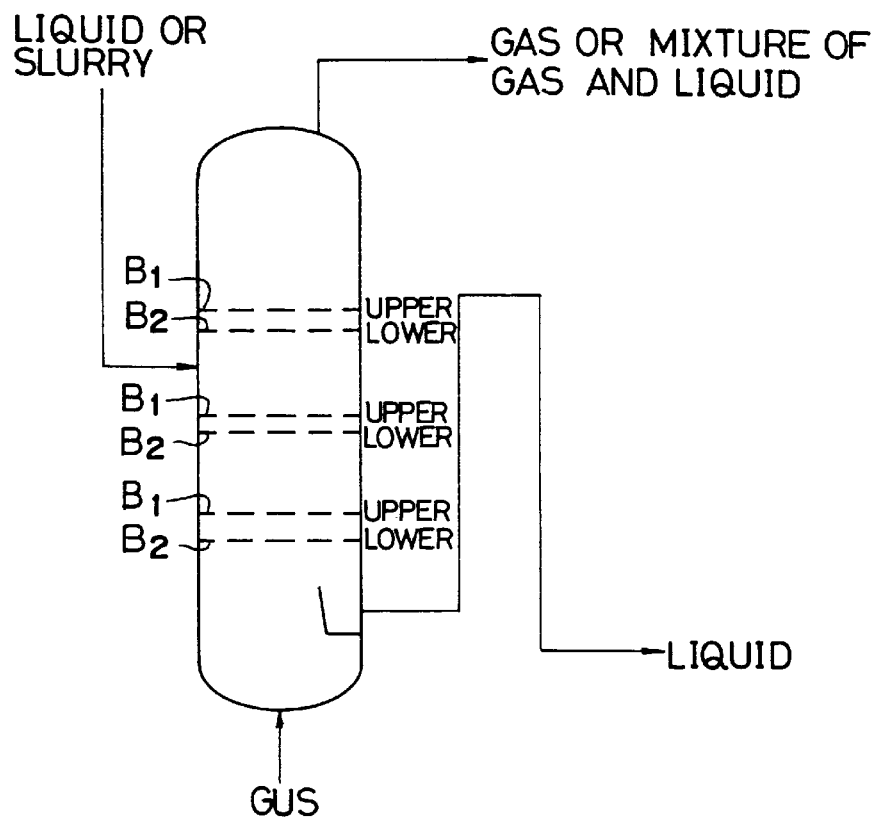
FIG. 25 is a schematic diagram illustrating another empty-tower-type configuration in which countercurrent operation is performed according to the second aspect of the invention.

There are several configurations in empty-tower application as shown in FIGS. 22 to 25. FIG. 22 shows a configuration in which a gas and a liquid flow upward from a lower part of an empty tower. FIG. 23 shows a configuration in which a gas and a slurry flow upward from a lower part of an empty tower. FIG. 24 shows a configuration in which a gas is introduced from a lower part of an empty tower while a liquid or a slurry is introduced from its upper part. In this configuration, the introduced gas (which may include part of the liquid) is recovered from an upper part of the empty tower while the introduced liquid or slurry is recovered from a lower part of the empty tower. FIG. 25 shows a configuration in which a liquid or a slurry is introduced to an empty tower from approximately the middle of its height while a gas is introduced from a lower part of the empty tower. In this configuration, the introduced gas (which may include part of the liquid) is recovered from an upper part of the empty tower while the introduced liquid or slurry is recovered from a lower part of the empty tower.

FIGS. 22 and 23 show systems for performing co-current operation whereas FIGS. 24 and 25 show systems for performing countercurrent operation. As shown in these Figures, the liquid and the slurry may flow either upward or downward as long as the gas flows continuously upward and the liquid, or the slurry, forms a continuous phase.

Figure 26:
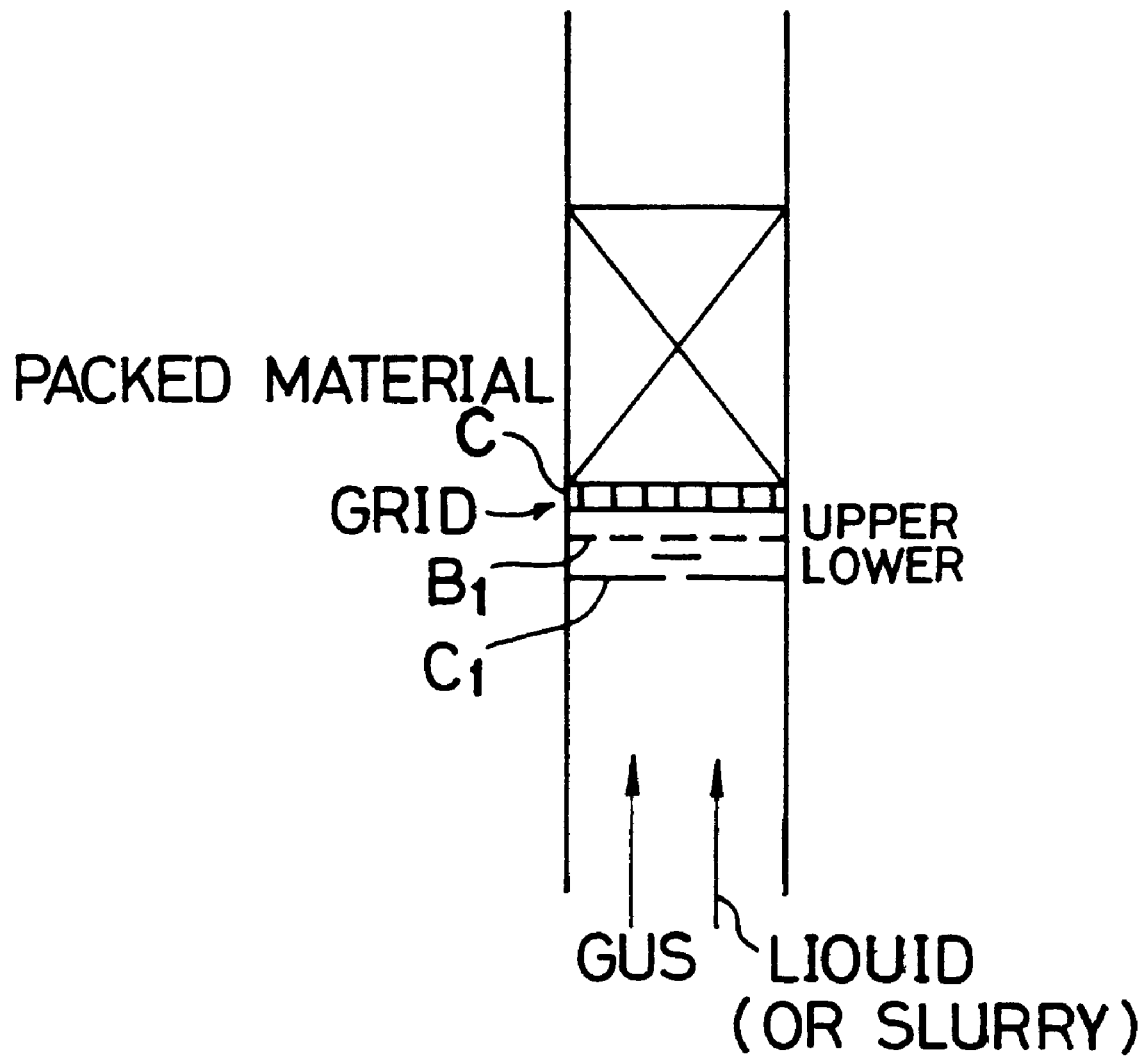
FIG. 26 is a schematic diagram illustrating a packed-tower-type configuration in which co-current operation is performed according to the second aspect of the invention.
Figure 27:
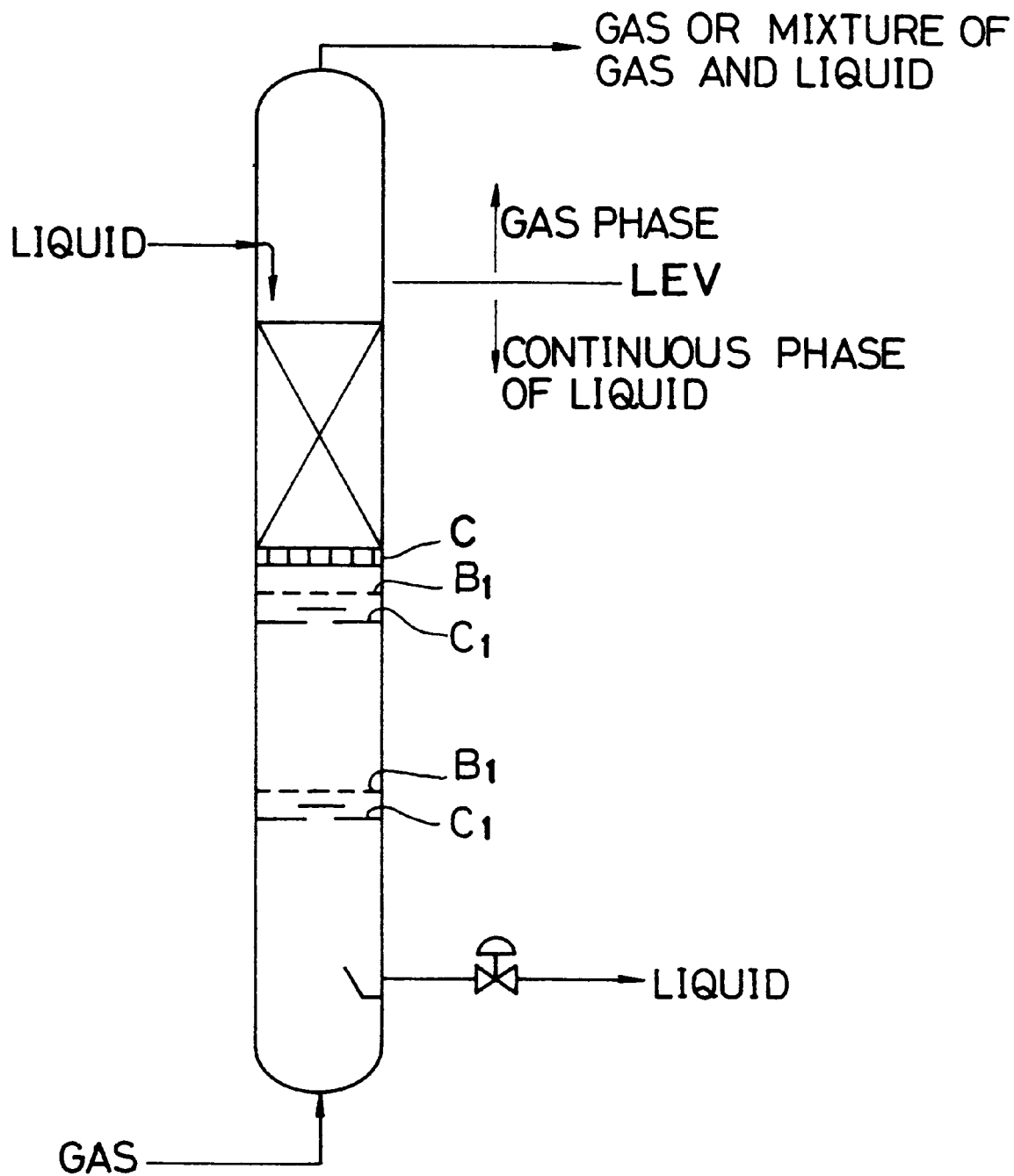
FIG. 27 is a schematic diagram illustrating a packed-tower-type configuration in which countercurrent operation is performed according the second aspect of the invention.

Packed-tower configurations are shown in FIGS. 26 and 27. FIG. 26 shows a configuration in which a gas and a liquid (or slurry) flow upward from a lower part of a packed tower. FIG. 27 shows a configuration in which a gas is introduced from a lower part of a packed tower while a liquid is introduced from its upper part. In this configuration, the introduced gas (which may include part of the liquid) is recovered from an upper part of the packed tower while the introduced liquid is recovered from a lower part of the packed tower. In such packed-tower configurations, the gas flows upward from the bottom to the top of the tower, but the liquid (or slurry) may flow either upward or downward as long as it forms a continuous phase.

Referring to FIG. 27, a gas phase is formed in a portion above a boundary line designated by LEV while a continuous phase of liquid is formed in a portion below boundary line LEV. In FIGS. 22 to 27, the reference numerals $B_1$ and $B_2$ indicate perforated plates while the reference numeral $C_1$ indicates single-hole plates fitted with respective collision plates. These perforated plates $B_1$, $B_2$ and single-hole plates $C_1$ constitute partitioning members dividing the internal space of the tower. Designated by the letter C in FIGS. 26 and 27 are grids for supporting a packed material such as a catalyst.

The construction according to the second aspect of the invention is now described with reference to its individual components which include (B-1) a single-hole plate having a single through hole, (B-2) a perforated plate having a plurality of through holes, (B-3) a single-hole plate having a single through hole provided with a collision plate fitted close to an outflow opening of the through hole, and (B-4) a perforated plate having a plurality of through holes provided with a collision plate fitted close to outflow openings of the through holes. In the following discussion, the expressions diameter includes the earlier-defined equivalent diameter.

B-1. Single-Hole Plate

The aperture ratio of a single-hole plate 201 shown in FIG. 28A is determined so that a gas preferably flows at a linear velocity of 0.5 to 150 meters per second through a hole in the single-hole plate 201. More preferably, the linear velocity of the gas should be 1 to 100 meters per second, and most preferably, 2 to 50 meters per second although the optimum setting of the aperture ratio may deviate depending on the liquid flow rate, gas flow rate, temperature, pressure and other conditions.

Specifically, a preferable range of the aperture ratio of the single-hole plate 201 compared to the inside cross-sectional area of a gas-liquid contact apparatus is 0.005% to 30%. More preferably, it is 0.05% to 10%, and most preferably, 0.1% to 3% although the optimum aperture ratio may deviate from these ranges depending on the liquid flow rate, gas flow rate, temperature, pressure and other factors in specific applications. The diameter $E_1$ of the hole in the single-hole plate 201 is properly determined depending on the aperture ratio of the single-hole plate 201. The hole formed in the single-hole plate 201 is not limited to specific structure in this invention. It is however preferable that it is formed into a cylindrical or truncated cone structure from the viewpoint of machinability. Although the location of the hole is not specifically limited, it is preferable to make the hole at the center of the single-hole plate 201.

B-2. Perforated Plate

The aperture ratio of a perforated plate 202 shown in FIG. 28B is determined based on the same design consideration as described above with reference to the single-hole plate 201. The single-hole plate 201 and the perforated plate 202 may have the same aperture ratio or different aperture ratios. To achieve uniform dispersion, the diameter $E_1$ of each through hole in the perforated plate 202 should preferably be made as small as possible, and the number of through holes should be as large as possible, insomuch as a small tolerance and good machinability are maintained. The same design consideration can be used with reference to the structure of the individual through holes in the perforated plate 202.

The optimum aperture ratio of the perforated plate 202 varies depending on the gas flow rate. Considering that the dispersion efficiency increases with an increase in the linear velocity of the gas, the aperture ratio of the perforated plate 202 is determined so that the gas preferably flows at a linear velocity of 0.5 to 150 meters per second through the holes in the perforated plate 202. More preferably, the linear velocity of the gas should be 1 to 100 meters per second, and most preferably, 2 to 50 meters per second. Specifically, a preferable range of the aperture ratio of the perforated plate 202 is 0.005% to 30%. More preferably, it is 0.05% to 10%, and most preferably, 0.1% to 3% although the optimum aperture ratio may deviate from these ranges depending on the liquid flow rate, gas flow rate, temperature, pressure and other factors in specific applications.

If the aperture ratio becomes higher than the aforementioned ranges, a distinct boundary surface between the gas and liquid disappears, and masses of gas bearing the influence of an upstream gas flow pass through the holes in the perforated plate 202, causing an uneven flow at the perforated plate 202. If the aperture ratio is set too small, a pressure loss at the perforated plate 202 increases although the uneven flow is eliminated. Generally speaking, a reduction in the diameter of each through hole in the perforated plate 202 results in an increase in the dispersion efficiency. The gas-liquid contact efficiency also increases because gas bubbles having smaller diameters provide a larger area of contact surface between the gas and liquid. It is to be pointed out, however, that a smaller diameter is more likely to cause clogging especially when a slurry is involved. In addition, precision machining of the through holes becomes difficult if the diameter is made so small. Taking into account the foregoing, the diameter (or equivalent diameter) of each through hole in the perforated plate 202 should preferably be at least 0.1 mm but not more than one-fourth of the diameter (or equivalent diameter) of the perforated plate 202. More preferably, the diameter (or equivalent diameter) of each through hole should be at least 1 mm but not more than one-tenth of the diameter (or equivalent diameter) of the perforated plate 202, and most preferably, at least 3 mm but not more than ½0th of the diameter (or equivalent diameter) of the perforated plate 202. Although it is preferable that the perforated plate 202 has as large a number of through holes as possible, the actual number of through holes is usually determined based on a relationship between the aperture ratio and hole diameter. It is generally preferable that the individual through holes have the same diameter. Basically the same dispersing effect is obtained, however, even when the through holes are formed into different diameters.

Although the location of the individual holes is not specifically limited, it is preferable that they are distributed as uniformly as possible over the whole surface of the perforated plate 202. For example, the holes may arranged in a crisscross pattern, triangular pattern, or other appropriate lattice pattern.

B-3. Single-Hole Plate Fitted with a Collision Plate

The aperture ratio of a single-hole plate 203 fitted with a collision plate shown in FIG. 28C is determined in basically the same manner as described above with reference to the perforated plate 202. If the collision plate is too small in diameter, rising masses of gas will not collide with the collision plate, and ascend without being dispersed in its radial directions. If its diameter is too large, the gas will not be dispersed properly toward a central portion of a gas-liquid contact apparatus. If the distance $H_0$ from the single-hole plate to the collision plate is too large, rising masses of gas will ascend without colliding with the collision plate. If the distance $H_0$ is too small, an excessive pressure loss will occur and the gas will not be dispersed properly toward the central portion of the gas-liquid contact apparatus.

Accordingly, it is preferable that the ratio of the diameter (or equivalent diameter) $E_2$ of the collision plate to the diameter (or equivalent diameter) $E_1$ of a through hole in the single-hole plate 3 falls within a range of 0.5 to 10.0. More preferably, the ratio $E_2/E_1$ should be 1.0 to 5.0, and most preferably, 1.5 to 3.0.

It is preferable that the ratio of the distance $H_0$ between the single-hole plate and the collision plate to the diameter (or equivalent diameter) $E_1$ of the through hole is 0.05 to 5.0. More preferably, the ratio $H_0/E_1$ should be 0.1 to 3.0, and most preferably, 0.2 to 1.0. When $H_0/E_1=0.25$, the area of the curved side surface of an imaginary cylinder having the same diameter as the through hole becomes equal to the cross-sectional area of the through hole. This may be used as a design reference. The same design consideration as described with reference to the single-hole plate 1 can be used in determining the diameter, structure and location of the through hole.

While the collision plate is not specifically limited in its shape, a flat circular disk, flat polygonal shape, conical or inverted conical shape, and pyramid or inverted pyramid shape are examples of preferred structure for achieving a desired dispersing effect in all radial directions. Among these candidates, the flat circular disk structure is most preferable, taking into account its ease of manufacture.

B-4. Perforated Plate Fitted with a Collision Plate

The aperture ratio of a perforated plate 204 fitted with a collision plate shown in FIG. 28D can be determined in a similar way to the perforated plate 202. Criteria used in determining the ratios $E_2/E_1$ and $H_0/E_1$ of the single-hole plate 3 fitted with the collision plate can also be applied to the perforated plate 4 fitted with the collision plate. The diameter, structure, arrangement and location of the through holes to be formed in the perforated plate 204 can be determined in the same way as already explained with reference to the perforated plate 202. It is preferable that the perforated plate 204 has at least 0.2 through holes per square meter.

In the above-described components (B-3) and (B-4), it is not preferable to set he ratio $E_2/E_1$ of the outside diameter $E_2$ of the collision plate to the diameter $E_1$ of the through hole(s) in the single-hole plate 203 (perforated plate 204) to less than 0.5. This is because less than 100% of the mixed-phase flow of the gas and liquid that has passed through the through hole(s) in the single-hole plate 203 (perforated plate 204) actually collides with the collision plate, resulting in a loss of the gas-liquid dispersing effect. On the contrary, if the ratio $E_2/E_1$ is made larger than 10, the gas-liquid dispersing effect may decrease at the middle of the gas-liquid contact apparatus. This is because when the mixed-phase flow of the gas and liquid that has collided with the collision plate disperses and moves upward from around the collision plate, a dead zone is created just above the collision plate as its outside diameter is too large. This phenomenon is likely to cause a reduction in the gas-liquid dispersing effect at the middle of the gas-liquid contact apparatus.

If the ratio $H_5/E_1$ is less than 0.05, significant pressure losses are likely to occur as the gas and liquid collide with the collision plate and flow out in its radial directions. This is not desirable because oscillation (undulating vibrations) of the single-hole plate 203 (perforated plate 204) and/or collision plate caused by such pressure losses may result in fatigue fracture of the single-hole plate 203 (perforated plate 204). Contrarily, if the ratio $H_5/E_1$ is made larger than 5.0, the gas and liquid loosely disperse in a fan-like broadening form immediately after the mixed-phase flow of the gas and liquid has passed through the through hole. Collision-assisted dispersing effect is not expected to be obtainable from the collision plate when the distance between the single-hole plate 203 (perforated plate 204) and collision plate is made so large.

Different combinations and arrangements of the aforementioned components (partitioning members) according to the second aspect of the invention are now described using examples in which both gas and liquid flow upward. The expression "liquid" should be understood as encompassing a slurry in this context.

B-5. Gas-Liquid Dispersion Device Incorporating a Perforated Plate on Upstream Side and a Single-Hole Plate on Downstream Side The gas which has passed through the holes in the perforated plate moves upward while agitating the liquid within a gas-liquid dispersion device. Both the gas and liquid are continuously ejected upward through the hole in the single-hole plate. Pulsation is suppressed since the space between the two plates (partitioning members) is kept constantly agitated.

B-6. Gas-Liquid Dispersion Device Incorporating a Single-Hole Plate or Perforated Plate on Upstream Side and a Perforated Plate on Downstream Side The gas which has passed through the hole(s) in the single-hole plate or perforated plate on the upstream side moves upward while agitating the liquid within a gas-liquid dispersion device. Both the gas and liquid are continuously ejected upward through the holes in the perforated plate on the downstream side. Pulsation is suppressed since the space between the two plates (partitioning members) is kept constantly agitated. The gas and liquid are dispersed uniformly in all radial directions thanks to the perforated plate mounted on the downstream side.

B-7. Gas-Liquid Dispersion Device Incorporating a Single-Hole Plate Fitted with a Collision Plate on Upstream Side and a Perforated Plate on Downstream Side The gas which has passed through the hole in the single-hole plate fitted with the collision plate collides with the collision plate and is dispersed in its radial directions. Then, the gas moves upward while agitating the liquid within a gas-liquid dispersion device. Both the gas and liquid are continuously ejected upward through the holes in the perforated plate on the downstream side. Pulsation is suppressed since the space between the two plates (partitioning members) is kept constantly agitated. The gas and liquid are dispersed more uniformly in all radial directions thanks to the perforated plate mounted on the downstream side and an additional dispersing effect exerted by the collision plate located on the upstream side.

B-8. Gas-Liquid Dispersion Device Incorporating a Perforated Plate Fitted with a Collision Plate on Upstream Side and a Perforated Plate on Downstream Side The gas which has passed through the holes in the single-hole plate fitted with the collision plate collides with the collision plate and is dispersed in its radial directions. Then, the gas moves upward while agitating the liquid within a gas-liquid dispersion device. Both the gas and liquid are continuously ejected upward through the holes in the perforated plate on the downstream side. Pulsation is suppressed since the space between the two plates (partitioning members) is kept constantly agitated. The gas and liquid are dispersed more uniformly in all radial directions thanks to the perforated plate mounted on the downstream side and an additional dispersing effect exerted by the collision plate located on the upstream side.

A further improvement in the gas-liquid dispersing effect and a reduction in pulsating flows will be achieved if an additional partitioning member is mounted on the upstream side of any of the aforementioned gas-liquid dispersion devices (B-5 to B-8). It is desirable to use a perforated plate fitted with a collision plate or a single-hole plate fitted with a collision plate as such additional partitioning member.

According to the second aspect of the invention, a gas-liquid contact apparatus incorporating in its tower a catalyst mounted on a supporting framework provides an improved state of gas-liquid dispersion and uniform reaction within the whole body of the catalyst, resulting in an improvement in the rate of reaction.

According to the second aspect of the invention, a plurality of gas-liquid dispersion devices can be installed in a tower to perform gas-liquid contact operation using a continuous, multi-stage configuration.

In a gas-liquid contact apparatus equipped with the gas-liquid dispersion device according to the second aspect of the invention in a tube side intake channel of a multitubular heat exchanger, a gas is uniformly dispersed into a number of tubes. The gas and liquid are brought into uniform contact with each other within the individual tubes, resulting in an increase in heat exchange efficiency.

In a reactor incorporating the gas-liquid dispersion device according to the second aspect of the invention, pulsation of gas and liquid flows is suppressed and the gas and liquid are uniformly dispersed, resulting in an increase in effective reaction zone (volume), an improvement in the state of gas-liquid contact, and an eventual increase in reaction efficiency. The reaction efficiency is similarly improved in a catalytic reactor since the amount of catalyst which is actually brought into effective contact with the gas and liquid increases.

According to the second aspect of the invention, a gas-liquid contact apparatus like a multitubular heat exchanger type reactor which incorporates a gas-liquid dispersion device having a liquid-conducting channel provides an increased heat exchange efficiency and a wider range of controllable reaction temperatures. This is because the gas is uniformly dispersed within a number of tubes. Furthermore, pulsation of gas and liquid flows is suppressed and the gas and liquid are uniformly dispersed, resulting in an increase in effective reaction zone (volume), an improvement in the state of gas-liquid contact, and an eventual increase in reaction efficiency.

A wastewater treatment system incorporating any of the gas-liquid dispersion devices or gas-liquid contact apparatus constructed according to the second aspect of the invention can treat wastewater at a high efficiency because an oxygen-containing gas is uniformly supplied to organic and inorganic salt components contained in the wastewater.

Figure 29:
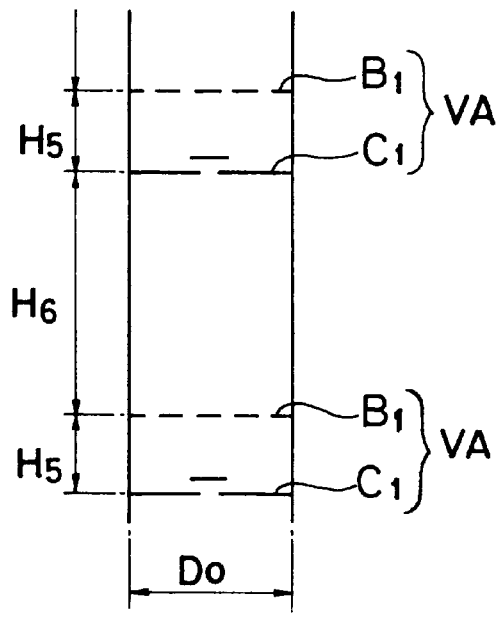
FIG. 29 is a schematic diagram illustrating an empty-tower-type configuration according the second aspect of the invention.
Figure 30:
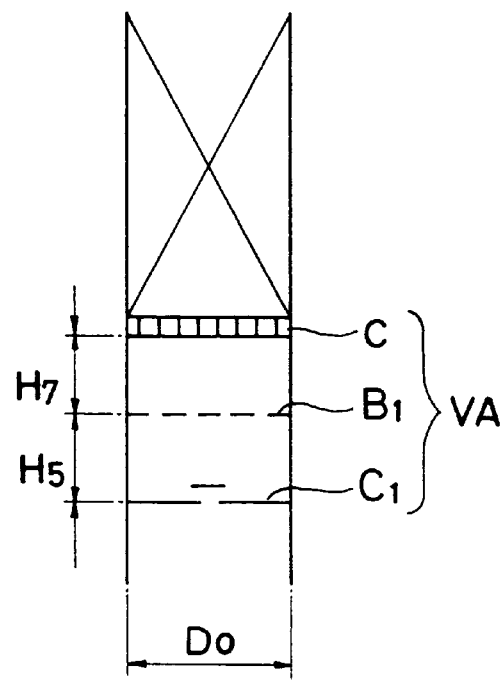
FIG. 30 is a schematic diagram illustrating a packed-tower-type configuration according the second aspect of the invention.

FIGS. 29 and 30 show preferred configurations of the aforementioned components (partitioning members) according to the second aspect of the invention.

FIG. 29 is a schematic diagram illustrating an empty-tower-type configuration. Preferably, the distance $H_1$ between a perforated plate $A_1$ and a single-hole plate $B_1$ fitted with a collision plate of each gas-liquid dispersion device VA in this configuration is at least one half of the diameter of a through hole in the single-hole plate $B_1$ but not more than one-and-a-half times the inside diameter (or equivalent diameter) of the tower. More preferably, the distance $H_5$ is equal to or larger than the diameter of the through hole in the single-hole plate $C_1$ but not more than the inside diameter (or equivalent diameter) of the tower. Even more preferably, the distance $H_1$ is at least twice as large as the diameter of the through hole in the single-hole plate $C_1$ but not more than one half of the inside diameter (or equivalent diameter) of the tower. Although the distance $H_2$ between two gas-liquid dispersion devices VA is not specifically limited, it is preferably $0.3D_0$ to $10D_0$, and more preferably $0.5D_0$ to $5D_0$, where $D_0$ is the inside diameter (or equivalent diameter) of the tower.

If the distance $H_6$ is too large, the mixture of gas and liquid will become progressively uneven toward the top of the tower and, therefore, it is difficult to effectively perform gas-liquid contact operation. On the contrary, if the distance $H_6$ is too small, a larger number of gas-liquid dispersion devices VA are to be incorporated per unit volume of the tower. This is not desirable either, because the configuration becomes rather complicated.

FIG. 30 is a schematic diagram illustrating a packed-tower-type configuration. The distance $H_5$ between a perforated plate $B_1$ and a single-hole plate $C_1$ fitted with a collision plate and the distance $H_6$ between one gas-liquid dispersion device VA and another (not shown) are determined using the same criteria as described above for the empty-tower-type configuration. If the distance $H_6$ is too large, the gas-liquid dispersing effect is reduced above a packed bed. This will cause uneven flows of gas and liquid, making it difficult to effectively perform gas-liquid (or gas-liquid-solid) contact operation. On the contrary, if the distance $H_6$ is too small, a larger number of gas-liquid dispersion devices VA are to be incorporated per unit volume of the tower, resulting in a complicated equipment configuration.

PREFERRED EMBODIMENTS ACCORDING TO THE FIRST ASPECT OF THE INVENTION

Gas-liquid dispersion devices and gas-liquid contact apparatus according to the first aspect of the invention are now described with reference to its preferred embodiments which are illustrated in FIGS. 1 to 21.

Figure 1B:
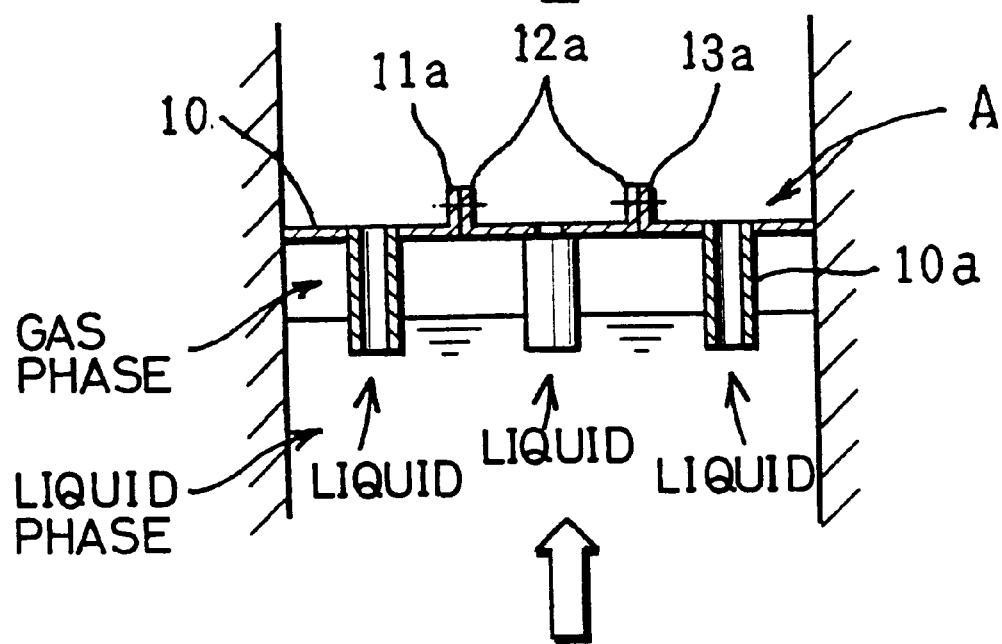

FIG. 1A is a plan view illustrating a basic construction of a gas-liquid dispersion device A having liquid-conducting channels according to the first aspect of the invention, and FIG. 1B is a sectional front view of the same. The gas-liquid dispersion device A having the liquid-conducting channels shown in FIGS. 1A–1B is located in a system in which a liquid flows forming a continuous phase and a gas flows upward, whereby the gas and liquid (or slurry) are dispersed uniformly in a circumferential direction of the gas-liquid dispersion device A and in a flow direction.

The gas-liquid dispersion device A of the basic construction includes a perforated plate 10 which is so mounted that a gas-liquid passage is interrupted, the perforated plate 10 having a plurality of holes $h_1$ to $h_{11}$ with liquid-conducting tubes 10a which serve as the liquid-conducting channels projecting from around the circumferences of the holes $h_2$, $h_5$, $h_7$ and $h_{10}$ toward their gas inflow opening side.

Figure 2:
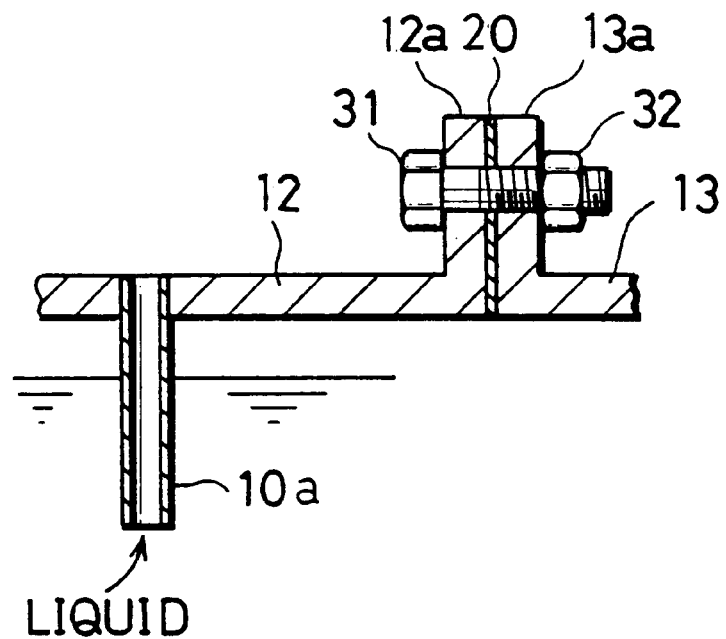
FIG. 2 is an enlarged sectional view of the gas-liquid dispersion device in which liquid-conducting channels are formed of liquid-conducting tubes.
Figure 3:
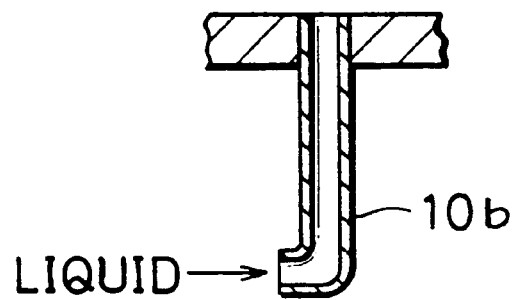
FIG. 3 is a sectional view illustrating a liquid-conducting tube in one variation of the basic construction of FIGS. 1A and 1B.

FIG. 2 is an enlarged sectional view illustrating the arrangement around one of the liquid-conducting tubes 10a. The gas-liquid dispersion device A has such an outside diameter that will properly fit the inside diameter of a tower of a gas-liquid contact apparatus so that it can be installed therein, and comprises splittable sections 11, 12 and 13. These sections 11–13 are assembled together by using bolts 31 and nuts 32 with seals 20 placed between flanges 11a and 12a, and between flanges 12a and 13a.

The seals 20 are fitted to prevent leakage of the gas and liquid through the joints between the individual split sections 11–13. The material of the seals 20 is selected taking into account the pressure, temperature, flow rate and pH values of the gas and liquid, as well as corrosion-resisting properties. Although the seals 20 may be omitted if joint surfaces of the split sections 11–13 have such a fine surface finish that is sufficient to provide nonleaking connections, it is preferable that the seals 20 be additionally used after carrying out a treatment for reducing the surface roughness of the joint surfaces.

When the gas-liquid dispersion device A having the liquid-conducting channels of the above-described construction is employed in an empty-column-type gas-liquid contact apparatus in which a gas flows from its bottom upward in the presence of a liquid, for instance, the gas and liquid will evenly disperse and flow smoothly. More specifically, the gas-liquid dispersion device A having the liquid-conducting channels allows the liquid to pass through the holes $h_2$, $h_5$, $h_7$ and $h_{10}$ made in the perforated plate 10 and the gas to pass through the remaining holes $h_1$, $h_3$, $h_4$, $h_6$, $h_8$, $h_9$ and $h_{11}$. There is formed a gas pocket holding a vapor phase immediately beneath the gas-liquid dispersion device A (where gas inflow openings are located). The gas pocket acts as a buffer which is effective in preventing pulsation of gas and liquid flows passing through the gas-liquid dispersion device A having the liquid-conducting channels.

FIGS. 3, 4, 5A and 5B are diagrams showing variations of the liquid-conducting tubes 10a of FIGS. 1A and 1B. A liquid-conducting tube 10b shown in FIG. 3 has an elbow-shaped inflow end portion. It is to be noted that its construction is not limited to the elbow-like form. Each liquid-conducting tube may be formed into a J-shaped structure having an upward-directed open end. In this case, it is preferable to make a weep hole measuring approximately 1 to 15 mm in diameter in a J-shaped portion so that the liquid would not be left entrapped in the J-shaped portion when the apparatus is turned off.

Figure 4:
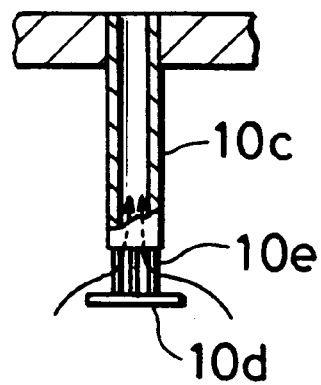
FIG. 4 is a sectional view illustrating a liquid-conducting tube in another variation of the basic construction of FIGS. 1A and 1B.

A liquid-conducting tube 10c shown in FIG. 4 is constructed in such a way that a flat, platelike cap 10d is fitted to the lower open end of the liquid-conducting tube 10c with a specific clearance therebetween. The cap 10d is connected to the liquid-conducting tube 10c by three legs 10e as illustrated.

Figure 5A:
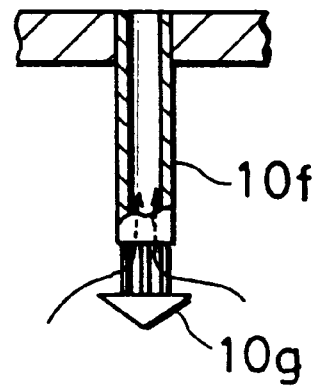
FIG. 5A is a sectional view illustrating a liquid-conducting tube in still another variation of the basic construction of FIGS. 1A and 1B.

A liquid-conducting tube 10f shown in FIG. 5A is provided with an inverted umbrella-shaped cap 10g instead of the flat, platelike cap 10d depicted in FIG. 4. The cap 10g may be so arranged that it covers the lower end of the liquid-conducting tube 10f. Preferably, a weep hole similar to the one described above should be formed in the cap 10g to prevent the liquid from being entrapped.

Figure 5B:
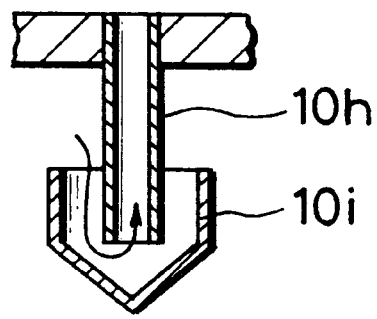
FIG. 5B is a sectional view illustrating a liquid-conducting tube in yet another variation of the basic construction of FIGS. 1A and 1B.

A liquid-conducting tube 10h shown in FIG. 5B is constructed such that the upper edge of a caplike baffle 10i is located higher than the open end of the liquid-conducting tube 10f. This construction provides an improved effect in preventing a bypass flow of gas. It is also preferable to make a weep hole at the bottom of the baffle 10i.

As it is possible to prevent rising gas bubbles from flowing into the individual liquid-conducting channels in the constructions shown in FIGS. 3, 4, 5A and 5B, it becomes possible to produce more uniform liquid flows, compared to the construction of FIG. 2 which employs the simple liquid-conducting tubes 10a having any caps. The construction of the liquid-conducting channels is not limited to those shown in FIGS. 3, 4, 5A and 5B. Any alternative construction employing baffles may be used if it can prevent intrusion of gas bubbles into the liquid-conducting channels.

FIG. 6 shows an arrangement in which a catalyst 41 is filled in a space above the gas-liquid dispersion device A having the liquid-conducting channels (i.e., on the gas outflow opening side). More specifically, there is provided a catalyst retaining grid 40 (hereinafter referred to simply as the grid 40) above the gas-liquid dispersion device A having the liquid-conducting channels and the catalyst 41 is retained on top of the grid 40. A large arrow shown in FIG. 6 indicates the direction of an ascending mixed-phase flow of gas and liquid. It is to be noted, however, that the liquid may form a descending flow in an alternative arrangement.

Figure 7:
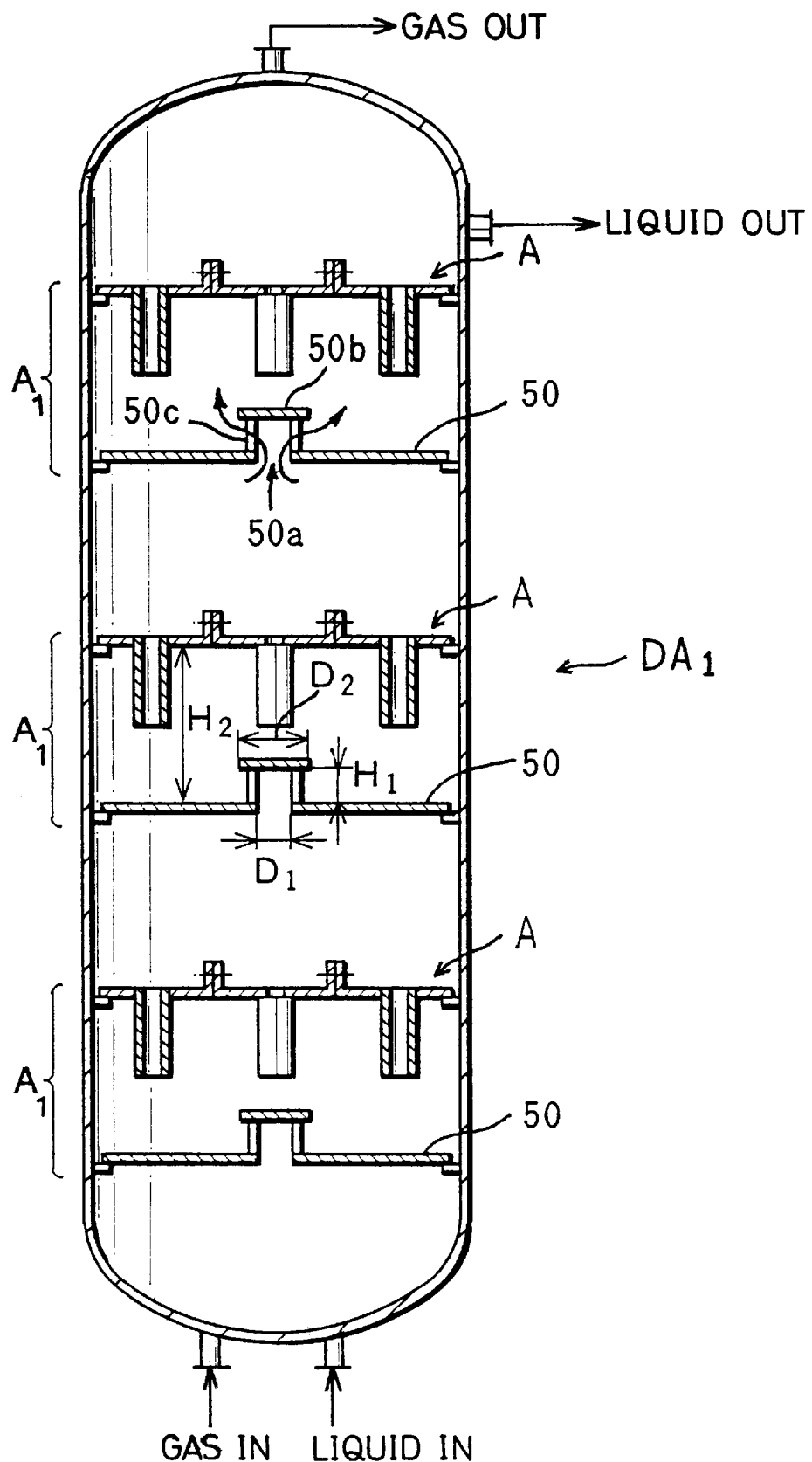
FIG. 7 is a sectional view illustrating a first gas-liquid contact apparatus incorporating a plurality of gas-liquid dispersion devices according to the first aspect of the invention.

FIG. 7 illustrates a first gas-liquid contact apparatus $DA_1$ comprising in its tower a plurality of gas-liquid dispersion devices $A_1$ arranged in a multi-stage configuration according to the first aspect of the invention, each gas-liquid dispersion device $A_1$ formed of a combination of a gas-liquid dispersion device A having liquid-conducting channels and a single-hole plate 50 fitted with a collision plate 50b. This gas-liquid contact apparatus $DA_1$ is constructed in such a way that a gas and a liquid are introduced from its bottom in a mixed-phase condition and the gas is recovered from the top of the apparatus. Although the gas and liquid are introduced through separate nozzles in FIGS. 7 to 11, they may be introduced in the form of a gas-liquid mixture through a common nozzle. Similarly, the gas and liquid may be discharged as a mixed-phase flow through a common nozzle.

Each single-hole plate 50 fitted with the collision plate 50b has a through hole 50a whose dimensions and other properties are determined based on various factors such as the flow rates, flow velocities and densities of the gas and liquid which flow within the gas-liquid contact apparatus $DA_1$, kinetic energy and pressure loss caused by the through hole 50a formed in the single-hole plate 50 of a preceding stage, and the inside cross-sectional area of the gas-liquid contact apparatus $DA_1$. (It is to be noted that although a single through hole 50a is formed in each single-hole plate 50 in most applications, there are cases where more than one through hole 50a is produced.) The collision plate 50b having a disklike shape, for example, is installed just above the through hole 50a for producing an additional dispersing effect by collision of the gas and liquid.

Preferably, the aperture area of each through hole 50a should fall within a range of 0.005% to 30% of the inside cross-sectional area of the gas-liquid contact apparatus $DA_1$ incorporating the gas-liquid dispersion devices $A_1$, each fitted with a collision plate 50b. More preferably, this ratio should be set between 0.05% and 10%, and most preferably, between 0.1% and 3%. These figures have been derived from experimental results of the configuration of FIG. 7. A preferable ratio may not fall within these ranges depending on specific conditions.

The shape, outside diameter and thickness of each collision plate 50b and the distance $H_1$ from the top surface of one single-hole plate 50 to the bottom surface of the collision plate 50b attached to the single-hole plate 50 are determined based on various factors such as the flow rates, flow velocities and densities of the gas and liquid which flow within the gas-liquid contact apparatus $DA_1$, kinetic energy and pressure loss caused by the through hole 50a formed in the single-hole plate 50, and the inside cross-sectional area of the gas-liquid contact apparatus $DA_1$. The collision plates 50b are intended to disperse the mixture of gas and liquid in radial directions. Therefore, each collision plate 50b may be formed into any desired shape as long as it does not have a through hole in itself where the gas-liquid mixture rising through the corresponding through hole 50a collides. In other words, the collision plates 50b can perform their intended function if they have such a construction and shape that are appropriate for altering the flow direction of the gas and liquid as they collide with the collision plates 50b.

It is preferable that the collision plates 50b for performing the above-described function have a platelike or three-dimensional shape. More preferably, they should be formed into a flat circular disk, or a conical or umbrella-like shape. It is however essential that the centers of the collision plates 50b be positioned exactly above the centers of the through holes 50a in the respective single-hole plates 50 for achieving intended dispersing effects. A collision plate 50b having a generally circular shape causes small variations in pressure loss that will occur as the gas and liquid which have hit against a central area of the collision plate 50b are dispersed and flow over an outer edge of the collision plate 50b. This means that the collision plate 50b having a generally circular shape causes less fluctuations in ease of flow and, therefore, it can disperse the gas and liquid uniformly in all directions.

In a typical arrangement, each collision plate 50b is fixed to a plurality of supporting bars 50c which project upward from around the through hole 50a made in the immediately lower single-hole plate 50 so that a specified distance is kept between the single-hole plate 50 and collision plate 50b. Preferably, the single-hole plate 50 and collision plate 50b have such a positional relationship that the ratio of the distance $H_1$ between the top surface of the single-hole plate 50 and the bottom surface of the collision plate 50b to the diameter $D_1$ of the through hole 50a made in the single-hole plate 50 falls within a range of 0.05 to 5.0. Furthermore, it is advantageous if the ratio of the outside diameter $D_2$ of the collision plate 50b to the diameter $D_1$ of the through hole 50a is set between 0.5 and 10. It is more preferable that the ratio $H_1/D_1$ and the ratio $D_2/D_1$ be set between 0.1 and 3.0, and between 1.0 and 5.0, respectively. Most preferably, the ratio $H_1/D_1$ and the ratio $D_2/D_1$ should be set between 0.2 and 1.0, and between 1.5 and 3.0, respectively.

If the ratio $H_1/D_1$ of the distance $H_1$ between the top surface of the single-hole plate 50 and the bottom surface of the collision plate 50b to the diameter $D_1$ of the through hole 50a in the single-hole plate 50 becomes less than 0.05, significant pressure losses are likely to occur as the gas and liquid collide with the collision plate 50b and flow out in its radial directions. This should be avoided because oscillation (undulating vibrations) of the single-hole plate 50 and/or collision plate 50b caused by such pressure losses may result in fatigue fracture of the single-hole plate 50 having the collision plate 50b. Contrarily, if the ratio $H_1/D_1$ is made larger than 5.0, pressure losses rapidly decrease immediately after the mixed-phase flow of the gas and liquid has passed through the through hole 50a in the single-hole plate 50, and the gas and liquid loosely disperse in a fan-like broadening form. Collision-assisted dispersing effect is not expected to be obtainable from the collision plate 50b when the distance between the single-hole plate 50 and collision plate 50b is made so large.

A sufficient gas-liquid dispersing effect can not be expected if the ratio $D_2/D_1$ of the outside diameter $D_2$ of the collision plate 50b to the diameter $D_1$ of the through hole 50a made in the single-hole plate 50 is less than 0.5 because too small a portion of the gas actually collides with the collision plate 50b. It is not desirable either to set a ratio $D_2/D_1$ of less than 1.0 because less than 100% of the mixed-phase flow of the gas and liquid that has passed through the through hole 50a actually collides with the collision plate 50b, causing a loss of the gas-liquid dispersing effect. On the contrary, if the ratio $D_2/D_1$ is made larger than 10, the gas-liquid dispersing effect may decrease at the middle of the gas-liquid contact apparatus $DA_1$. This is because when the mixed-phase flow of the gas and liquid that has collided with the collision plate 50b disperses and moves upward from around the collision plate 50b, a dead zone is created just above the collision plate 50b as its outside diameter is too large. This phenomenon is likely to cause a reduction in the gas-liquid dispersing effect at the middle of the gas-liquid contact apparatus $DA_1$. Although the gas-liquid dispersion devices $A_1$ are installed in three stages inside the gas-liquid contact apparatus $DA_1$ in this configuration, the invention is not limited thereto. The gas-liquid dispersion devices $A_1$ may be arranged in more than or less than three stages.

Figure 8:
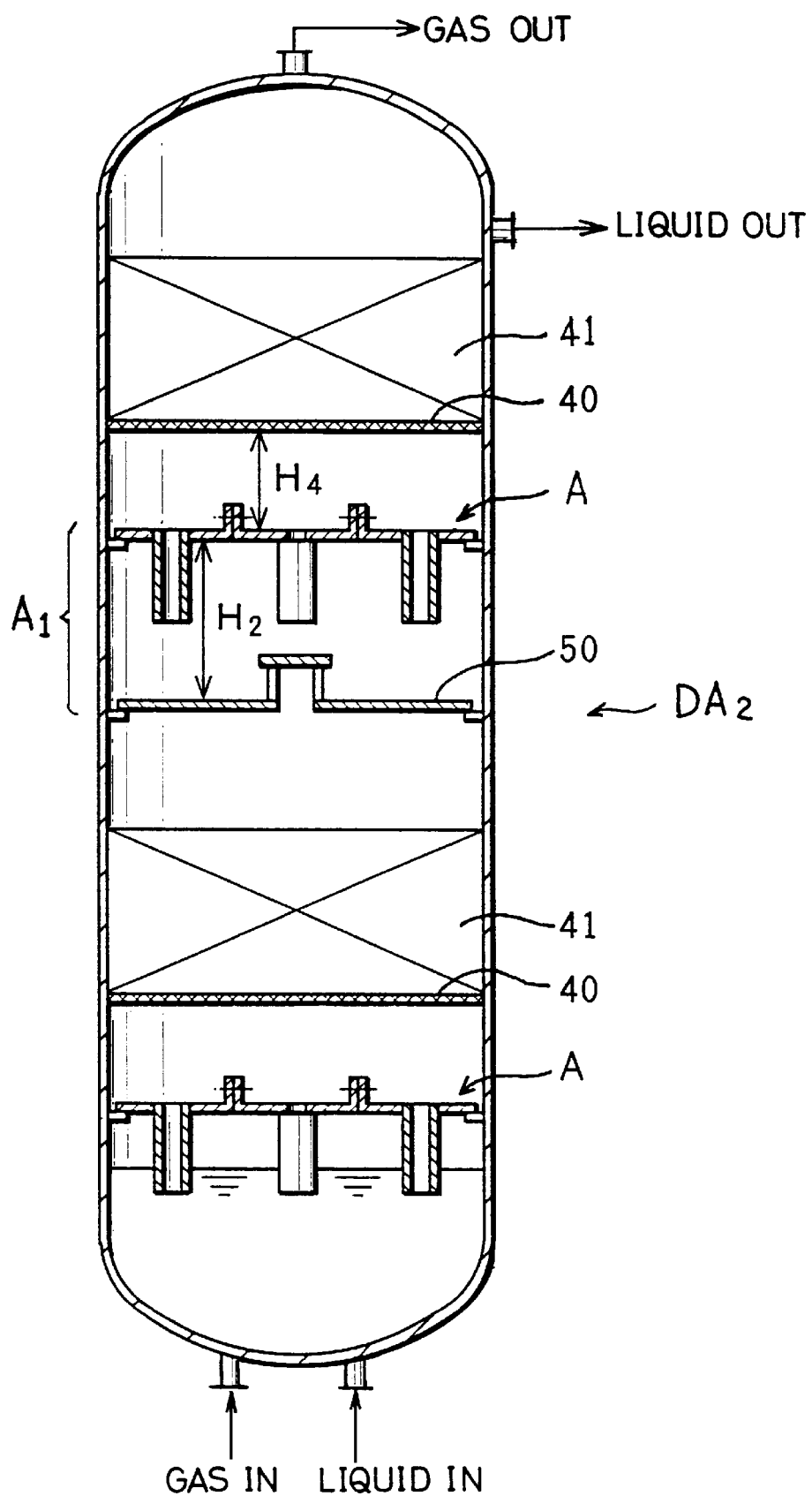
FIG. 8 is a sectional view illustrating a second gas-liquid contact apparatus according to the first aspect of the invention.

FIG. 8 shows a second gas-liquid contact apparatus $DA_2$ according to the first aspect of the invention. A packed material 41 is placed on the downstream side (upper side) of a gas-liquid dispersion device $A_1$, while a combination of a gas-liquid dispersion device A and another packed material 41 similar to the arrangement shown in FIG. 6 is mounted on its upstream side (lower side). Although a gas and a liquid are introduced through separate nozzles in FIG. 8, they may be introduced in the form of a gas-liquid mixture through a common nozzle. Similarly, the gas and liquid may be discharged as a mixed-phase flow through a common nozzle.

In one alternative, liquid inlet and outlet may be reversed to enable countercurrent contact between the gas and liquid. In countercurrent contact operation, it is desirable to remove any single-hole and multi-hole perforated plates having a collision plate in order to minimize the possibility of liquid flooding and provide a wide operating range.

Figure 9:
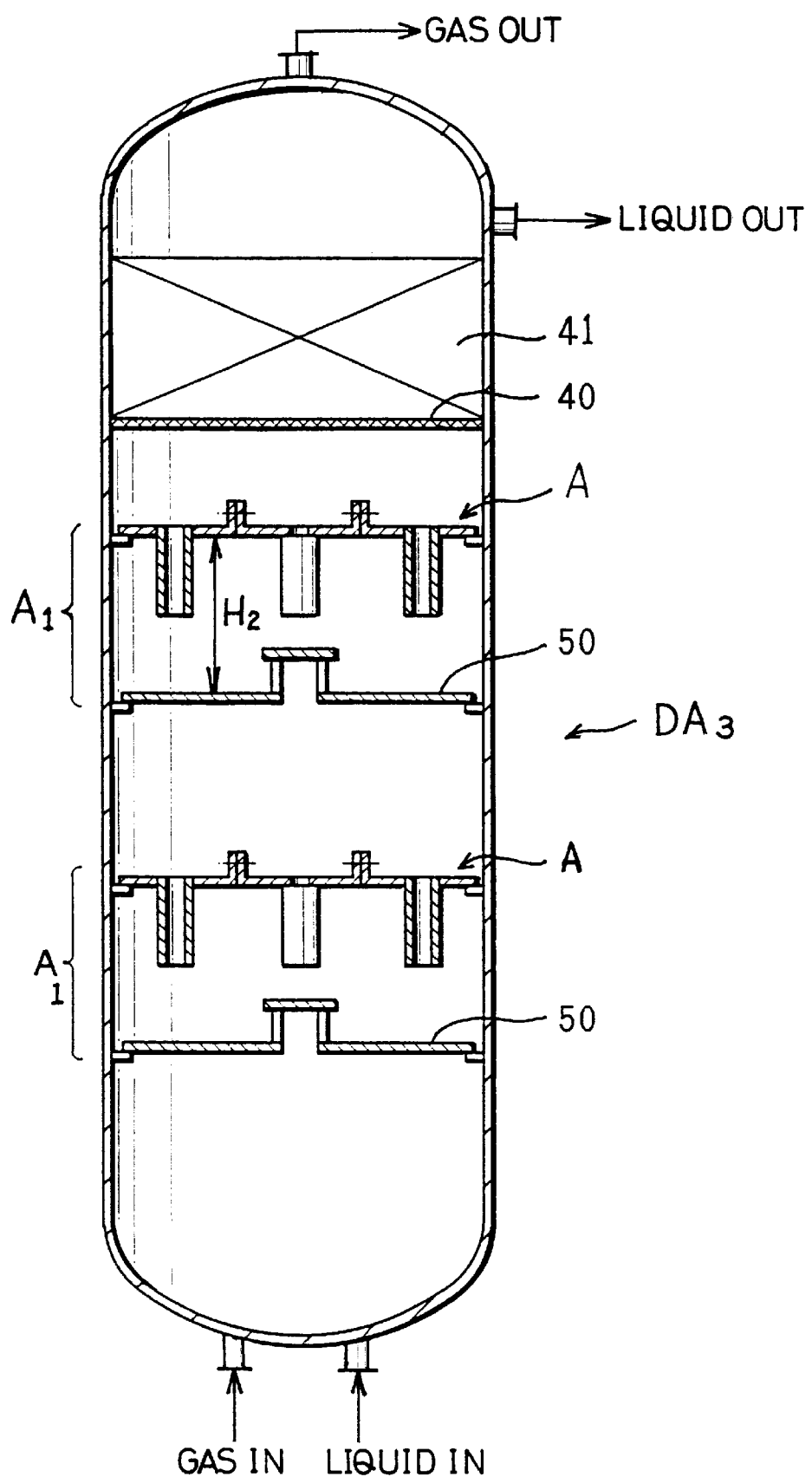
FIG. 9 is a sectional view illustrating a third gas-liquid contact apparatus according to the first aspect of the invention.

A third gas-liquid contact apparatus $DA_3$ according to the first aspect of the invention shown in FIG. 9 differs from the configuration of FIG. 8 in that a gas-liquid dispersion device $A_1$ is incorporated instead of the gas-liquid dispersion device A having liquid-conducting channels and the lower packed material 41 shown in FIG. 8.

Figure 10:
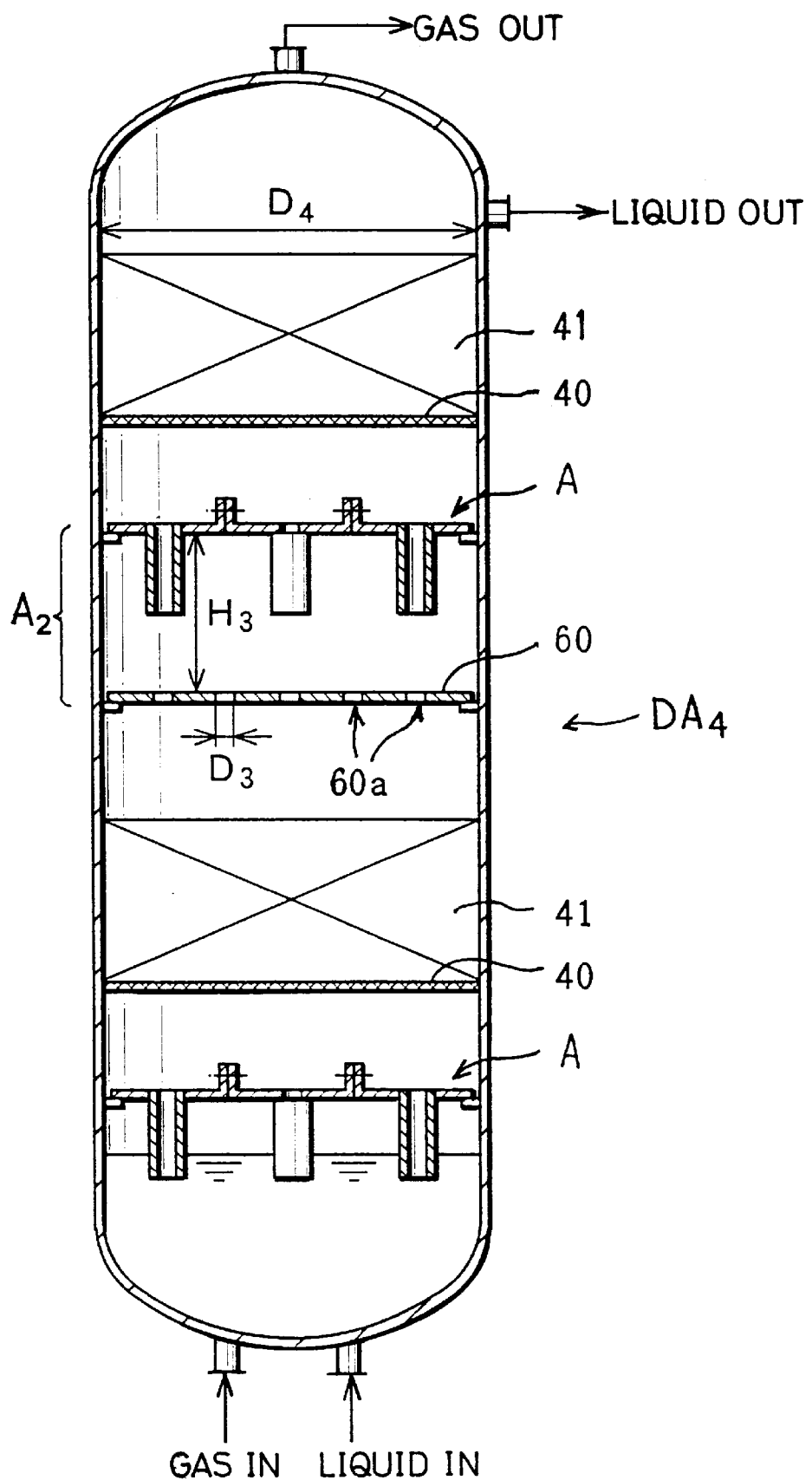
FIG. 10 is a sectional view illustrating a fourth gas-liquid contact apparatus according to the first aspect of the invention.

FIG. 10 shows a fourth gas-liquid contact apparatus $DA_4$ according to the first aspect of the invention. The configuration of this gas-liquid contact apparatus $DA_4$ is such that a secondary perforated plate 60 usually having a plurality of through holes 60a and a gas-liquid dispersion device A having liquid-conducting channels located on the downstream side (upper side) of the secondary perforated plate 60 constitute together a gas-liquid dispersion device $A_2$, a packed material 41 is placed further downstream (upper side) of the gas-liquid dispersion device $A_2$, and another gas-liquid dispersion device A having liquid-conducting channels and another packed material 41 are installed on the upstream side (lower side) of the gas-liquid dispersion device $A_2$.

Figure 11:
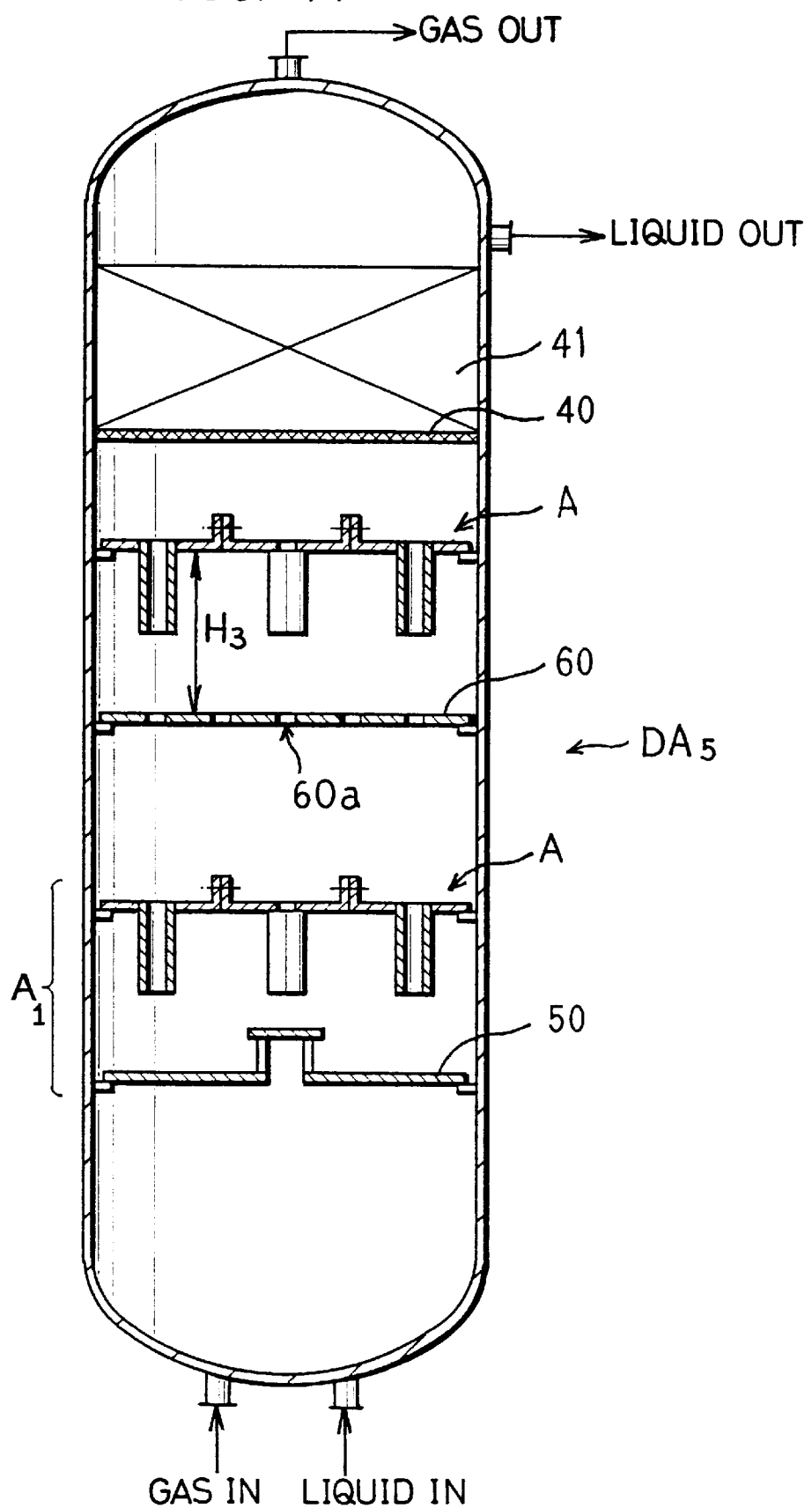
FIG. 11 is a sectional view illustrating a fifth gas-liquid contact apparatus according to the first aspect of the invention.
Figure 13:
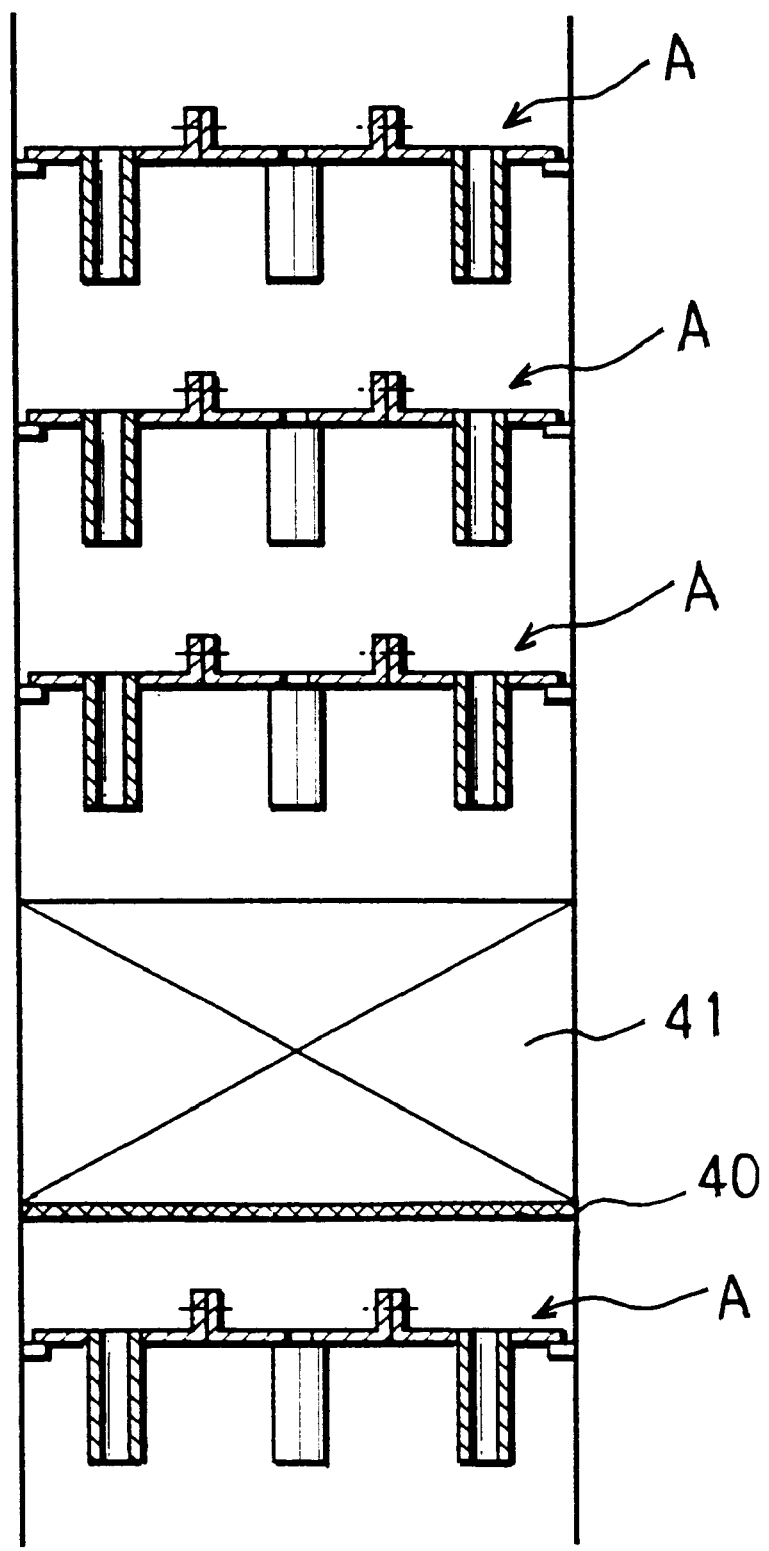
FIG. 13 is a fragmentary sectional view of a seventh gas-liquid contact apparatus according to the first aspect of the invention.

A fifth gas-liquid contact apparatus $DA_5$ according to the first aspect of the invention shown in FIG. 11 differs from the configuration of FIG. 10 in that an additional gas-liquid dispersion device $A_1$ is incorporated instead of the gas-liquid dispersion device A having the liquid-conducting channels and the lower packed material 41 shown in FIG. 10.

As already stated, the secondary perforated plates 60 shown in FIGS. 10 and 11 have the through holes 60a whose dimensions, arrangement and other physical properties are determined based on various factors such as the flow rates, flow velocities and densities of the gas and liquid which flow within the gas-liquid contact apparatus $DA_4$, $DA_5$, kinetic energy and pressure loss caused by the through holes 60a, and the inside cross-sectional area of the gas-liquid contact apparatus $DA_4$, $DA_5$. The number of through holes 60a, which is more than one in most cases, formed in each of the secondary perforated plates 60 is determined based also on the aforementioned factors. Preferably, these through holes 60a should be arranged in a specific geometrical pattern. While the total aperture area of the through holes 60a is determined in consideration of design conditions mentioned above, the total aperture area should preferably be 0.005% to 30% of the inside cross-sectional area of the gas-liquid contact apparatus $DA_4$, $DA_5$. More preferably, this ratio should be set between 0.05% and 10%, and most preferably, between 0.1% and 3%. These figures have been derived from experimental results of the configurations of FIGS. 10 and 11. A preferable ratio may not fall within these ranges depending on specific design conditions.

A basic design of the secondary perforated plates 60 is such that the through holes 60a having the same diameter are uniformly arranged in accordance with the number thereof throughout the inside cross section of the gas-liquid contact apparatus $DA_4$, $DA_5$. It is however preferable that the through holes 60a have a larger diameter at the center and/or central part of the cross section of the gas-liquid contact apparatus $DA_4$, $DA_5$ compared to its peripheral area. This arrangement would serve to increase the gas-liquid dispersing effect. If the through holes 60a have different diameters, it will be possible to produce an extra agitating effect which is effective in dispersing the gas toward the peripheral area, and the gas will be able to pass through the through holes 60a located in the peripheral area more easily.

Each of the aforementioned single-hole plates 50 is required to have a larger aperture area than each perforated plate 10 having the liquid-conducting tubes since both the gas and liquid pass through the single-hole plates 50. The distance between the intake end of each liquid-conducting tube and the accompanying single-hole plate 50 which is fitted with the collision plate 50b (or secondary perforated plate 60) should preferably be at least one half of the diameter of each hole in the relevant perforated plate 10 but not more than one-and-a-half times the inside diameter of the apparatus. More preferably, the aforementioned distance should be equal to or larger than the diameter of each hole in the relevant perforated plate 10 but not more than the inside diameter of the apparatus. Most preferably, the aforementioned distance should be at least twice as large as the diameter of each hole in the relevant perforated plate 10 but not more than one half of the inside diameter of the apparatus. It is to be noted that the liquid-conducting tubes will produce vibrations and the boundary surface between the gas and liquid will become unstable when the aforementioned distance becomes less than one half of the diameter of each hole in the relevant perforated plate 10.

If the aforementioned distance exceeds one-and-a-half times the inside diameter of the apparatus, there will be created a special zone in which gas dispersing operation is unstable above each single-hole plate 50 fitted with the collision plate 50b. This will cause an internal oxide layer to peel off in wet oxidization, subsequently causing corrosion of internal metallic parts. Moreover, the state of gas-liquid dispersion accomplished will not be good enough and the internal space of the apparatus can not be fully used.

In the configurations shown in FIGS. 7 to 9, it is essential that the distance $H_2$ between the top surface of one single-hole plate 50 and the bottom surface of the gas-liquid dispersion device A installed immediately above the single-hole plate 50 be not less than the length of the liquid-conducting tubes which project downward from the gas-liquid dispersion device A. Also in the configurations shown in FIGS. 10 and 11, the distance $H_3$ between the secondary perforated plate 60 and the gas-liquid dispersion device A installed immediately above the secondary perforated plate 60 must not be less than the length of the liquid-conducting tubes which project downward from the gas-liquid dispersion device A. More specifically, either of the distances $H_2$, $H_3$ should be 0 to 1000 mm longer than the length of the liquid-conducting tubes, or one-and-a-half times the sum of the length of the liquid-conducting tubes and the inside diameter of the apparatus or less.

If the distance $H_2$ exceeds one-and-a-half times the sum of the length of the liquid-conducting tubes and the inside diameter of the apparatus, the dispersing effect produced by one single-hole plate 50 fitted with the collision plate 50b will be lessened before the gas and liquid mixture reaches the immediately upper gas-liquid dispersion device A having the liquid-conducting tubes. This will cause fluctuations in the state of dispersion of the gas and liquid which are blown out through the individual holes in the gas-liquid dispersion device A having the liquid-conducting tubes. On the contrary, if the distance $H_2$ is less than 50 mm, an operational problem will arise when splitting each single-hole plate 50 fitted with the collision plate 50b. Accordingly, the aforementioned distance $H_2$, $H_3$ should preferably be 50 to 500 mm longer than the length of the liquid-conducting tubes. Alternatively, the distance $H_2$, $H_3$ should be equal to or larger than the sum of the length of the liquid-conducting tubes and the diameter of each hole in the perforated plate 10 having the liquid-conducting tubes, and equal to or smaller than the sum of the length of the liquid-conducting tubes and the inside diameter of the apparatus. More preferably, the distance $H_2$, $H_3$ should be should be 50 to 300 mm longer than the length of the liquid-conducting tubes; alternatively, it should be at least twice as large as the sum of the length of the liquid-conducting tubes and the diameter of each hole in the perforated plate 10 having the liquid-conducting tubes, and equal to or smaller than one half of the sum of the length of the liquid-conducting tubes and the inside diameter of the apparatus.

Even when the single-hole plates 50 fitted with the collision plate 50b are removed, the apparatus $DA_1$ to $DA_5$ shown in FIGS. 7 to 11 can still function as gas-liquid contact apparatus. Especially in countercurrent contact operation, it is desirable to remove the single-hole plates 50.

Each grid 40 shown in the foregoing configurations is essentially a framework produced by weaving intersecting sets of steel elements, such as flat steel strips. It is preferable to use a square mesh grating for achieving both mechanical strength and optimum gas-liquid dispersing effect. While the size of each square opening in the grating depends on the inside diameter of the apparatus and the number of holes made in each perforated plate, the length of each side of each square opening should preferably be one-third to 1/500th of the inside diameter of the apparatus. More preferably, it should be one-fifth to 1/100th of the inside diameter of the apparatus, and most preferably, one-tenth to 1/50th thereof. Although it is desirable that the grid 40 has as many square openings as possible, it will become difficult to produce the grating if the number of square openings is made too large. On the other hand, if the number of square openings is too small, a sufficient dispersing effect will not be obtained. A wire-mesh screen is usually placed on top of each grid 40 for preventing the packed material 41 from falling down. The wire-mesh screen used for this purpose must have a mesh number that is sufficient to prevent the falling of the packed material 41. A higher gas-liquid dispersing effect will be maintained if the height of each grid 40 as measured from its immediately lower stage is made as small as possible.

Referring to FIG. 8, for example, it is advantageous if the distance $H_4$ between the top surface of each gas-liquid dispersion device A having the liquid-conducting tubes and the bottom surface of the immediately upper grid 40 is set within a range of 0 to 1000 mm. This is because the dispersing effect produced by each gas-liquid dispersion device A having the liquid-conducting tubes will be lessened before the gas and liquid mixture reaches the immediately upper grid 40 and fluctuations in the state of dispersion of the gas and liquid will occur if the distance $H_4$ exceeds 1000 mm. On the contrary, if the distance $H_4$ becomes less than 50 mm, an operational problem will arise when splitting each gas-liquid dispersion device A having the liquid-conducting tubes. Accordingly, the distance $H_4$ should preferably be set between 50 and 300 mm. This distance $H_4$ defines a range which is appropriate for maintaining the dispersing effect produced by each gas-liquid dispersion device A having the liquid-conducting tubes up to the relevant grid 40.

When multiple stages of gas-liquid dispersion devices are provided in one gas-liquid contact apparatus, the distance from one gas-liquid dispersion device to the next is determined based on the flow rates, flow velocities and densities of the gas and liquid which flow within the apparatus, kinetic energy of the ascending flow of gas and liquid, agitating effect resulting from pressure losses caused by an immediately upstream gas-liquid dispersion device, as well as the inside cross-sectional area of the apparatus. This applies not only to each gas-liquid dispersion device A having the liquid-conducting tubes but also to each gas-liquid dispersion device formed of only a single-hole plate 50 fitted with a collision plate 50b. Although the aforementioned distance is affected by the inside diameter of the gas-liquid contact apparatus, a smaller distance is advantageous for accelerating the agitating effect in principle. Specifically, the distance between successive gas-liquid dispersion devices should preferably set within a range of 300 to 8000 mm, or 0.3 to ten times the inside diameter of the apparatus. More preferably, it should be 300 to 5000 mm, or 0.3 to five times the inside diameter of the apparatus, and even more preferably, 500 to 3000 mm, or one-half to three times the inside diameter of the apparatus. Although the dispersing effect is increased when the aforementioned distance is made smaller than 300 mm (or 0.3 times the inside diameter of the apparatus or less), the apparatus will become too expensive because a larger number of gas-liquid dispersion devices must be incorporated. Contrary to this, it is not desirable that the distance exceeds 8000 mm (or over ten times the inside diameter of the apparatus) because the dispersing effect produced by the immediately lower gas-liquid dispersion device is lessened.

EXPERIMENTAL EXAMPLES

Results of evaluation testing of some examples of gas-liquid contact apparatus constructed by installing (or not installing) gas-liquid dispersion devices having liquid-conducting channels of the aforementioned constructions are now described.

COMPARATIVE GROUP 1

Gas-liquid contact apparatus (Examples 1 to 5) of this group were configured as described below by installing (or not installing) the gas-liquid dispersion device A having liquid-conducting channels of the earlier-described basic construction of the invention.

Example 1: A conventional configuration incorporating only a packed material.

Example 2: A configuration incorporating a packed material and a conventional perforated plate type dispersion device.

Example 3: A configuration incorporating a conventional perforated plate type dispersion device.

Example 4: A configuration incorporating a packed material and the gas-liquid dispersion device having the liquid-conducting channels of the invention.

Example 5: A configuration incorporating the gas-liquid dispersion device having the liquid-conducting channels of the invention.

TABLE 1

|  | Example 1 | Example 2 | Example 3 | Example 4 | Example 5 |
|---|---|---|---|---|---|
| Liquid-conducting tubes | X | X | X | ○ | ○ |
| Perforated plate | X | ○ | ○ | ○ | ○ |
| Grid | ○ | ○ | ○ | ○ | ○ |
| Packed material | ○ | ○ | X | ○ | X |
| Air flow rate ($m^3/m^2h$) | 20–300 | 20–300 | 20–300 | 20–300 | 20–300 |
| Water flow rate ($m^3/m^2h$) | 1–5 | 1–5 | 1–5 | 1–5 | 1–5 |
| Air layer | X | X | X | ○ | ○ |

TABLE 1-continued

|  | Example 1 | Example 2 | Example 3 | Example 4 | Example 5 |
|---|---|---|---|---|---|
| Pulsating flow suppression | D | B | B or C | A | B |
| Dispersion (distribution) effects | C | B | B or C | A | A |

Table 1 shows the results of evaluation of gas-liquid dispersing effect and pulsating flow suppression capabilities of the individual configurations by using a four-level grading system involving grades A, B, C and D to designate the highest to the lowest ranking in this order.

In conducting evaluation tests, a transparent vessel (tower) was used to configure the apparatus of each Example to enable visual observation of its interior from almost all directions. Distribution of air flow rates along the circumference of each packed material was measured on its downstream side. As can be seen from the test results shown in Table 1, it has been proved that the gas-liquid dispersion device A having the liquid-conducting channels of this invention has the ability to enhance the gas-liquid dispersing effect of the apparatus.

The configuration of Example 4 was tested with two different lengths of the liquid-conducting channels, that is, 200 mm and 400 mm. No significant difference was observed in the gas-liquid dispersing effect between the two lengths except when the air flow rate was fairly high.

COMPARATIVE GROUP 2

Figure 14:
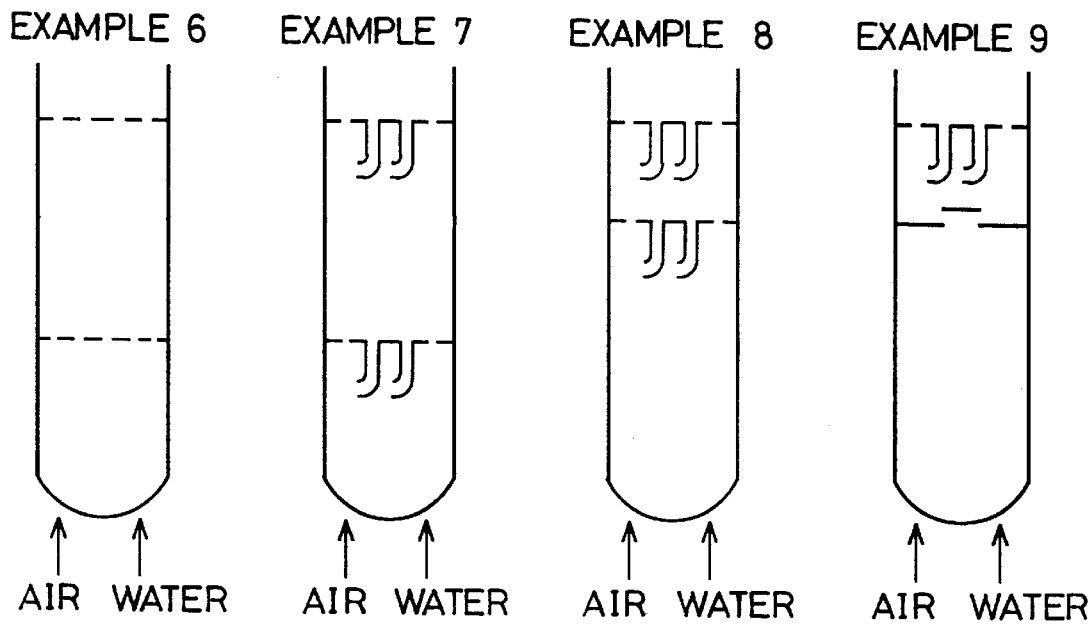
FIG. 14 shows schematic diagrams representing alternative configurations of gas-liquid contact apparatus according to the first aspect of the invention and prior art technology.

Gas-liquid contact apparatus (Examples 6 to 9) of this group were configured as described below by installing (or not installing) the gas-liquid dispersion devices A having liquid-conducting channels or the gas-liquid dispersion device $A_1$ including a single-hole plate, as shown in schematic diagrams of FIG. 14.

Example 6: A conventional configuration incorporating only a plurality of perforated plates.

Example 7: A configuration incorporating a plurality of gas-liquid dispersion devices A having the liquid-conducting channels according to the invention.

Example 8: A configuration similar to Example 7 above, except in the distance between the individual gas-liquid dispersion devices A.

Example 9: A configuration incorporating the gas-liquid dispersion device $A_1$.

TABLE 2

|  | Example 6 | Example 7 | Example 8 | Example 9 |
|---|---|---|---|---|
| Aperture ratio of perforated plate (%) | 0.3 | 0.3 | 0.3 | 0.3 |
| Aperture ratio of liquid-conducting tubes (%) | — | 2 | 2 | 2 |
| Aperture ratio of collision plate (%) | — | — | — | 0.3 |
| Distance between perforated plates (mm) | 1500 | 1500 | 1200 | — |
| Air supply rate ($m^3/m^2h$) | 20–500 | 20–500 | 20–500 | 20–500 |
| Water flow rate ($m^3/m^2h$) | 0–20 | 0–20 | 0–20 | 0–20 |

TABLE 2-continued

|  | Example 6 | Example 7 | Example 8 | Example 9 |
|---|---|---|---|---|
| Pulsating flow suppression | D | B | A | A |
| Dispersion (distribution) effects | C | A | A | A |

The inside diameter of the gas-liquid contact apparatus of each Example was 350 mm and it was operated at normal atmospheric pressure. The aforementioned four-level grading system involving grades A, B, C and D was used to present the results of evaluation of their gas-liquid dispersing effect. In Example 9, the distance between the perforated plate and the single-hole plate provided with the collision plate is 350 mm.

As can be seen from Table 2, it has been proved that the configurations incorporating a plurality of gas-liquid dispersion devices A having the liquid-conducting channels provide an enhanced gas-liquid dispersing effect compared to the conventional configuration incorporating a plurality of gas-liquid dispersion devices each formed of only a perforated plate. It has also been proved that the gas-liquid contact apparatus incorporating the gas-liquid dispersion device $A_1$ including the single-hole plate fitted with a collision plate has the ability to prevent pulsating flows. It is therefore preferable to install a plurality of gas-liquid dispersion devices in a multi-stage configuration within a tower when embodying the invention in the gas-liquid contact apparatus.

COMPARATIVE GROUP 3

Figure 15:
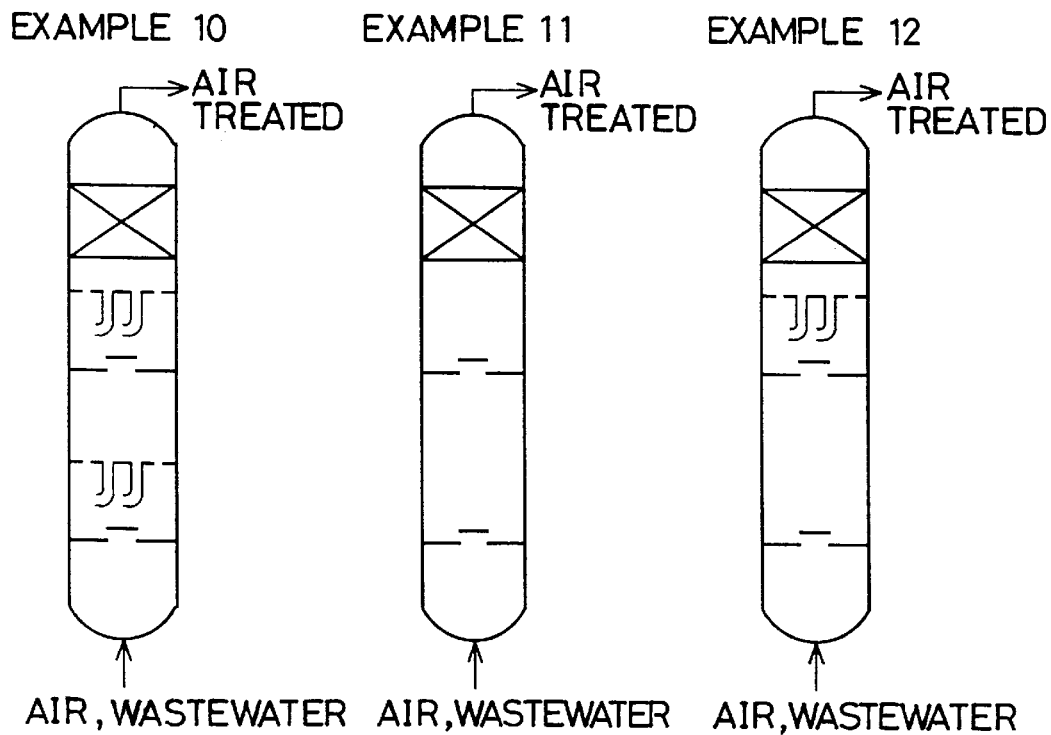
FIG. 15 shows schematic diagrams representing other alternative configurations of gas-liquid contact apparatus according to the first aspect of the invention and prior art technology.

Gas-liquid contact apparatus (Examples 10 to 12) of this group shown in schematic diagrams of FIG. 15 were configured as described below by installing (or not installing) one or more gas-liquid dispersion devices having liquid-conducting channels to compare their treatment efficiencies.

Example 10: A configuration incorporating two stages of gas-liquid dispersion devices having the liquid-conducting channels according to the invention.

Example 11: A comparative example incorporating two stages of single-hole plates each fitted with a collision plate.

Example 12: A configuration incorporating a single stage of gas-liquid dispersion device having the liquid-conducting channels according to the invention.

TABLE 3

|  | Example 10 | Example 11 | Example 12 |
|---|---|---|---|
| Aperture ratio of perforated plate having liquid-conducting tubes (%) | 0.3 | — | 0.3 |
| Aperture ratio of collision plate (%) | 0.3 | 0.3 | 0.3 |
| Inside diameter of reaction vessel (mm) | 500 | 500 | 500 |
| Reaction temperature (° C.) | 260 | 260 | 260 |
| Reaction pressure (kg/cm$^2$G) | 70 | 70 | 70 |
| LHSV at catalyst bed | 3.5 | 3.5 | 3.5 |
| LHSV at empty column (two chambers) | 3 | 3 | 3 |
| Air supply (O$_2$/COD) | 1.1 | 1.1 | 1.1 |
| Type of wastewater | A wastewater | A wastewater | A wastewater |
| COD of input wastewater (mg/l) | 32000 | 31000 | 31000 |
| Treatment efficiency (%) | 90.5 | 82 | 89 |

As can be seen from Table 3, it has been proved that the configuration incorporating a plurality of gas-liquid dispersion devices having the liquid-conducting channels also provides an enhanced gas-liquid dispersing effect compared to the configurations incorporating a plurality of single-hole plates each fitted with the collision plate.

FIGS. 16A–16B, 17A–17B and 18 are diagrams showing constructions in which liquid-conducting channels are formed of partitioning plates.

Figure 16A:
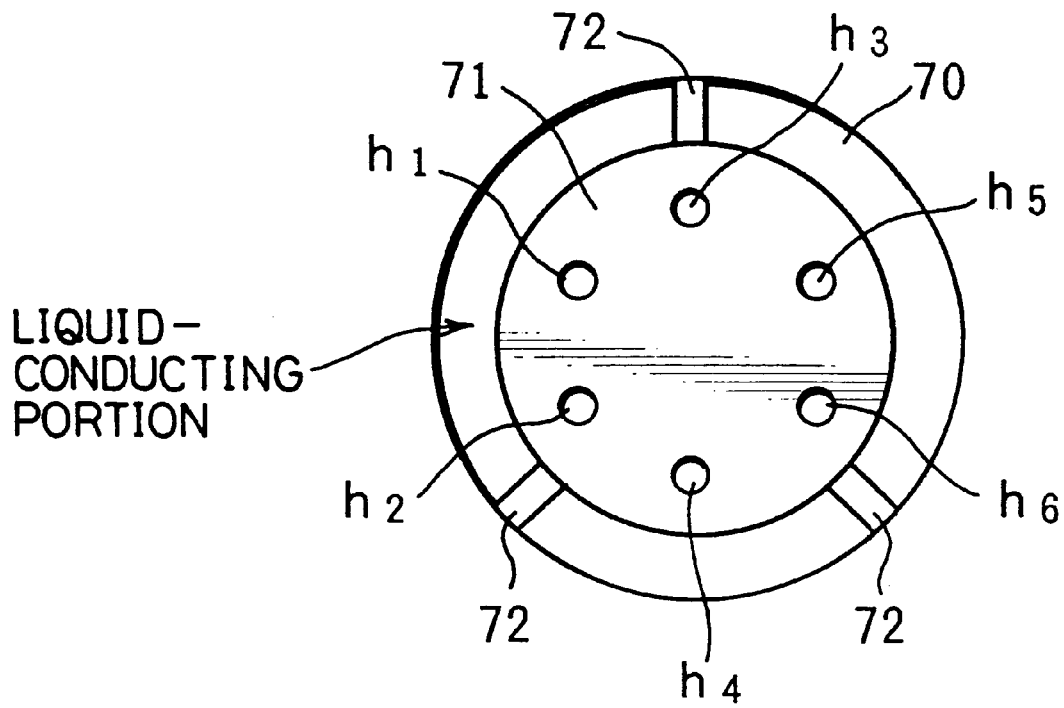
FIGS. 16A and 16B are diagrams illustrating a construction in which a liquid-conducting channel is formed of a hollow cylindrical partition wall.
Figure 16B:
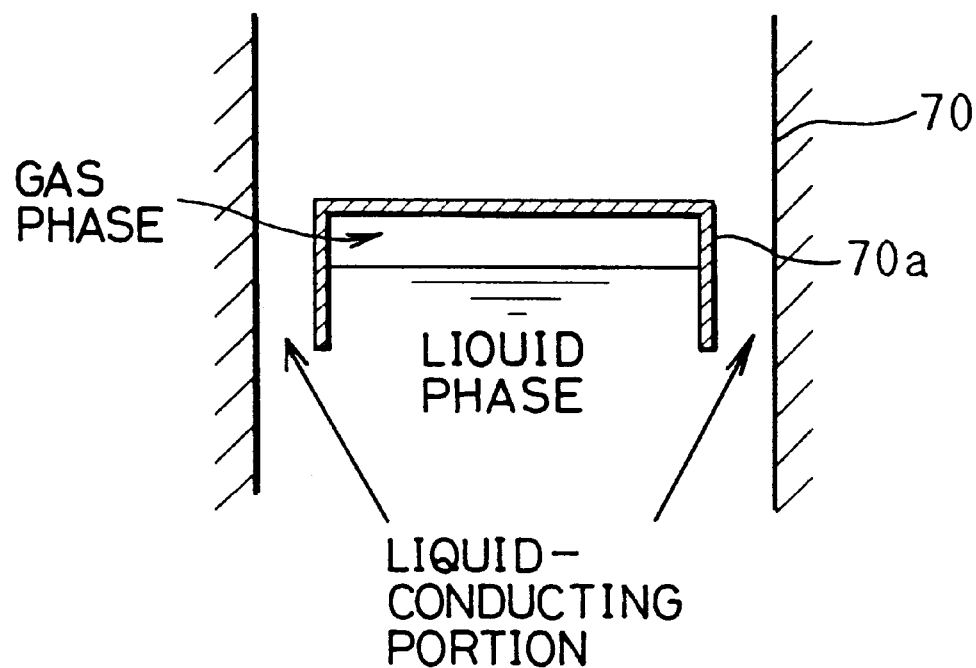

The construction of FIGS. 16A–16B is such that a perforated plate 71 is installed parallel to a transverse cross section of a reaction vessel 70 and a cylindrical partitioning plate 70a extends from around the outer periphery of the perforated plate 71 toward the gas intake side to form an annular liquid-conducting channel between the partitioning plate 70a and inside surface of the reaction vessel 70, thereby dividing its gas-liquid passage into liquid-conducting and gas-dispersing portions.

More particularly, a plurality of holes $h_1$ to $h_6$ which act the gas-dispersing portion are formed in the perforated plate 71. A space created between the partitioning plate 71a and the inside surface of the reaction vessel 70 serves as the liquid-conducting portion through which a liquid is allowed to flow. The numeral 72 in FIG. 16A indicates metallic supports for securing the perforated plate 71 to the inside surface of the reaction vessel 70. The holes $h_1$ to $h_6$ may be arranged either in a regular pattern or in a random pattern in the perforated plate 71.

Figure 17A:
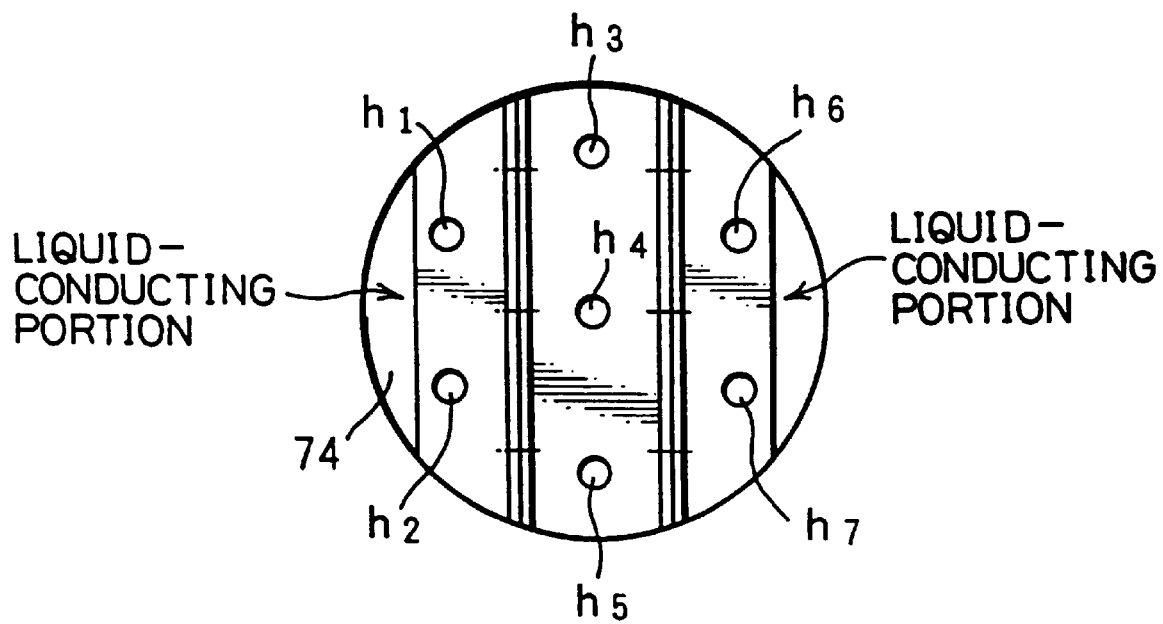
FIGS. 17A and 17B are diagrams illustrating an alternative construction in which liquid-conducting channels are formed of a pair of flat, platelike partition walls.
Figure 17B:
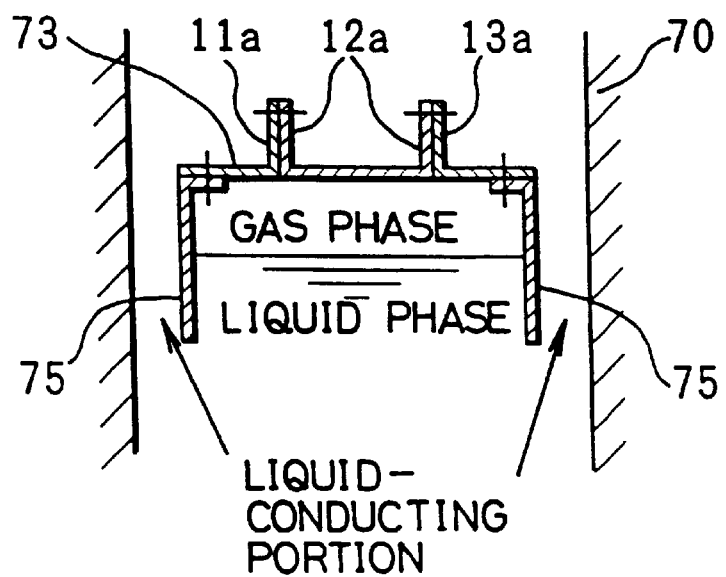

Individual liquid-conducting channels are not limited to the above construction. For example, FIGS. 17A and 17B show an alternative construction, in which a perforated plate 73 is cut off in arc-shaped form at two opposite portions of its periphery, and a pair of flat, platelike partitioning plates 75 extending downward from straight edges of arc-shaped openings 74 are formed to create liquid-conducting channels. In this construction, the individual partitioning plates 75 are directly fixed to the inside surface of a reaction vessel 70.

Figure 18:
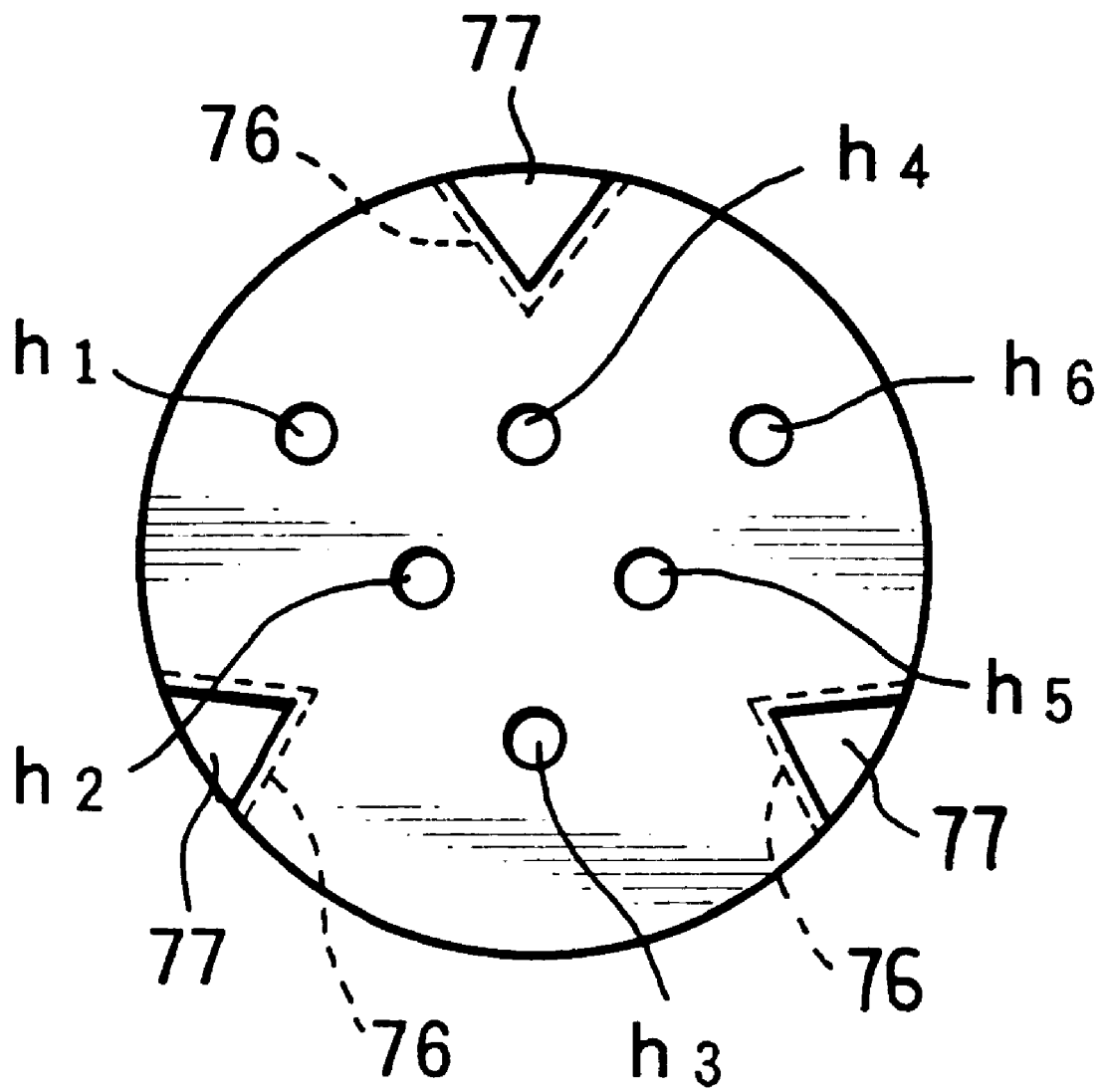
FIG. 18 is a diagram illustrating another alternative construction in which liquid-conducting channels are formed of V-shaped partition walls.

FIG. 18 shows another alternative construction, in which V-shaped partitioning plates 76 are formed to create liquid-conducting channels 77, each having a triangular cross section.

Figure 19:
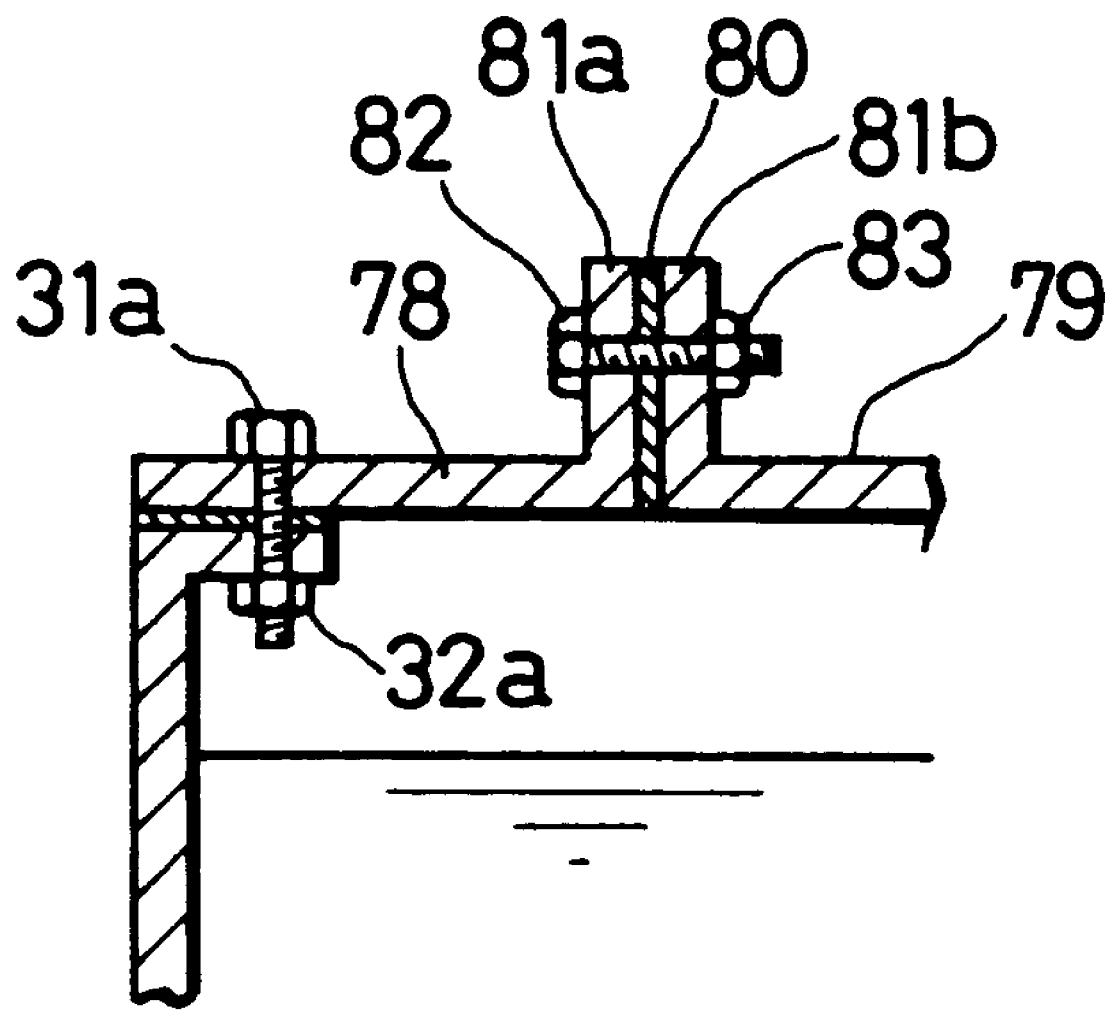
FIG. 19 is an enlarged sectional view illustrating how each partition wall is installed.

FIG. 19 is an enlarged sectional view illustrating one of the aforementioned partitioning plates and its nearby components. Each gas-liquid dispersion device has such an outside diameter that will properly fit the inside diameter of a tower of a gas-liquid contact apparatus so that it can be installed therein, and comprises splittable sections 78 and 79 as illustrated. These sections 78, 79 are assembled together by using bolts 31 and nuts 32 with seal 80 placed between flanges 81a and 81b.

FIGS. 20A to 20C are diagrams illustrating constructions in which varying types of baffles are mounted beneath the liquid-conducting portions of FIGS. 17A and 17B for preventing a bypass flow of gas. The construction of FIG. 20A employs a pair of flat baffles 84 which are mounted parallel to the perforated plate 73 in a horizontal plane just under the liquid-conducting portions.

The construction of FIG. 20B employs a pair of baffles 85 which are bent obliquely upward at approximately the middle of their width. These baffles 85 are more effective the baffles 84 of FIG. 20A in preventing the bypass flow of gas. If upper edges 85a of slant portions of the individual baffles 85 are positioned higher than the partitioning plates 75, the baffles 85 will be even more effective in preventing the bypass flow of gas. It is desirable to make weep holes 85b measuring approximately 1 to 15 mm in diameter in the baffles 85 so that a liquid would not remain on them when the apparatus is turned off.

The construction of FIG. 20C employs a pair of obliquely mounted baffles 86. These baffles 86 produce the same effect as those shown in FIG. 20B.

Figure 21:
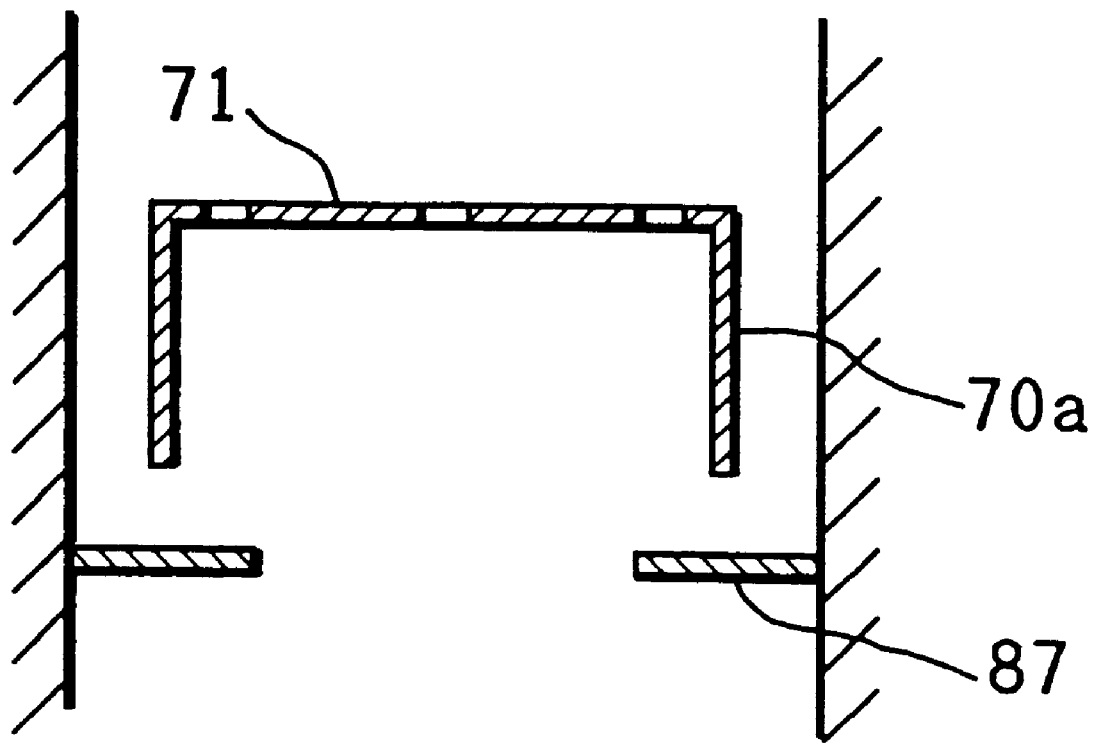
FIG. 21 is a diagram illustrating a construction in which a baffle is mounted beneath the liquid-conducting channel of the gas-liquid dispersion device shown in FIGS. 16A and 16B.

FIG. 21 shows a construction in which a baffle 87 is mounted beneath the liquid-conducting channel of FIGS. 16A and 16B. Having a ring-shaped structure, the baffle 87 is fixed to the inside diameter of the reaction vessel 70 to loosely cover an upstream opening of the annular liquid-conducting channel for preventing a bypass flow of gas. This baffle 87 may be modified in such a way that it is bent or inclined like the ones shown in FIGS. 20B and 20C.

The constructions shown in FIGS. 20A to 20C and 21 can prevent gas bubbles from flowing into the liquid-conducting channels and, therefore, they produce more uniform liquid flows compared to the constructions shown in FIGS. 16A–16B, 17A–17B and 18. The constructions of FIGS. 20A to 20C and 21 simply represent typical examples of baffle structure. Any other baffle structures capable of preventing gas bubbles from flowing into the liquid-conducting channels may be used to thereby achieve improved gas-liquid dispersing effects.

Gas-liquid contact apparatus incorporating the gas-liquid dispersion devices A having liquid-conducting channels formed by using the aforementioned constructions are now described.

COMPARATIVE GROUP 4

The gas-liquid contact apparatus (Examples 13 and 14) of this group were configured as described below by installing the gas-liquid dispersion devices A having liquid-conducting channels formed by partitioning plates.

Example 13: A configuration incorporating the gas-liquid dispersion device A having the liquid-conducting channels formed by the partitioning plates according to the invention on the upstream side of a packed material.

Example 14: A configuration incorporating only the gas-liquid dispersion device A having the liquid-conducting channels formed by the partitioning plates according to the invention.

TABLE 4

|  | Example 13 | Example 14 |
| --- | --- | --- |
| Liquid-conducting tube | ○ | ○ |
| Perforated plate | ○ | ○ |
| Grid | ○ | ○ |
| Packed material | ○ | X |
| Air flow rate ($m^3/m^2h$) | 20–300 | 20–300 |
| Water flow rate ($m^3/m^2h$) | 1–5 | 1–5 |
| Air layer | ○ | ○ |
| Pulsating flow suppression | A | B |
| Dispersion (distribution) effects | A | A |

The same four-level grading system as used for Table 1 was used in the evaluation of gas-liquid dispersing effects.

The above configurations (Examples 13 and 14) may be varied in such a way that a plurality of single-hole plates, each fitted with a collision plate, or secondary perforated plates 60 are mounted on the upstream side of the gas-liquid dispersion device A which includes a perforated plate divided into gas-dispersing and liquid-conducting portions. FIG. 12A shows a fragmentary sectional view of a gas-liquid contact apparatus in which three single-hole plates 50, each fitted with a collision plate, are mounted on the upstream side of the gas-liquid dispersion device A having the liquid-conducting channels, while FIG. 12B shows a fragmentary sectional view of a gas-liquid contact apparatus in which secondary perforated plates 60 are mounted on the upstream side of the gas-liquid dispersion device A having the liquid-conducting channels.

In another varied form of the invention, a combination of one or more single-hole plates 50, each fitted with a collision plate, and secondary perforated plates 60 may be mounted on the upstream side of the gas-liquid dispersion device A having the liquid-conducting channels which constitutes the basic construction according to the first aspect of this invention.

While the foregoing discussion has dealt with the configurations including the single-hole plates fitted with the collision plate, perforated plates fitted with one or more collision plates may be employed.

Although each gas-liquid dispersion device A having the liquid-conducting channels is mounted on the upstream side (gas inflow side) of a packed material 41 in the foregoing configurations, one or more gas-liquid dispersion devices A having the liquid-conducting channels may be mounted on the downstream side (gas outflow side) of the packed material 41 as shown in FIG. 13C.

In the configuration shown in FIG. 10, advantageous effects of the invention can be obtained even when the secondary perforated plate 60 is removed.

A gas-liquid dispersion device according to the first aspect of this invention may also be installed in a tube side intake channel of a vertical multitubular heat exchanger in which a gas flows upward.

The gas-liquid dispersion device or gas-liquid contact apparatus according to the first aspect of the invention may also be installed in a wastewater treatment system in which wastewater is treated by using a wet oxidization process, an ozone-assisted oxidization process or an adsorbent.

Methods and procedures to be used for installation and/or reinforcement of the gas-liquid dispersion devices of this invention are not limited to what has been described in connection with the specific configurations. For example, each gas-liquid dispersion device may be constructed in a one-piece unit so that it can be welded directly to a reaction vessel or in separate blocks so that they can be assembled inside the reaction vessel. What is important is that the perforated plate and partitioning plate(s) of each gas-liquid dispersion device, when they have been installed, must divide an internal gas-liquid passage of the reaction vessel into liquid-conducting and gas-dispersing portions.

PREFERRED EMBODIMENTS ACCORDING TO THE SECOND ASPECT OF THE INVENTION

Various configurations according to the second aspect of the invention are now described with reference to its preferred embodiments which are illustrated in FIGS. 31 to 39.

Figure 31:
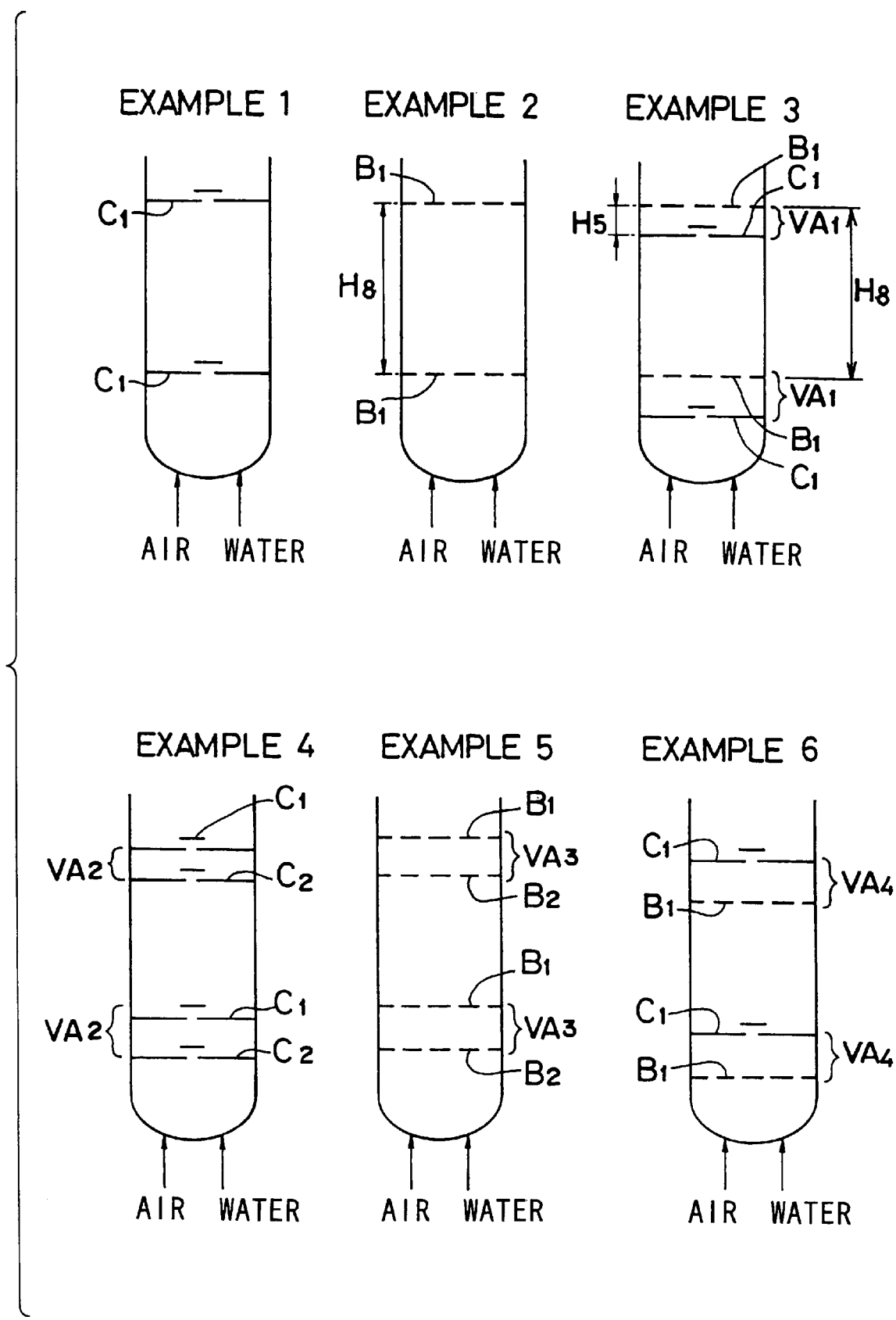
FIG. 31 shows schematic diagrams representing alternative configurations of gas-liquid contact apparatus in which gas-liquid dispersion devices according to the second aspect of the invention are installed in an empty tower.

FIG. 31 shows alternative configurations of gas-liquid contact apparatus in which gas-liquid dispersion devices according to the second aspect of the invention are installed in an empty tower. More particularly, Examples 1 to 6 of FIG. 31 were configured as follows:

Example 1: A configuration incorporating a pair of gas-liquid dispersion devices arranged in a two-stage configuration, each gas-liquid dispersion device formed of a single-hole plate $C_1$ fitted with a collision plate.

Example 2: A configuration incorporating a pair of gas-liquid dispersion devices arranged in a two-stage configuration, each gas-liquid dispersion device formed of a perforated plate $B_1$.

Example 3: A configuration incorporating a pair of gas-liquid dispersion devices $VA_1$ arranged in a two-stage configuration, each gas-liquid dispersion device $VA_1$ formed of a perforated plate $B_1$ and a single-hole plate $C_1$ fitted with a collision plate.

Example 4: A configuration incorporating a pair of gas-liquid dispersion devices $VA_2$ arranged in a two-stage configuration, each gas-liquid dispersion device $VA_2$ formed of two single-hole plates $C_1$, $C_2$ fitted with respective collision plates.

Example 5: A configuration incorporating a pair of gas-liquid dispersion devices $VA_3$ arranged in a two-stage configuration, each gas-liquid dispersion device $VA_3$ formed of two perforated plates $B_1$, $B_2$.

Example 6: A configuration incorporating a pair of gas-liquid dispersion devices $VA_4$ arranged in a two-stage configuration, each gas-liquid dispersion device $VA_4$ formed of a single-hole plate $C_1$ fitted with a collision plate and a perforated plate $B_1$.

Air and water were introduced into the individual gas-liquid contact apparatus at normal atmospheric pressure for evaluating their gas-liquid dispersion/distribution effects and pulsating flow suppression capabilities. Results of these evaluation tests are given in Tables 5 and 6, in which Table 5 shows test results obtained at an air supply rate of 10 to 100 $m^3/m^2h$ and a water supply rate of 0 to 10 $m^3/m^2h$, while Table 6 shows test results obtained at an air supply rate of 20 to 800 $m^3/m^2h$ and a water supply rate of 0 to 20 $m^3/m^2h$. The perforated plates $B_1$ and single-hole plates $C_1$ were set to different aperture ratios in the evaluation tests of Tables 5 and 6. Otherwise the same test conditions were used for the evaluation tests represented in Tables 5 and 6. The inside diameter of the tower of each Example was 350 mm in either Table 5 or 6. The earlier-mentioned four-level grading system involving grades A, B, C and D to designate the highest to the lowest ranking in this order was used to present the results of evaluation of gas-liquid dispersing effects. In conducting the evaluation tests, a transparent vessel (tower) was used to configure the apparatus of each Example to enable visual observation of its interior from almost all directions. Distribution of air flows along the circumference of each apparatus was examined at its outlet.

TABLE 5

|  | Example 1 | Example 2 | Example 3 | Example 4 | Example 5 | Example 6 |
|---|---|---|---|---|---|---|
| Aperture ratio of A1 (%) | — | 0.07 | 0.07 | 0.07 | 0.07 | 0.07 |
| Aperture ratio of B1 (%) | 0.07 | — | 0.07 | 0.07 | 0.07 | 0.07 |
| H4 (mm) | 1500 | 1500 | 1400 | 1400 | 1400 | 1400 |
| H1 (mm) | — | — | 100 | 100 | 100 | 100 |
| Air supply rate ($m^3/m^2h$) | 10–100 | 10–100 | 10–100 | 10–100 | 10–100 | 10–100 |
| Water supply rate ($m^3/m^2h$) | 0–10 | 0–10 | 0–10 | 0–10 | 0–10 | 0–10 |
| Pulsating flow suppression in H4 region | D-C | D-C | A | A-B | B | A-B |
| Dispersion (distribution) effects | D-C | C | B-A | C | B | C |

TABLE 6

|  | Example 1 | Example 2 | Example 3 | Example 4 | Example 5 | Example 6 |
|---|---|---|---|---|---|---|
| Aperture ratio of A1 (%) | — | 0.4 | 0.4 | 0.4 | 0.4 | 0.4 |
| Aperture ratio of B1 (%) | 0.4 | — | 0.4 | 0.4 | 0.4 | 0.4 |
| H4 (mm) | 1500 | 1500 | 1400 | 1400 | 1400 | 1400 |
| H1 (mm) | — | — | 100 | 100 | 100 | 100 |
| Air supply rate ($m^3/m^2h$) | 20–800 | 20–800 | 20–800 | 20–800 | 20–800 | 20–800 |
| Water supply rate ($m^3/m^2h$) | 0–20 | 0–20 | 0–20 | 0–20 | 0–20 | 0–20 |
| Pulsating flow suppression in H4 region | D-C | D-C | A | A-B | B | A-B |
| Dispersion (distribution) effects | D-B | C-B | A | C-B | B | C-B |

As can be seen from Tables 5 and 6, the apparatus of Examples 1 and 2 with too large a distance $H_8$ between the two single-hole plates $C_1$, or between the two perforated plates $B_1$, exhibited poor dispersion effects. In comparison, appreciable levels of dispersion effects and pulsating flow suppression effects were achieved by the apparatus of Examples 3 to 6 which incorporated a pair of gas-liquid dispersion devices arranged with a specific distance $H_8$ therebetween, each gas-liquid dispersion device formed of two single-hole plates $C_1$, $C_2$ fitted with the respective collision plates, two perforated plates $B_1$, $B_2$, or a combination of the single-hole plate $C_1$ fitted with the collision plate and the perforated plate $B_1$. Among them, Example 3 exhibited a particularly high dispersion effect.

Figure 32:
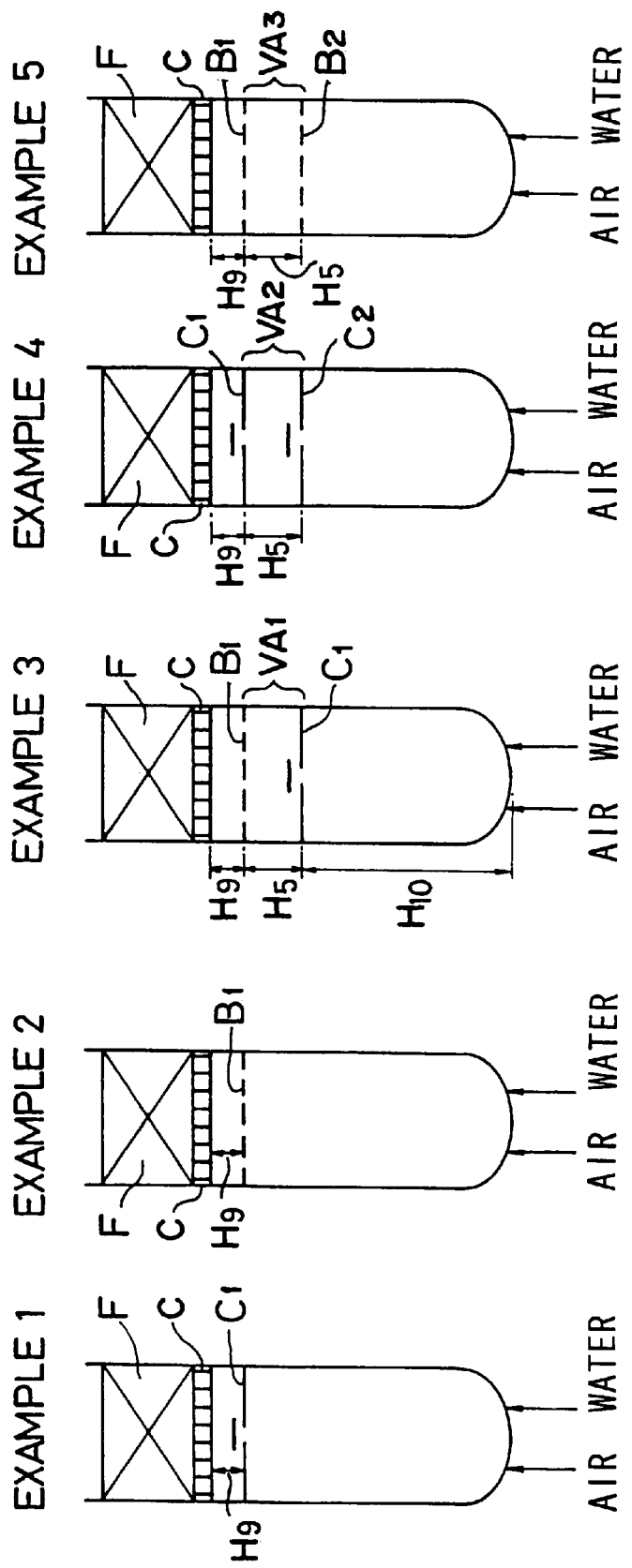
FIG. 32 shows schematic diagrams representing alternative configurations of gas-liquid contact apparatus in which gas-liquid dispersion devices according to the second aspect of the invention are installed in a packed tower.

FIG. 32 shows alternative configurations of gas-liquid contact apparatus in which gas-liquid dispersion devices according to the second aspect of the invention are installed in a packed tower. More particularly, Examples 1 to 5 of FIG. 32 were configured as follows:

Example 1: A configuration incorporating a single-hole plate $C_1$ fitted with a collision plate, a grid C mounted above the single-hole plate $C_1$, and a packed material consisting essentially of a pelletized catalyst F loaded on the grid C.

Example 2: A configuration incorporating a perforated plate $B_1$, a grid C mounted above the perforated plate $B_1$, and a catalyst F loaded on the grid C.

Example 3: A configuration incorporating a gas-liquid dispersion device $VA_1$ formed of a perforated plate Bland a single-hole plate $C_1$ fitted with a collision plate, a grid C mounted above the gas-liquid dispersion device $VA_1$, and a catalyst F loaded on the grid C.

Example 4: A configuration incorporating a gas-liquid dispersion device $VA_2$ formed of two single-hole plates $C_1$, $C_2$ fitted with respective collision plates, a grid C mounted above the gas-liquid dispersion device $VA_2$, and a catalyst F loaded on the grid C.

Example 5: A configuration incorporating a gas-liquid dispersion device $VA_3$ formed of two perforated plates $B_1$, $B_2$, a grid C mounted above the gas-liquid dispersion device $VA_3$, and a catalyst F loaded on the grid C.

Air and water were introduced into the individual gas-liquid contact apparatus at normal atmospheric pressure for evaluating their gas-liquid dispersion/distribution effects and pulsating flow suppression capabilities. Results of these evaluation tests are given in Tables 7 and 8, in which Table 7 shows test results obtained at an air supply rate of 10 to 100 $m^3/m^2h$ and a water supply rate of 0 to 10 $m^3/m^2h$ with the tower of each Example having an inside diameter of 350 mm, while Table 8 shows test results obtained at an air supply rate of 20 to 800 m³/m²h and a water supply rate of 0 to 20 m³/m²h with the tower of each Example having an inside diameter of 600 mm. The perforated plates $B_1$ and single-hole plates $C_1$ were set to different aperture ratios in the evaluation tests of Tables 7 and 8. Otherwise the same test conditions were used for the evaluation tests represented in Table 5.

TABLE 7

|  | Example 1 | Example 2 | Example 3 | Example 4 | Example 5 |
|---|---|---|---|---|---|
| Aperture ratio of A1 (%) | — | 0.07 | 0.07 | — | — |
| Aperture ratio of B1 (%) | 0.07 | — | 0.07 | 0.07 | — |
| H5 (mm) | 100 | 100 | 100 | 100 | 100 |
| H1 (mm) | — | — | 100 | 100 | 100 |
| H6 (mm) | 1500 | 1500 | 1400 | 1400 | 1400 |
| Air supply rate (m³/m²h) | 10–100 | 10–100 | 10–100 | 10–100 | 10–100 |
| Water supply rate (m³/m²h) | 0–10 | 0–10 | 0–10 | 0–10 | 0–10 |
| Pulsating flow suppression at D | D-C | C | A | A-B | C-B |
| Dispersion (distribution) effects | D-C | C-A | B-A | C | B |

TABLE 8

|  | Example 1 | Example 2 | Example 3 | Example 4 | Example 5 |
|---|---|---|---|---|---|
| Aperture ratio of A1 (%) | — | 0.4 | 0.4 | — | — |
| Aperture ratio of B1 (%) | 0.4 | — | 0.4 | 0.4 | — |
| H5 (mm) | 100 | 100 | 100 | 100 | 100 |
| H1 (mm) | — | — | 100 | 100 | 100 |
| H6 (Mm) | 1500 | 1500 | 1400 | 1400 | 1400 |
| Air supply rate (m³/m²h) | 20–800 | 20–800 | 20–800 | 20–800 | 20–800 |
| Water supply rate (m³/m²h) | 0–20 | 0–20 | 0–20 | 0–20 | 0–20 |
| Pulsating flow suppression at D | D-C | C | A | A-B | C-B |
| Dispersion (distribution) effects | D-C | C-B | B-A | C | B |

In Tables 7 and 8, pulsating flow suppression capabilities are shown based on results of evaluation of pulsating flows at the catalyst F, while dispersion and distribution effects are shown based on results of evaluation of dispersion the along the circumference of each apparatus. $H_{10}$ represents the distance from the bottom of each tower.

As can be seen from Tables 7 and 8, the apparatus of Examples 1 and 2 merely incorporating the single-hole plate $C_1$ fitted with the collision plate or the perforated plate $B_1$ exhibited poor dispersion effects. In comparison, appreciable levels of dispersion effects and pulsating flow suppression effects were achieved by the apparatus of Examples 3 to 5 which incorporated a pair of single-hole plates $C_1$, $C_2$ fitted with the respective collision plates, a pair of perforated plates $B_1$, $B_2$, or a combination of the single-hole plate $C_1$ fitted with the collision plate and the perforated plate $B_1$ arranged with a specific distance $H_5$ therebetween. Among them, Example 3 exhibited a particularly high dispersion effect.

It was verified that too large a distance $H_9$ between the grid C and the perforated plate $B_1$ caused air bubbles to drift sideways on the bottom of the grid C supporting the catalyst F, resulting in a reduction in the dispersion effects. It was further verified that air bubbles drifted sideways on the bottom of the grid C, resulting in a reduction in the dispersion effects, when the air supply rate was too low.

Figure 33:
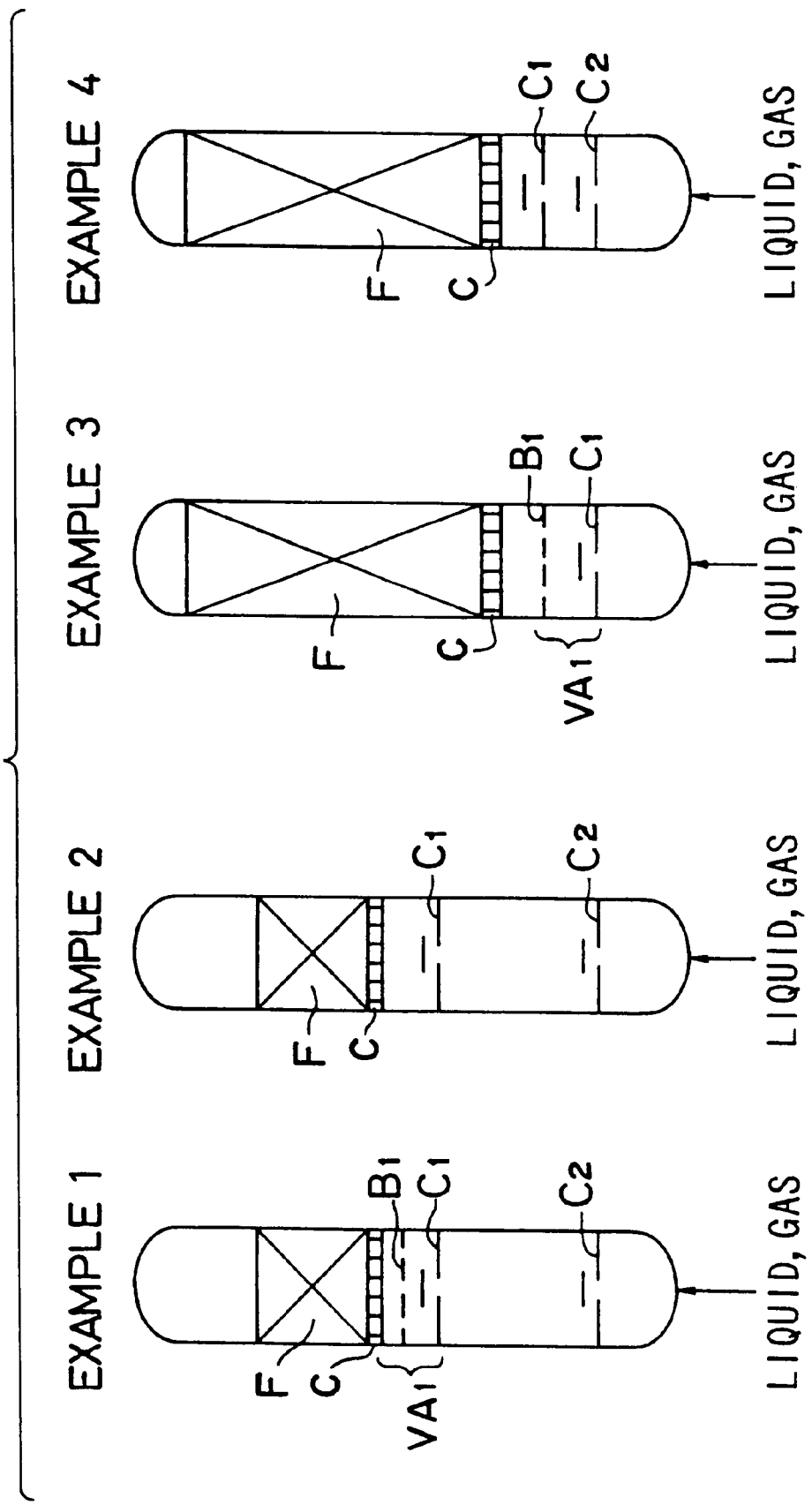
FIG. 33 shows schematic diagrams representing alternative configurations of wastewater treatment systems according to the second aspect of the invention.

FIG. 33 shows alternative configurations of wastewater treatment systems employing gas-liquid dispersion devices according to the second aspect of the invention. More particularly, Examples 1 to 4 of FIG. 33 were configured as follows:

Example 1: A configuration incorporating a gas-liquid dispersion device $VA_1$ formed of a perforated plate $B_1$ and a single-hole plate $C_1$ fitted with a collision plate, and a single-hole plate $C_2$ fitted with a collision plate.

Example 2: A comparative example incorporating two single-hole plates $C_1$, $C_2$ fitted with respective collision plates, the two single-hole plates $C_1$, $C_2$ arranged with a relatively large distance therebetween.

Example 3: A configuration incorporating a gas-liquid dispersion device $VA_1$ formed of a perforated plate $B_1$ and a single-hole plate $C_1$ fitted with a collision plate.

Example 4: A comparative example incorporating two single-hole plates $C_1$, $C_2$ fitted with respective collision plates, the two single-hole plates $C_1$, $C_2$ arranged with a relatively small distance therebetween.

The wastewater treatment systems of Examples 1 to 4 shown in FIG. 33 each incorporated a packed material consisting essentially of a catalyst F loaded on a grid C. Table 9 below shows a comparison of treatment efficiencies achieved by the configurations of Examples 1 to 4.

TABLE 9

|  | Example 1 | Example 2 | Example 3 | Example 4 |
|---|---|---|---|---|
| Inside diameter of reaction vessels (mm) | 500 | 500 | 1000 | 1000 |
| Reaction temperature (° C.) | 255 | 255 | 255 | 255 |
| Reaction pressure (kg/cm²G) | 70 | 70 | 70 | 70 |
| LHSV at catalyst bed (1/hr) | 3 | 3 | 3 | 3 |
| LHSV at empty column (1/hr) | 2.5 | 2.5 | 2.5 | 2.5 |
| Air supply (O₂/COD) | 1.1 | 1.1 | 1.5 | 1.5 |
| Type of wastewater | A wastewater | A wastewater | B wastewater | B wastewater |
| COD (mg/l) | 26000 | 26000 | 35500 | 35500 |
| Treatment efficiency (%) | 89 | 80 | 76 | 69 |
| Aperture ratio of A1 (%) | 0.3 | — | 2.0 | 2.0 |
| Aperture ratio of B1, B2 (%) | 0.3 | 0.3 | 2.0 | 2.0 |

As can be seen from Table 9, gas-liquid dispersion and pulsating flow suppression effects and reaction efficiency were improved when the gas-liquid dispersion device $VA_1$ was installed as in the configurations of Examples 1 to 3.

FIG. 34 shows alternative configurations in which a gas-liquid dispersion device according to the second aspect of the invention is so arranged as to prevent air bubbles from drifting on the bottom of a grid (Examples 1 and 2). Two types of grids were used for comparative testing: parallel grid C' and crisscrossed grid C" shown in FIG. 34. More particularly, Examples 1 to 3 of FIG. 34 were configured as follows:

Example 1: A configuration incorporating a perforated plate $B_1$, a grid C' (or C")mounted above the perforated plate $B_1$, a wire mesh G mounted above the grid C' (or C"), and a catalyst F loaded on the wire mesh G.

Example 2: A configuration incorporating a gas-liquid dispersion device $VA_1$ formed of a perforated plate $B_1$ and a single-hole plate $C_1$ fitted with a collision plate, a grid C' (or C")mounted above the gas-liquid dispersion device $VA_1$, a wire mesh G mounted above the grid C' (or C"), and a catalyst F loaded on the wire mesh G.

Example 3: A conventional configuration without incorporating any gas-liquid dispersion device.

Table 10 below shows a comparison of gas-liquid dispersion and pulsating flow suppression effects achieved by the configurations of Examples 1 to 3.

TABLE 10

|  | Example 1 | | Example 2 | | Example 3 | |
| --- | --- | --- | --- | --- | --- | --- |
| Grid type | C' | C" | C' | C" | C' | C" |
| Aperture ratio of A1 (%) | 0.07 | 0.07 | 0.07 | 0.07 | — | — |
| Aperture ratio of B1 (%) | — | — | 0.07 | 0.07 | — | — |
| Air supply rate ($m^3/m^2h$) | 10–100 | 10–100 | 10–100 | 10–100 | 10–100 | 10–100 |
| Water supply rate ($m^3/m^2h$) | 10–100 | 10–100 | 10–100 | 10–100 | 10–100 | 10–100 |
| Pulsating flow suppression | C | C | A | A | D | D |
| Dispersion (distribution) effects | C-B | B-A | B-A | A | D-C | C |

Preferably, through holes in the perforated plate $B_1$ are regularly arranged in relation to square-shaped openings made in the grid C" and, more particularly, the grid C" and dispersion device are arranged in such a way that the through holes in the perforated plate $B_1$ face the individual square-shaped openings in the grid C" in a one-to-one correspondence.

Using a configuration similar to the third configuration (Example 3) of FIG. 32, the distance $H_5$ between the single-hole plate $C_1$ (not fitted with a collision plate) mounted on the gas inflow side and the perforated plate $B_1$ mounted on the gas outflow side was changed to examine how this distance $H_5$ would affect the dispersion and pulsating flow suppression effects. Results of evaluation tests are given in Table 11 below.

effect evaluation results were slightly improved thanks to dispersion effects exerted by the collision plate.

Further embodiments of the invention according to the second aspect thereof are described with reference to FIGS. 35 to 39.

Figure 35:
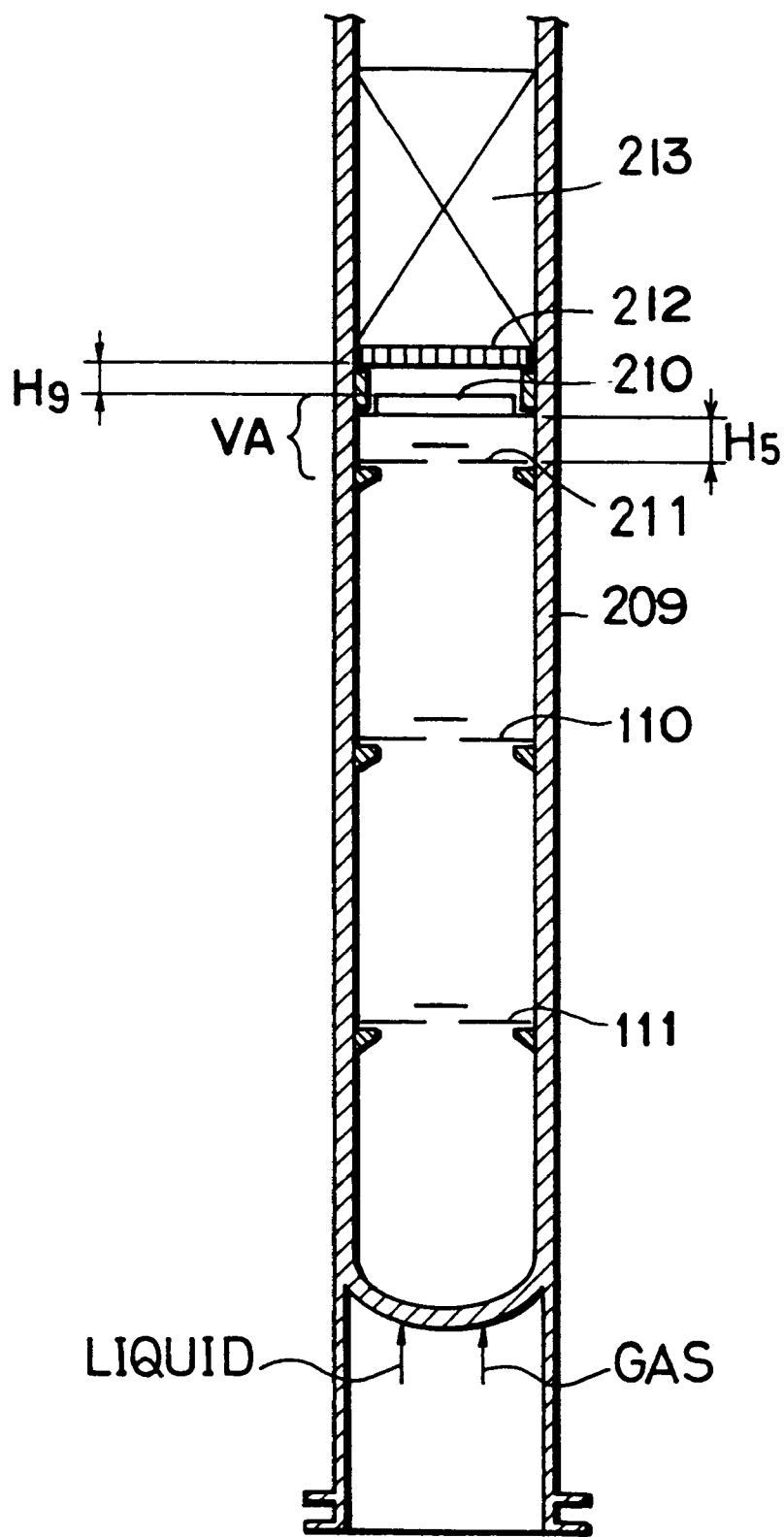
FIG. 35 is a sectional view illustrating the general construction of a gas-liquid contact apparatus according to the second aspect of the invention.

FIG. 35 is a sectional view of a gas-liquid contact apparatus according to the second aspect of the invention, in which a liquid flows forming a continuous phase and a gas flows upward within a tower 209. A gas-liquid dispersion device VA is installed in the tower 209 so that the gas and liquid (or slurry) are dispersed uniformly in a circumferential direction of the gas-liquid dispersion device VA and in a flow direction without producing pulsating flows.

The gas-liquid dispersion device VA comprises a perforated plate 210 and a single-hole plate 211 fitted with a collision plate 211b which are separated from each other by a specific distance $H_5$ and mounted in such a way that a gas-liquid passage in the tower 209 is interrupted. The distance $H_5$ is at least twice as large as the diameter of each through hole in the perforated plate 210 but not more than one-and-a-half times the inside diameter of the tower 209. A grid 212 is mounted above the perforated plate 210 and a catalyst 213 is loaded on the grid 212. Further, a second single-hole plate 110 fitted with a collision plate and a third single-hole plate 111 fitted with a collision plate are mounted on the gas inflow side of the single-hole plate 211 fitted with the collision plate 211b with a specific distance between the second and third single-hole plate 110, 111. The individual components are constructed as described below.

As shown in FIGS. 36A and 36B, a plurality of holes 210a are made in the perforated plate 210. The perforated plate 210 has such an outside diameter that will properly fit the inside diameter of the tower 209 so that it can be installed therein, and comprises splittable sections 210b, 210c and 210d. These sections 210b–210d are assembled together into disklike form by using bolts and nuts (not shown) with seals (not shown) placed between flanges 210e and 210f, and

TABLE 11

|  | Example 1 | Example 2 | Example 3 | Example 4 | Example 5 | Example 6 | Example 7 |
| --- | --- | --- | --- | --- | --- | --- | --- |
| Ratio of H1 to hole dia. d = 9mm | 0.3d | 0.5d | 1d | 3d | — | — | — |
| Ratio of H1 to tower dia. D | — | — | — | — | 0.3D | 1.5D | 2D |
| H1 (mm) | 3 | 5 | 9 | 27 | 100 | 450 | 600 |
| Aperture ratio of A1 (%) | — | — | 0.07 | 0.07 | — | — | — |
| Aperture ratio of B1 (%) | 0.07 | 0.07 | — | 0.07 | 0.07 | 0.07 | 0.07 |
| H5 (mm) | 100 | 100 | 100 | 100 | 100 | 100 | 100 |
| H6 (mm) | 1500 | 1500 | 1500 | 1500 | 1400 | 1000 | 1000 |
| Air supply rate ($m^3/m^2h$) | 10–100 | 10–100 | 10–100 | 10–100 | 10–100 | 10–100 | 10–100 |
| Pulsating flow suppression at D | C | C-B | B | B-A | A | C-B | C |
| Dispersion (distribution) effects | D-C | D-C | C-B | C-A | B-A | C-A | C |
| Water supply rate ($m^3/m^2h$) | 0–10 | 0–10 | 0–10 | 0–10 | 0–10 | 0–10 | 0–10 |

It can seen from Table 11 that the dispersion and pulsating flow suppression effects were adversely affected when the distance $H_5$ was made too large, but good dispersion and pulsating flow suppression effects were obtained when the distance $H_5$ was appropriate. When the single-hole plate $C_1$ was replaced with a single-hole plate $C_2$ fitted with a collision plate in Examples 2 to 6 of Table 11, dispersion between flanges 210g and 210h. The seals are fitted to prevent leakage of the gas and liquid through the joints between the individual split sections 210b–210d. Advantageous effects of the invention are obtained even when the perforated plate 210 of FIGS. 36A and 36B is installed upside down.

As shown in FIGS. 37A and 37B, the single-hole plate 211 fitted with the collision plate 211b has a through hole 211a whose dimensions and other properties are determined based on various factors such as the flow rates, flow velocities and densities of the gas and liquid which flow within the tower 209 as well as the inside cross-sectional area of the tower 209. The collision plate 211b having a disklike shape is installed immediately above the through hole 211a (gas outflow side) for producing an additional dispersing effect by collision of the gas and liquid.

The diameter of the through hole 211a is determined in consideration of the earlier-mentioned aperture area range of 0.005% to 30%. The shape, outside diameter and thickness of the collision plate 211b and the distance $H_0$ from the top surface of a single-hole plate 211c to the bottom surface of the collision plate 211b attached to the single-hole plate 211c are determined based on various factors such as the flow rates, flow velocities and densities of the gas and liquid which flow within the tower 209, kinetic energy and pressure loss caused by the through hole 211a, and the inside cross-sectional area of the tower 209. In FIGS. 37A and 37B, the distance $H_0$ is determined so that the ratio $H_0/E_1$ falls within a range of 0.05 to 5.0, where $E_1$ is the diameter of the through hole 211a made in the single-hole plate 211c. The numeral 210i in FIG. 36A designates fixing holes used for fixing the perforated plate 210 to the inside wall of the tower 209.

The collision plate 211b is intended to disperse a mixture of gas and liquid in radial directions. Therefore, the collision plate 211b may be formed into any desired shape as long as the gas-liquid mixture rising through the through hole 211a is allowed to collide with the collision plate 211b. In other words, the collision plate 211b can perform its intended function if it has such a construction and shape that are appropriate for altering the flow direction of the gas and liquid as they collide with the collision plate 211b.

The collision plate 211b is fixed to a plurality of supporting bars 211d which project upward from around the through hole 211a in the single-hole plate 211c in such a way that a specified distance is kept between the single-hole plate 211c and collision plate 211b. The numeral 211e in FIG. 37A designates fixing holes used for fixing the single-hole plate 211 fitted with the collision plate 211b to the inside wall of the tower 209.

Figure 38A:
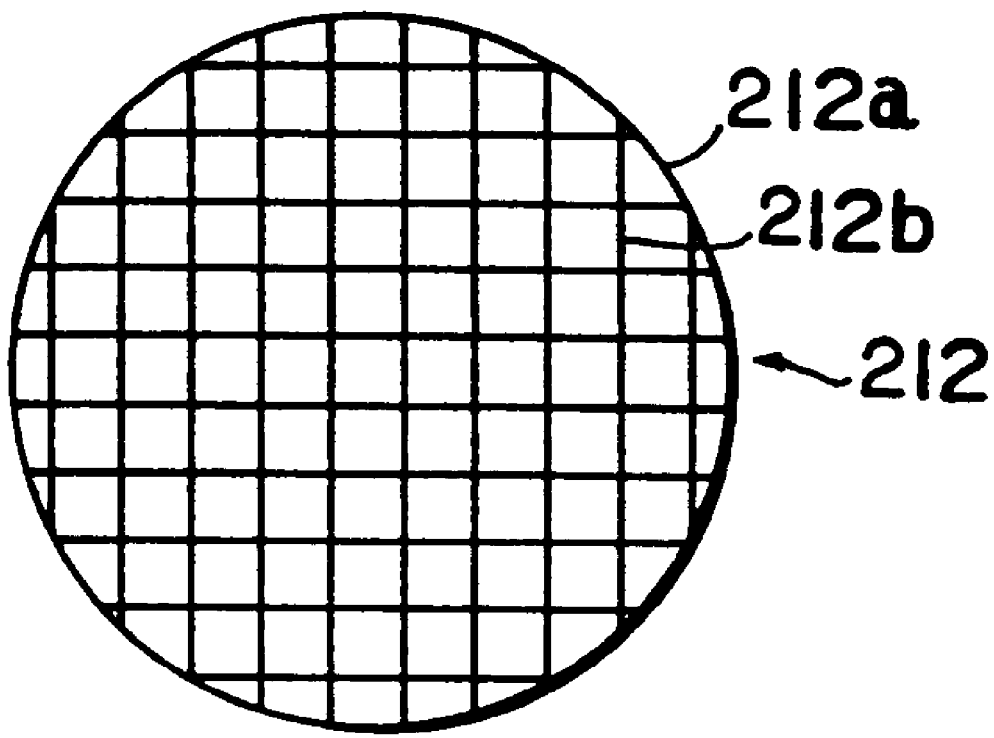
FIG. 38A is a diagram illustrating the construction of a grid according to the second aspect of the invention.
Figure 38B:
FIG. 38B is a front elevational view of the grid of FIG. 38A.

As shown in FIG. 38, the grid 212 is formed of a crisscrossed meshwork 212b fitted in a ring-shaped frame 212a. The thickness t of the grid 212 is determined in consideration of such factors as the weight of the catalyst 213 mounted on the grid 212 and liquid pressure. The grid 212 is essentially a framework produced by weaving intersecting sets of steel elements, such as flat steel strips. It is preferable to use a square mesh grating for achieving both mechanical strength and optimum gas-liquid dispersing effect. While the size of each square opening in the grating depends on the inside diameter of the tower 209 and the number of holes made in the perforated plate 210, the length of each side of each square opening should preferably be one-third to 1/500th of the inside diameter of the tower 209. More preferably, it should be one-fifth to 1/100th of the inside diameter of the tower 209, and most preferably, one-tenth to 1/50th thereof. Although it is desirable that the grid 212 has as many square openings as possible, it will become difficult to produce the grating if the number of square openings is made too large. On the other hand, if the number of square openings is too small, a sufficient dispersing effect will not be obtained. A wire-mesh screen 219 is usually placed on top of the grid 212 for preventing the packed material 213 from falling down. The wire-mesh screen 219 used for this purpose must have a mesh number that is sufficient to prevent the falling of the packed material 213. A higher gas-liquid dispersing effect will be maintained if the height of the grid 212 is made as small as possible.

Figure 39A:
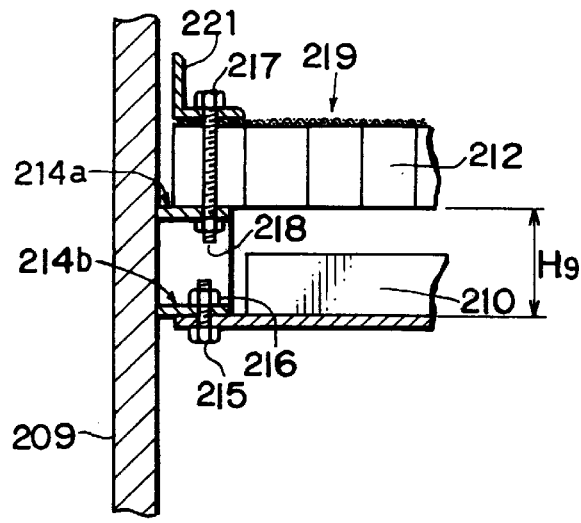
FIGS. 39A to 39C are diagrams illustrating how the perforated plate and grid according to the second aspect of the invention are installed.
Figure 39B:
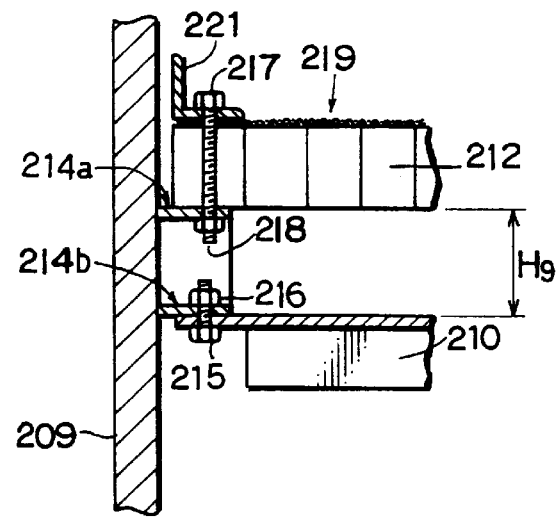
Figure 39C:
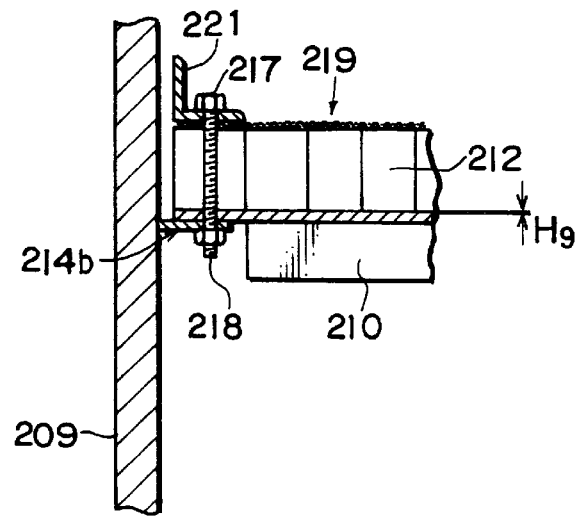

FIGS. 39A to 39C are diagrams illustrating alternative methods of installing the aforementioned perforated plate 210 and grid 212. Referring to FIG. 39A, upper fixing brackets 214a and lower fixing brackets 214b are provided around the inside wall of the tower 209 at regular intervals. The perforated plate 210 is secured to the tower 209 by passing bolts 215 through the fixing holes 210i in the perforated plate 210 and corresponding holes in the lower fixing brackets 214b, and then tightening nuts 216 onto the respective bolts 215. The grid 212 is secured to the tower 209 by placing a peripheral portion of the grid 212 on the upper fixing brackets 214a so that the grid 212 is held between the upper fixing brackets 214a and angle brackets 221, passing bolts 217 through the fixing holes 210i in the perforated plate 210 and corresponding holes in the lower fixing brackets 214b, and then tightening nuts 218 onto the respective bolts 217. The wire-mesh screen 219 is secured by placing it between the top surface of the grid 212 and the bottom surface of the angle brackets 221.

It is advantageous if the distance $H_9$ between the top surface of the perforated plate 210 of the gas-liquid dispersion device VA and the bottom surface of the grid 212 is set within a range of 0 to 1000 mm. This is because the dispersing effect produced by the gas-liquid dispersion device VA will be lessened before the gas and liquid mixture reaches the grid 212 and fluctuations in the state of dispersion of the gas and liquid will occur if the distance $H_5$ exceeds 1000 mm. On the contrary, if the distance $H_9$ becomes less than 50 mm, an operational problem will arise when splitting the gas-liquid dispersion device VA. Accordingly, the distance $H_9$ should preferably be set between 50 and 300 mm. This distance $H_9$ defines a range which is appropriate for maintaining the dispersing effect produced by the gas-liquid dispersion device VA up to the grid 212.

If the perforated plate 210 is installed upside down as shown in FIG. 39B, the perforated plate 210 is positioned much closer to the grid 212 and the distance $H_1$ can be made closer to 10 mm.

Furthermore, if it is not required to remove the perforated plate 210, the distance $H_5$ between the grid 212 and perforated plate 210 may be reduced down to almost 0 mm as shown in FIG. 39C.

Referring again to FIG. 35, the gas and liquid introduced from the bottom of the tower 209 ascend through a middle portion of the tower 209 and reach the third single-hole plate 111 fitted with its own collision plate. Part of the gas-liquid mixture then descends along the inside wall of the tower 209 and forms a circulating flow, whereby conventionally known gas-liquid contact is accomplished. After passing through the third single-hole plate 111 fitted with the collision plate, the gas and liquid are dispersed in the radial directions of the collision plate and reach the second single-hole plate 110 fitted with its own collision plate, and part of the gas-liquid mixture forms a circulating flow in a similar way, whereby a gas-liquid contact process is performed between the second and third single-hole plates 110, 111.

After passing through the second single-hole plate 110 fitted with the collision plate, the gas-liquid mixture undergoes a gas-liquid contact process between the single-hole plate 211 fitted with the collision plate 211b of the gas-liquid dispersion device VA and the second single-hole plate 110 fitted with its own collision plate. Some pulsating flows exist in the gas-liquid mixture up to this point.

After passing through the second single-hole plate 211 fitted with the collision plate 211b, the gas-liquid mixture collides with the collision plate 211b and is dispersed in its radial directions. The gas and liquid are mixed while ascending through the gas-liquid dispersion device VA and continuously ejected in a mixed phase through the holes in the perforated plate 210.

Pulsating flows are already suppressed within the gas-liquid dispersion device VA since the gas and liquid are sufficiently dispersed, or mixed together, and the gas and liquid ejected through the perforated plate 210 are uniformly dispersed in the radial directions thanks to the collision plate 211b provided within the gas-liquid dispersion device VA.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A gas-liquid dispersion device, which comprises:
   a flow device in which a liquid forms a continuous phase and a gas flows upward; and
   a perforated plate which is positioned above and downstream of a gas-liquid passage in said flow device in which the mixed phase of the gas and liquid is produced, and which forms a separated liquid-conducting channel extending from said perforated plate toward a gas inflow opening side thereof, wherein the gas is dispersed upon passing through the perforated plate and the liquid is guided to and passed through the liquid-conducting channel, the liquid-conducting channel is formed between a partitioning plate which extends from a peripheral portion of the perforated plate and an inside surface of the gas-liquid passage of said flow device; and wherein the length of the liquid-conducting channel is at least 10 mm but not more than three times the diameter of the perforated plate.

2. A gas-liquid dispersion device, which comprises:
   a flow device in which a liquid forms a continuous phase and a gas flows upward; and
   a perforated plate which is positioned above and downstream of a gas-liquid passage in said flow device in which the mixed phase of the gas and liquid is produced, and which forms a separated liquid-conducting channel extending from said perforated plate toward a gas inflow opening side thereof, wherein the gas is dispersed upon passing through the perforated plate and the liquid is guided to and passed through the liquid-conducting channel, the liquid-conducting channel is formed between a partitioning plate which extends from a peripheral portion of the perforated plate and an inside surface of the gas-liquid passage of said flow device; and wherein the cross-sectional area of the liquid-conducting channel is so determined that the liquid flows at a velocity of 0.02 to 10 meters per second through the liquid-conducting channel.

3. A gas-liquid dispersion device; which comprises:
   a flow device in which a liquid flows upwardly forming a continuous phase and in which a gas flows upward, said gas-liquid dispersion device comprising at least two partitioning members positioned above and downstream said flow device arranged with a specific distance therebetween so as to interrupt a gas-liquid passage, in which a mixed phase of the gas and liquid is produced, each of the partitioning members comprising one of (a) a perforated plate having a plurality of through holes wherein a top of each of said through holes is on a downstream-side surface of said perforated plate, (b) a single-hole plate having a single through hole provided with a collision plate fitted close to an outflow opening of the through hole wherein a top of said through hole is on a downstream-side surface of said single-hole plate, and (c) a perforated plate having a plurality of through holes provided with a collision plate fitted close to outflow openings of the through holes wherein a top of said through holes is on a downstream-side surface of said single-hole plate; and
   wherein a liquid supply member and a gas supply member are provided below said at least two partitioning members.

4. A gas-liquid dispersion device according to claim 3 wherein the distance between the partitioning members is at least one half of the diameter of each through hole made in the partitioning members but not more than one-and-a-half times the inside diameter of the horizontal length of one side of an inside wall of the gas-liquid passage.

5. A gas-liquid dispersion device according to claim 3 or 4 wherein the partitioning member located upstream in the gas flow within said device is formed of a single-hole plate having a single through hole provided with a collision plate fitted close to an outflow opening of the through hole or a perforated plate having a plurality of through holes provided with a collision plate fitted close to outflow openings of the through holes, while the partitioning member located downstream in the gas flow is formed of another perforated plate.

6. A gas-liquid dispersion device according to claim 3 or 4, further comprising a supporting frame for supporting a packed material, the supporting frame being provided integrally with or separately from a downstream surface of the partitioning member located downstream in the gas flow within said device.

7. A gas-liquid contact apparatus incorporating a packed material loaded on top of the supporting frame of the gas-liquid dispersion device of claim 6.

8. A gas-liquid contact apparatus incorporating in its vessel more than one gas-liquid dispersion device of one of claims 3 to 4 in a multi-stage configuration.

9. A gas-liquid contact apparatus incorporating in its vessel more than one gas-liquid dispersion device of claim 7 in a multi-stage configuration.

10. A gas-liquid contact apparatus comprising:
    a plurality of vertical heat exchanging tubes through which a liquid flows forming a continuous phase and a gas flows upwards; and
    the gas-liquid dispersion device of one of claims 3 or 4 provided on an inflow end of the vertical heat exchanging tubes.

11. A wastewater treatment system for treating wastewater comprising:
    an oxygen-containing gas source which supplies the oxygen-containing gas;
    a treatment chamber through which a wastewater flows forming a continuous phase and an oxygen-containing gas flows upward; and
    the gas-liquid dispersion device or gas-liquid contact apparatus of one of claims 3 or 4.

12. The gas-liquid dispersion device according to claim 3 wherein the liquid supply means and the gas supply means have separate supply openings formed at different positions, respectively.

13. The gas-liquid dispersion device according to claim 3 wherein the liquid supply means and the gas supply means have a common supply opening formed at a same position.

14. The gas-liquid dispersion device according to claim 3 wherein each of the partitioning members are formed of one of a single-hole having a single through hole provided with a collision plate fitted close to an outflow opening of the through hole and a perforated plate having a plurality of through holes provided with a collision plate fitted close to outflow openings of said plurality of through holes.

15. A gas-liquid dispersion device according to claim 3 wherein each through hole is operable to allow liquid and gas to pass therethrough.

16. A gas-liquid dispersion device, which comprises:

a flow device in which a liquid forms a continuous phase and a gas flows upward; and a perforated plate which is positioned above and downstream of a gas-liquid passage in said flow device in which the mixed phase of the gas and liquid is produced, and which forms a separated liquid-conducting channel extending from said perforated plate toward a gas inflow opening side thereof, wherein the gas is dispersed upon passing through the perforated plate and the liquid is guided to and passed through the liquid-conducting channel, the liquid-conducting channel is formed between a partitioning plate which extends from a peripheral portion of the perforated plate and an inside surface of the gas-liquid passage of said flow device; and a baffle is provided on the upstream side of the liquid-conducting channel.

17. A gas-liquid dispersion device, which comprises:

a flow device in which a liquid forms a continuous phase and a gas flows upward; and a perforated plate which is positioned above and downstream of a gas-liquid passage in said flow device in which the mixed phase of the gas and liquid is produced, and which forms a separated liquid-conducting channel extending from said perforated plate toward a gas inflow opening side thereof, wherein the gas is dispersed upon passing through the perforated plate and the liquid is guided to and passed through the liquid-conducting channel, the liquid-conducting channel is formed between a partitioning plate which extends from a peripheral portion of the perforated plate and an inside surface of the gas-liquid passage of said flow device; and wherein said flow device comprises a device causing an upward flow of the liquid.

* * * * *

UNITED STATES PATENT AND TRADEMARK OFFICE
CERTIFICATE OF CORRECTION

PATENT NO. : 6,123,323

DATED : September 26, 2000

INVENTOR(S): Yukihiro YONEDA, et al.

It is certified that an error appears in the above-identified patent and that said Letters Patent is hereby corrected as shown below:

On the title page, item [30], the Foreign Application Priority Data is incorrect, item [30] should read as follows:

--[30]  Foreign Application Priority Data

| Aug. 27, 1996 | [JP] | Japan | 8-225660 |
| Sep. 20, 1996 | [JP] | Japan | 8-250639 |
| Aug. 7, 1997  | [JP] | Japan | 9-213632 |
| Aug. 7, 1997  | [JP] | Japan | 9-213633-- |

Signed and Sealed this

Eighth Day of May, 2001

Attest:

NICHOLAS P. GODICI

Attesting Officer        Acting Director of the United States Patent and Trademark Office